United States Patent [19]
Vig

[11] Patent Number: 6,038,554
[45] Date of Patent: Mar. 14, 2000

[54] NON-SUBJECTIVE VALUING© THE COMPUTER AIDED CALCULATION, APPRAISAL AND VALUATION OF ANYTHING AND ANYBODY

[76] Inventor: Tommy Vig, 18212 Nordhoff St., Northridge, Calif. 91325

[21] Appl. No.: 08/593,894

[22] Filed: Jan. 30, 1996

Related U.S. Application Data

[63] Continuation of application No. 08/575,936, Dec. 20, 1995, Pat. No. 5,911,131
[60] Provisional application No. 60/005,304, Oct. 16, 1995, and provisional application No. 60/003,592, Sep. 12, 1995.

[51] Int. Cl.[7] .................................................. G06F 17/60
[52] U.S. Cl. ............................................. 705/400; 705/1
[58] Field of Search ............................. 705/1, 7, 10, 400

[56] References Cited

U.S. PATENT DOCUMENTS

| | | | |
|---|---|---|---|
| 4,191,472 | 3/1980 | Mason | 356/243.4 |
| 4,464,122 | 8/1984 | Fuller et al. | 434/262 |
| 5,083,270 | 1/1992 | Gross et al. | 705/35 |
| 5,857,174 | 1/1999 | Dugan | 705/1 |

FOREIGN PATENT DOCUMENTS 59-85568  5/1984  Japan .

*Primary Examiner*—Edward R. Cosimano

[57] ABSTRACT

Non-Subjective Valuing© is a computer-assisted valuing system for discovering both an entity's actual current societal monetary value and its contemporary monetary worth specifically to the inquiring individual person, group or corporation, providing a user with such target entity's retail and wholesale prices along with its true worth and specific value to the explorer, employing as yardstick the NORM, which is the hypothetical unit in any group that is accurately calculated to be both precisely average in every one of its collectively discoverable characteristics and its price, to which NORM yardstick the present invention compares any test unit in that group on a natural, quantified point basis to obtain such precise current monetary worth of any such test unit, employing a specially conceived, designed and explained organic application of inductive statistics, accurate sampling, central tendency, and statistical inference, for calculating; drawing scientifically valid conclusions about surveying a constantly and factually representative community (such as the United States, 1999, for example), combined with certain new discoveries and unique, novel processes, as set forth herein, enabling Non-Subjective Valuing© instantly and conclusively to empower a prospective trader objectively to compare the contemporary monetary values of any and all competing units in or out of any probed group, regardless of such competing units' respective current prices.

40 Claims, 26 Drawing Sheets

ETC., ETC., ETC., THE WIP PIE TO REFLECT THE RESPECTIVE RELATIVE IMPORTANCE OF <u>EVERY</u> COLLECTIVELY DISCOVERABLE DOCTOR-ATTRIBUTE AT ANY GIVEN TIME.

FIG 5/A
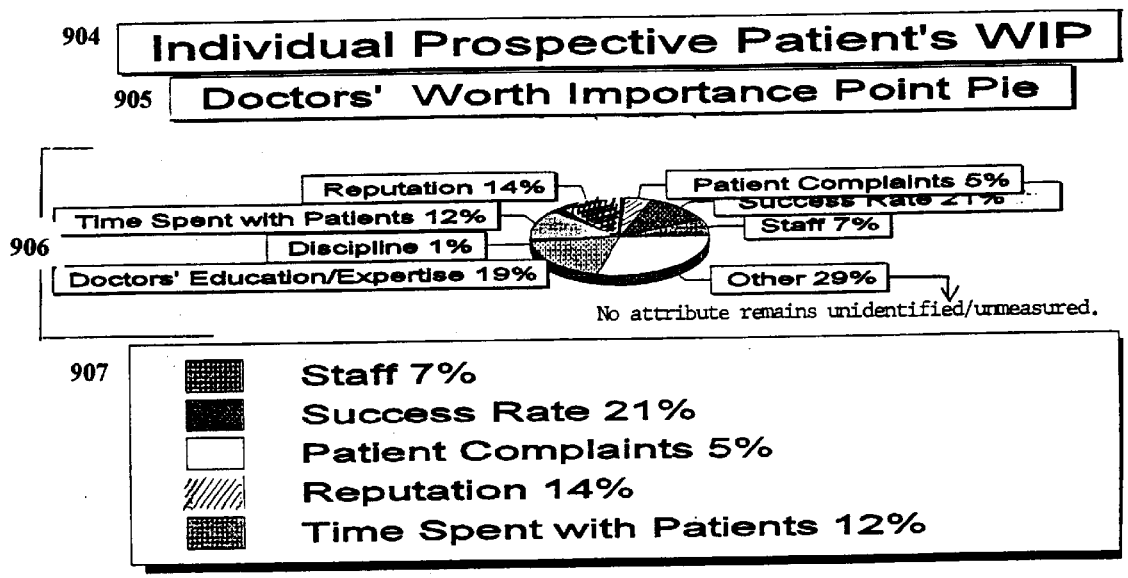
ETC., ETC., ETC., THE WIP PIE TO REFLECT THE RESPECTIVE RELATIVE
IMPORTANCE OF <u>EVERY</u> COLLECTIVELY DISCOVERABLE DOCTOR-ATTRIBUTE AT
ANY GIVEN TIME.

ETC., THE PIE TO REFLECT THE RESPECTIVE RELATIVE IMPORTANCE OF EVERY COLLECTIVELY DISCOVERABLE DOCTOR-ATTRIBUTE.

920 Taxi Cab Company WIP Pie
921 Abbreviated Relative Allocation of Weigh Importance
922 Per Mile Cost of Operation 24.33% — Roominess 24.33%
Reliability 24.33% — Comfort 21.6%
Style/Design 5.4%

923
- ☐ Roominess 24.33%
- ▨ Per Mile Cost of Operation 24.33%
- ▧ Reliability 24.33%
- ▩ Style/Design 5.4%
- ▦ Comfort 21.6%

FIG 11

| Manufacturer | Model | MSRP | Dealer Cost | Fair Price | True Value | Your Value | Savings | % Savings | Style | Relia- bility | Safety | Drive- ability | Co f |
|---|---|---|---|---|---|---|---|---|---|---|---|---|---|
| Ford | Crown Victoria | $23,800 | $22,134 | $23,241 | $27,765 | $28,390 | $4,590 | 19.3% | 5.5 | 7.1 | 7.5 | 5.5 | 7 |
| Chrysler | LHS | $30,255 | $27,536 | $28,913 | $33,204 | $34,284 | $4,029 | 13.3% | 7.1 | 8.5 | 7.5 | 7.5 | 7 |
| Oldsmobile | Aurora | $35,735 | $32,876 | $34,520 | $32,047 | $32,899 | ($2,836) | -7.9% | 7.4 | 6.8 | 7.1 | 8.1 | 7 |
| Audi | A6 | $33,100 | $28,466 | $29,889 | $28,617 | $28,036 | ($5,064) | -15.3% | 6.8 | 7.6 | 7.7 | 7.1 | 6 |
| Volvo | 965 | $35,850 | $32,982 | $34,631 | $29,521 | $29,035 | ($6,815) | -19.0% | 5.9 | 8.9 | 7.2 | 6.3 | 4 |
| Infinity | J30 | $35,750 | $31,102 | $32,657 | $27,557 | $25,882 | ($9,868) | -27.6% | 6.9 | 7.4 | 7.9 | 5.1 | 6 |

Click on a column heading to change the sort order

```
═══════════════════════ ArtIndex © ═══════════════════════
  File  Edit  Valuing  Reports  Import/Connections  Window  Help
  ┌──────────────── Home: Northridge, California ────────────────┐
  │ ┌─Select Area──────────────────────────────────────────────┐ │
  │ │  Area                                                    │ │
1801│ │  Northridge, California            ▼                   │ │ All
  │ └──────────────────────────────────────────────────────────┘ │  TM
  │ ┌─Enter Factors────────────────────────────────────────────┐ │
  │ │ ┌─1. Location──────────────────┐  ┌─5. Amenities──────┐  │ │
1802│ │ │ 9  The second best location │  │ 6  More than average│ │ │
  │ │ │    in this area          ▼  │  │                ▼  │  │ │
  │ │ └──────────────────────────────┘  └───────────────────┘  │ │
  │ │ ┌─2. Size (inside dimensions of┐  ┌─6. Upgrades───────┐  │ │
  │ │ │    home/lot size)            │  │ 4  Less than average│ │ │
  │ │ │ 9  Very large home/lot  ▼   │  │                ▼  │  │ │
  │ │ └──────────────────────────────┘  └───────────────────┘  │ │
  │ │ ┌─3. Emotional Appeal──────────┐  ┌─7. Services───────┐  │ │
  │ │ │ 8  Very attractive qualities▼│  │ 8  Excellent   ▼  │  │ │
  │ │ └──────────────────────────────┘  └───────────────────┘  │ │
  │ │ ┌─4. General Condition         ┐  ┌─8. Financing──────┐  │ │
  │ │ │    (inside/outside/yard)     │  │10  No down, owner │  │ │
  │ │ │ 1  Almost fixer upper   ▼   │  │    will carry 100%▼│  │ │
  │ │ └──────────────────────────────┘  └───────────────────┘  │ │
  │ └──────────────────────────────────────────────────────────┘ │
  │ ┌─Value (to within ±1%)────────────── 1805 ────── 1807 ▼──┐ │
1803│ │ Fair Market Value = $224,100  Sale By Owner Value = $206,172   Quick Sale Value = $174,798 │ │
1804│ │ Monthly Rent Value = $1,681   Yearly Lease Value = $12,326  INHERENT RELATIVE VALUE       │ │
  │ └────────────────── 1806 ────────────────────── ↑1808 ───┘ │
  │             ┌─────────┐                ┌─────┐               │
  │             │CALCULATE│                │Close│               │
  │             └─────────┘                └─────┘               │
  └──────────────────────────────────────────────────────────────┘
```

FIG 19

|  | ArtIndex © |  |
|---|---|---|
| File  Edit  Valuing  Reports  Import/Connections  Window  Help |

Home: Fargo, North Dakota

Select Area
1901  Area
Fargo, North Dakota

Enter Factors
1902
- 1. Location
  7  Good location in this area
- 2. Size (inside dimensions of home/lot size)
  6  Larger than average
- 3. Emotional Appeal
  4  Less than average
- 4. General Condition (inside/outside/yard)
  5  Average

- 5. Amenities
  3  Fair
- 6. Upgrades
  5  Average
- 7. Services
  2  Poor
- 8. Financing
  0  All cash only 1904  Value (to within ±1%)  1903
Fair Market Value = $25,285   Sale By Owner Value
Monthly Rent Value = $190    Yearly Lease Value
1905
CALCULATE 1906
10  No down, owner will carry 100%
9   5% down, owner will carry most of the loan
8   10% down, owner will carry large part of the loan
7   10% down, easy to qualify
6   More attractive than normal situation
5   Normal
4   More difficult financing situation than normal
3   Fairly demanding financing terms
2   Very difficult
1   Extremely difficult
0   All Cash Only

FIG 22

| ArtIndex © |
|---|

File  Edit  Valuing  Reports  Import/Connections  Window  Help

Automobile: 1993 General Motors Camaro

Select Automobile

2201 — Make: General Motors  Model: Camaro  Year: 1993

Enter Condition

2202 — 1. Over All Impression: 8 Impressive

2. Mileage: 2 Over 100,000 miles

3. Body Condition/Paint: 6 Good

4. Mechanical Condition: 5 Average

5. Interior Condition: 3 Some noticeable deterioration

6. Popularity of Model In Your Area: 8 Very popular

7. Has Car Been In An Accident: 4 Very minor accident

8. Extras: 7 Much more than average

Value (to within ±1%)

- Fair Market Value = $12,519  — 2203
- Auction/Private Sale = $9,890  — 2204
- Retail = $14,897  — 2205
- Replacement Cost = $13,896  — 2206
- Wholesale = $8,513  — 2207
- True Value = [ ]  — 2208

CALCULATE      Close

2501. The NSV computer requests the person designated by the probing group to enter the pre-agreed relative importance of the respective value judgments of each member of a probing group. (Called the pre- (precedent) pie). (Example: Dad 40%, son Jason 15%, etc., no matter how many family or groupmembers, the total "pie slices" must always add up to 100%).

2502. When pursuant to the pre-pie (as negotiated by members of the probing group) then proceed to "vote" their said respective ratings as to how important various aspects of a probed entity are to them, the computer automatically figures their respective judgments to be worth precisely the pre-agreed relative weight for calculating the total monetary value of an entity. (Example: If a certain prospective decision concerning an entity is being weighted by a probing company, (say the pros and cons of the purchase of another, probed company), and said probing company president, whose pre-pie value judgment was entered on the NSV database to be worth 60% in the balance, rates a specific characteristic of the probed entity or prospect, to have an importance of 4, on the standard NSV scale of 0-10, 10 being most important, then when a member of said company's board of directors whose opinion counts for a pre-agreed 10% on said pre-pie, enters his said rating concerning said quality of said target entity to be an 8, then concerning said attribute, the NSV computer, in the final analysis will count said probing company's president's said relevant opinion to be worth six times as much as that of said director's, or said director's 8 rating will be counted as having a weight of 2.7, in this particular example.)

NON-SUBJECTIVE VALUING© THE COMPUTER AIDED CALCULATION, APPRAISAL AND VALUATION OF ANYTHING AND ANYBODY

SPECIFICATIONS a. This is a continuation of U.S. Ser. No. 08/575,936 filed Dec. 20, 1995 now U.S. Pat. No. 5911131, and continuation of U.S. provisional patent applications Ser. No. 60/005,304 filed Oct. 16, 1995 and U.S. provisional application Ser. No. 60/003,592 filed Sep. 12, 1995.

BRIEF DESCRIPTION OF THE DRAWINGS

FIG. 5/a pictures the form of a Non-Subjective Valuing© individual PIE, using a few hypothetical qualities of "doctors," relating to Step ● of FIG. 4.

FIG. 11 demonstrates a sample ranking list

FIG. 23 computer screen reproduction for showing a consumer or corporate user's choosing from available value-affecting factors and rating them in accordance with his observations regarding the car or other entity FIG. 24 depicting how the invention works with one value-affecting factor FIG. 25 illustrating the working mechanism of this invention for evaluating something for a group (the pre-pie concept)

b. Federally Sponsored Research and Development is not applicable. (MPEP §130)

c. No Microfiche Appendix is applicable (37 CFR 1.96© and MPEP §608.05)

d. Non-Subjective Valuing© would represent a multiple and diverse fundamental improvement on existing comparable valuing systems if it were not for the fact that there are no comparable valuing systems now in existence, period.

Generally, there is no invention that does not use some known elements and concepts, of course.

The present one is distinguished by combining many entirely fresh ideas with unexpected use of familiar ones, the resulting novel fusion achieving surprising and extremely useful results.

e. The fundamental discovery part of the present invention includes the following elements:

(1) Unless all communally discoverable characteristics of entities are societally faithfully quantified, accurate monetary worth-comparison of one such entity with another is impossible.

(2) Everything in fact has both a certain, exact societal monetary value, and a precise distinctive, discoverable monetary value to each of us, whether or not such values are conscious, written, stated, identified, or currently understood or considered.

(3) There is no entity, real or imagined, for which current societal dollar worth is not discoverable by employing the scientific methods of inductive statistics, accurate sampling and central tendency.

(4) At any point in time, an entity consists of nothing else than what everything everybody can then think of it. In other words, to a community, an entity is not more and not less, but definitely equals what it collectively is to everybody in such society.

(5) What any entity is, does and has are what matter as to its true monetary worth or ranking.

(6) Price is never a factor of value.

(7) Price and value are fundamentally different concepts.

(8) The yardstick for nonsubjective valuing is the fictitious unit in any group that is accurately calculated exact average (5 on the scale of 0–10, 10 being best) both in all its sociatelly discoverable characteristics and its price, called the 100%/100 point NORM.

(9) Accurate market research tells us nothing but what people who know very little about an entity pay for that entity. By definition therefore, results of such sales analysis of an entity's market price cannot possibly determine that entity's true monetary value.

Figure 4:
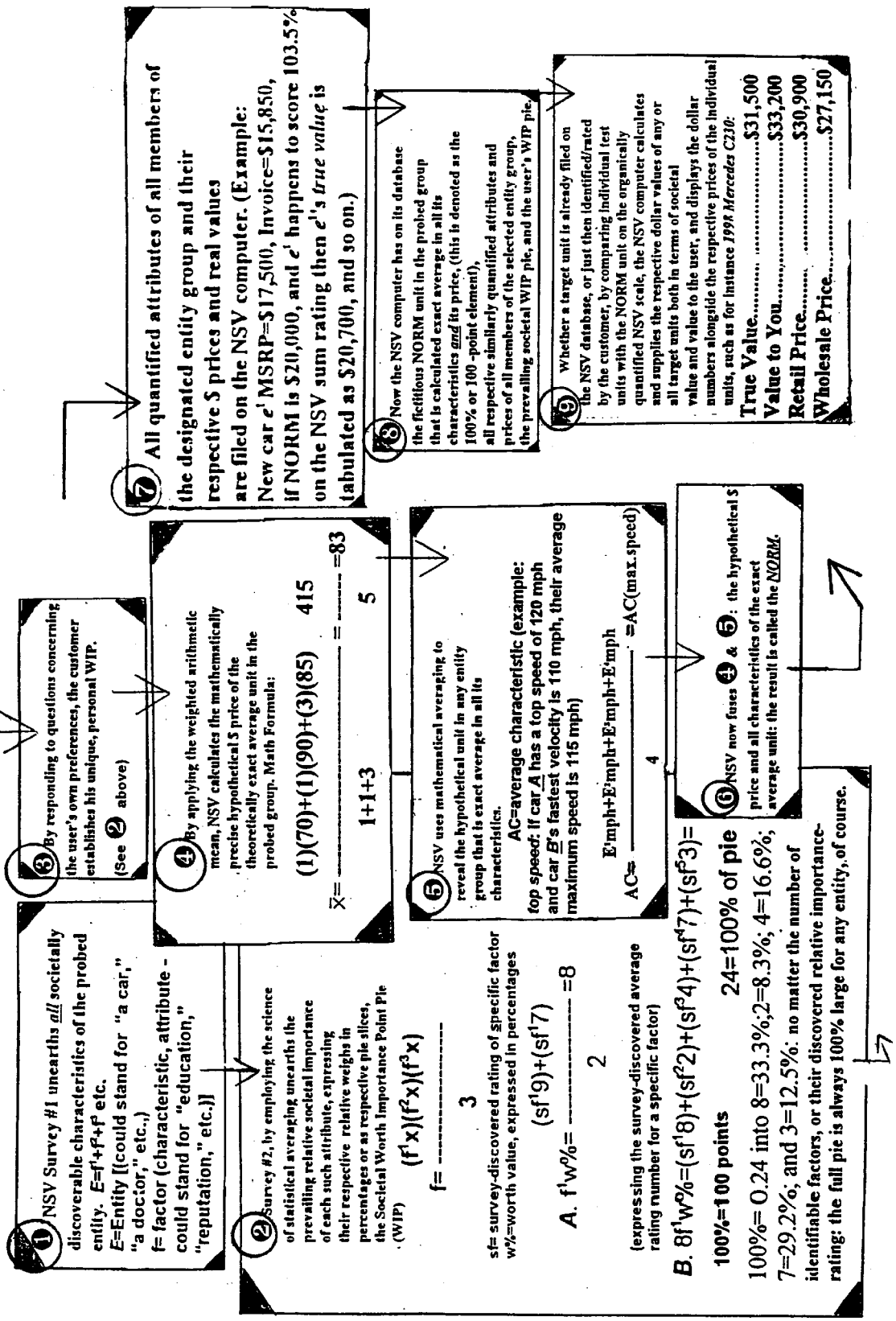
FIG. 4 illustrates the Non-Subjective Valuing© process, including the nature and sequence of the fact-finding survey series, and including denoting the relevant employed math formulas.

(10) The U.S. government arbitrarily selects the relative importance of price fluctuations of subjectively designated items it measures for the nation's official rate of inflation a figure. That number is an important "fact" that affects innumerable decisions in our country, from Wall Street to Social Security. In contrast, starting numbers for calculations in Non-Subjective Valuing© are not decided by benefiting politicians, experienced government officials in a vacuum, the inventor or by experts. The calculations here begin using numbers directly gleaned from the people, conclusively providing the clear chance to decide on the basis of optimal information. (FIG. 4)

(11) A person or a society is perfectly informed when such person or society is provided with all contemporarily available quantified information desired by such person or society.

(12) The true value of something is its real monetary worth, based on what it has and does, while its market price is negotiated between buyer and seller.

(13) In the present invention the observer is a community, such community being instantly ideally informed about the probed entity, the non-subjective valuing computer expressing in monetary terms the true importance to such community of such probed entity. The only non-relative, non-subjective judgment belongs to such optimally informed society. Being consummately apprised in accurately quantified terms means being able correctly to deliver 100% trustworthy value judgment. Rankings derive from the diverging true monetary values of such entities.

(14) Many say: "I am only interested in what a car looks like," but were this individual told that his favorite looking car is very unsafe and unreliable, he might reconsider.

(15) There is no entity, real or imagined, for which current individual dollar worth is not discoverable by employing the quiz/pie method as set forth herein.

f. A thing can be many things to many people, and mean very different things to many individuals, but at any given time it can never be more or less to a given society than everything everybody in such community can think of it.

g. Terminology:
(1) The expressions "societal value," "collective value," and "communal worth" mean the same thing here: the true monetary value judgment resulting pursuant to the relevant survey series referenced in FIG. 4;
(2) The terms "typical American," "normal individual," and "average person" also denote corresponding conceptions similarly denoted in FIG. 4, steps 1 through 9.
(3) The term "optimally informed," "perfectly knowledgeable," and "ideally educated," are interchangeable, referring to having complete, flawless intelligence relevant to the probed entity, and meaning possessing maximum available information as desired by a inquiring unique member of the community, or a probing specific group within the collective (a distinctive family, "marines," a specific corporation, etc.), or the observing entire society.

h. The backbone of the present invention is the fictitious Non-Subjective Valuing© 100%-Yardstick, the NORM that has the accurately calculated price of that unit in any group that, if existed, would rate a perfect "5" on every one of its qualities on the infinitely divisible scale of 0–10, 10 being best. (FIG. 4)

The Background of the Invention section should be amended as follows:

1. FIELD OF INVENTION. (TECHNICAL FIELD)

The present invention generally relates to the field of scientific valuation and is called Non-Subjective Valuing. More particularly, this invention appertains to the field of calculation of true societal monetary value or ranking of any entity, as opposed to such entity's market price. Price determines which entity is the most expensive or 37th most expensive in its relevant group. In contrast, the present invention unearths which entity is the best or 37th best in its pertinent assembly. Often the best is the most expensive.

The present method and procedure is designed to and does overcome both subjective valuation and asymmetric information in the marketplace by conclusively providing the user the true monetary value of something based on ideal (perfect, optimal, or maximum) information about the probed entity, thus this invention is a highly desirable, beneficial and novel tool both for consumers and providers of goods and services.

2. DESCRIPTION OF THE RELATED AND PRIOR ART. (BACKGROUND Art- including Cross References to Related Applications [37 CFR 1.78 and MPEP §201.11])

The following additional prior invention was uncovered in the pertinent art:

U.S. Pat. No. 3,628,904, issued to Jean Francois Canguilhem of Paris, France, on Dec. 21, 1971, for COMPUTER PROGRAMMING/DIMENSIONAL SYNTHESIS, hereafter "Canguilhem."

Extensive research uncovered no other pertinent prior patent other than the ones already referenced under the relevant heading since subject 08/575,936 was filed. The fact is that shopping guides and pricing theories abound, but the idea that the true monetary value of a priced entity (a particular new car or vacation) can be calculated independently of the entity's price is not generally understood even among scientists. It is generally assumed that a manufacturer prices a product fairly, due to market forces. However, in free-market economies, way too much money is spent promoting an entity in comparison with improving what it has and does, because the general public is known to be susceptible to advertising and publicity. The fact is that in the sense of the present invention, currently the PTO has no separate category for valuing.

The true dollar value of something reflects the entity's real importance, expressed in monetary terms. This kind of scientific evaluation today has little to do with pricing an entity.

The providers of goods and services today rely on market research to learn how much money an uninformed public might pay for a certain, well-promoted product, no matter the entity's actual value. They also consider the cost of manufacturing, of course. All this relates to pricing, however, not value.

Another prevalent practice has been generally to mislead consumers by asking them if price matters to them, forgetting to add: "all things being equal." Most people seem to assume that all things are equal, otherwise they would know that to pay less might not mean savings.

The truth is that something is inexpensive if it is worth more than it costs.

Illustration:

Deal A is paying $12,000 for a car that is worth $10,000.

Deal B is paying $13,000 for a car that is worth $17,000.

If price mattered independently of value, Deal A would be better, because you spend less money.

The scientific calculation of what a specific product, service or other entity is actually worth in dollars and cents to the community is what the present invention accomplishes. Price is between buyer and seller.

Regarding Canguilhem

I.

Canguilhem, column 1, paragraph 1, a.

proves that a general valuing system (apparatus to detect the worth of anything) can be (and was!) patented by the PTO. M. Canguilhem did not have to submit 500,000 separate descriptions because his valuing system could be applied to 500,000 different entities.

II.

Canguilhem, column 1, paragraph 1, lines 28–31, and 40–49. The very point of the present invention.

III.

Canguilhem, column 2, lines 20–28

Non-Subjective Valuing© accomplishes just that with a method that actually works.

The present invention's method is the instant unearthing of the dollar value a hypothetically perfectly knowledgable society would say something is worth.

IV.

In contrast to the present invention, Canguilhem failed to identify the only correct data source from which true value calculations may commence. Here, that data comes from the population unaltered, through a series of the described specific surveys that detect both every discoverable trait of an entity, and unearth and express in percentages the actual precise relative importance of each such entity, as set forth in FIG. 4. The present invention teaches that at any given time all entities consist of nothing more or less than their communally collectively discoverable characteristics. This invention also proves that unless all characteristics of entities are known and quantified, comparing them for their respective true dollar values is impossible.

Canguilhem's starting data did not come from society's natural, communal judgment. Pertaining to a car or any entity, both the number of relevant attributes and the relative importance of such attributes were in essence arbitrarily selected by that inventor.

Non-Subjective valuing© employs the science of statistical inference/infinite sampling of the community as its primary, initial data for ultimately calculating true monetary value and ranking.

V.

In further contrast to Canguilhem, the present invention uses the unearthing of current societal value coupled with symmetric information to achieve something apparently no one thought could be achieved: perfectly objective valuing.

The present invention teaches that if the community had perfect or optimal information about an entity, its judgment as to that entity's monetary value would in truth represent the entity's real value. A perfectly informed society can perfectly assess any entity's true monetary value relative to such society.

Non-Subjective Valuing© expresses hypothetical ideally educated collective judgment by discovering and providing the dollar worth consideration of the fictitious, perfectly knowledgable typical member of society to mirror non-subjective value judgment that has been historically elusive until this present invention. Therefore, Non-Subjective Valuing© teaches the only procedure realizing something's true value.

VI.

Canguilhem, column 2, lines 30–67

Dimensional Synthesis is the name M. Canguilhem gave his system of valuing. The present invention is named NON-SUBJECTIVE VALUING.

The absolute necessity of the 100% aspect of the Non-Subjective Valuing© pie is not referenced in Canguilhem. Without the pie theory, no meaningful comparison of one thing with another is possible.

Canguilhem's determination-example of thirty qualities of a car is arbitrary.

In contrast, Non-Subjective Valuing© series of surveys discover all elements of "a car" per the populace, and how relatively important each such element is both to the average person and to the individual inquirer. It then expresses the so discovered true relative values of all cars in precise monetary terms by the natural point system by comparing the test car with the fictitious NORM car. That hypothetical NORM car is computed to be exact average (5 on a scale of 0–10, 10 being best) not only in every one of its discoverable (existing) qualities but also in its price, providing a nonaffected yardstick, simply mirroring the value judgment of a hypothetically ideally knowledgeable society.

VII.

Canguilhem in contrast to the present invention, could not overcome the problem that to a batchelor, trunk size was not decisive, and to a family man, cargo space was very significant.

The present invention solved the issue of subjectivity by using the average communal value judgment as the base for calculating. At every step of all calculations, collective worth-considerations are Non-Subjective Valuing©'s starting numerals.

VIII.

The present invention uses the following math to convert ratings into percentages of the 100% pie. Pretend that the series of surveys as described infra, reveal that the factor of trunk space has a relative significance to the NORMal person to an importance of "8," ride quality to a point of "7," reliability to a point of "9," etc., etc., etc.~always using 0–10, 10 being most important.

8+7+9=24; 24=100%;

8:0.24=33%; 7:0.24=30%; 9:0.24=37%.

If the car that is average in every respect (Non-Subjective Valuing©'s fictitious NORM), including trunk space, quality of ride, reliability, etc., etc., etc., and if existed would cost $10,000, then once we accurately unearth that a certain test-car's trunk space is 10% larger than that of the average (NORM) car, and whose ride quality is worse than that of the average car by 15%, and whose reliability is better than that of the average car by 25%, then as to trunk space: 33% of $10,000=$3,300+10% ($330)=$3,630;

as to ride quality: 30% of $10,000=$3,000 minus 15% (−$450)=$2,550;

as to reliability, 37% of $10,000=$3,700+25% ($925)= $4,625, or this particular car is really worth $10,805.

Per the present invention, this is this automobile's true value in our society today, regardless of its price.

Non-Subjective Valuing© goes one better, however, and also provides the user with the dollar worth of the car in the inquirer's very own terms, per his unique WIP pie, employing the same, novel valuing metho.

For example, in this case, if the relative level of preferences of the batchelor and family man happened to be the same as to "ride quality" and "reliability" and the other 297+ automobile characteristics, then the NORM car being worth $10,000 for our present example, this particular test automobile would have the following respective values to these two unique inquirers:

| The Family man's attribute/$ distribution for fictitious NORM car | | The Bachelor's attribute/$ distribution for fictitious NORM car | |
|---|---|---|---|
| Trunk space | 9 | Trunk space | 1 |
| Ride Quality | 7 | Ride Quality | 7 |
| Reliability | 9 | Reliability | 9 |
| | 25 = 100% | | 17 = 100% |
| 9:0.25 = 36% = $3600 + 10% = $360 | | 1:0.17 = 6% = $600 + 10% = $60 | |
| 7:0.25 = 28% = $280 minus15%= minus$420 | | 7:0.17 = 41% = $4100 minus15%= minus$615 | |
| 9:025 = 36% = $3600 + 25% = $900 | | 9:0.17 = 53% = $5300 + 25% = $1325 | |
| Total $840 | | Total $770 | |

Therefore, the value of this test car to the batchelor is $10,770, to the average American, $10,805 and to the family man, $10,840. (The argument that to the family man the car with the small trunk is worthless is not true. If the price is right, he could always buy it and trade it in for a car with a bigger trunk.) (Please see FIG. 6 and FIG. 7)

IX.

Monsieur Canguilhem knew very well back in 1971 that everything in fact does have a value (never an absolute value, but always a specific, discoverable certain relative value in current society), but he could not name a source from which to begin his calculations, neither was he able to put his finger on the fact taught by the present invention that every entity contemporarily must consist of 100% of its currently discoverable qualities.

No objective yardstick was discovered or invented by him, he only knew that there must be one.

In contrast, the present invention includes the breakthrough as to a 100% objective valuing yardstick, teaches the working, foolproof ways both to unearth societal value and immediately to provide it to the user as demonstrated in FIG. 4.

The current worth of something is what society says it is, provided the community is ideally educated on the subject to be valued. The present invention instantly makes perfect experts of ordinary folks.

X.

Further proof that Canguilhem had no objective original number can be seen at lines Canguilhem, column 4, lines 1–13.

Plus, Canguilhem, column2, line 25, reference is made to an individual's subjective valuing, but missing is the Non-Subjective Valuing© solution: the 100-point pie unearthed from society that is faithfully divided by the community's expressed/calculated appropriate weigh importance points slices in toto representing 100% of the object's sum quantity.

Figure 8:
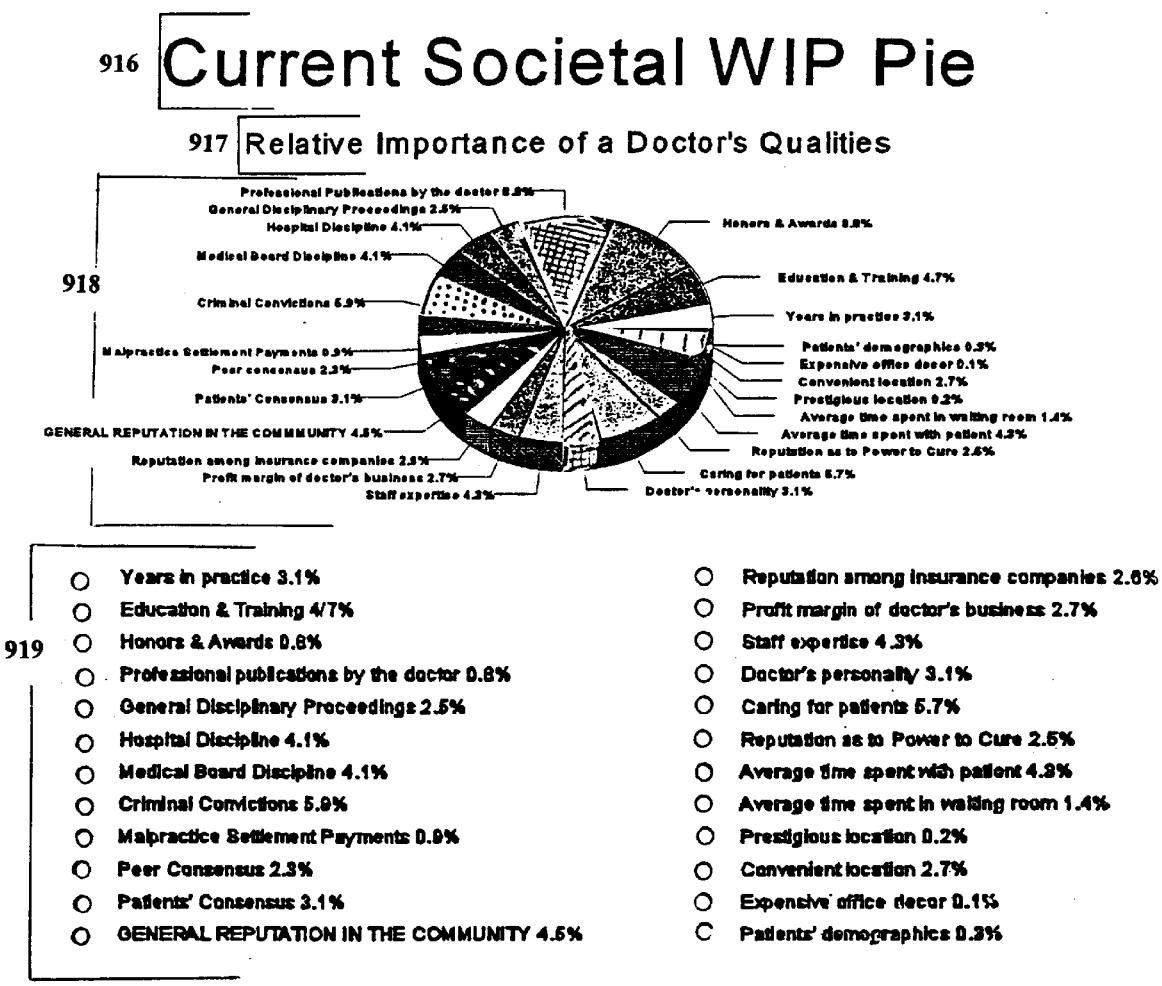
FIG. 8 symbolizes the composition of a Non-Subjective Valuing© societal PIE, using many hypothetical qualities of "doctors," relating to Step ● of FIG. 4.

In other words, the present invention realizes that every entity, of whatever nature, to a given society consists of 100% of its collectively discoverable qualities, and that by accurately unearthing the precise relative importance of each of these characteristics in the community's terms (the 0–10, 10 being most significant ratings translated into exact percentages of the whole, please see FIG. 4, step 2/b & FIG. 8), once all attributes are rated (no matter if there are 2 or 2000), Non-Subjective Valuing© discovers the precise collectively settled size of the slice of the communal pie each attribute represents, and true dollar y estimate by the Non-Subjective Valuing© computer is then instantaneous. The present invention is not a price hypothesis or pricing theory.

Price is a result of market dynamics, and is always between buyer and seller. This invention deals with discovering the actual monetary value of an entity, regardless of its price.

One fatal error in Canguilhem can be seen at col 6, line 39, where that invention includes sales price among value influencing factors. The present invention, in contrast, proves that price is not and can never be a factor of value. (Or buying a 15-year-old Ford for $50 would be twice as good a deal as buying a brand new Cadillac for $100 . . . )

XI.

The relevant math employed by the present invention:

Example. Suppose the series of polls reveals that society deems W, X, Y, and Z characteristics of entity "E" as being important to 9,2, 9 and 7, respectively on a scale of 0–10, 10 being most consequential.

(Non-Subjective Valuing©-08/575,936-Cip Standard Quality Rating Guide:

10=essential, nonnegotiable, critical quality;

9=extremely significant;

8=very important,

7=important;

6=of more than average moment;

5=of average (normal) portent;

4=of less than average importance;

3=of little consequence;

2=of very little moment;

1=almost negligible; and

0=of no importance whatsoever.)

(Designations may be made as 8.25, or 3.87, to provie more exact divergence-relationship in worth, and where the ratings are the combined results of polls, those partial numbers inevitable result. The math formula reflecting state of the art statistical sampling science remains the same and works perfectly well. FIG. 4.)

In this case, assuming for this example that this particular E has only 4 attributes, 27 equals 100% of E's sum constitution, or 9+2+9+7=27.

In the instant illustration, E consists exclusively of the components W,X,Y and Z, period.

Therefore, the pie slices are as follows: W=9=33.33% slice of the pie, X=2=7.41% slice of the pie, Y=9=33.33% slice of the pie and Z=7=25.93% slice of the pie.

Now let us suppose for this oversimplified illustration that the exact average E we are concerned with here, if existed, would have a precisely calculated price of $1000, and as mentioned, consisted entirely of four 5-rated (or 100%, or average) characteristics: W,X,Y, and Z. By the above referenced division, it is clear that the NORMal American would spend $333 for the typical Quality W, $74 for the average Quality X, $333 for the normal Quality Y, and $260 for the ordinary Quality Z, as the series of polls reveal that these various characteristics that comprise the sum total of such entity are relatively important to the typical person to these exact degrees.

After accurately measuring these four attributes in the test entity, we get the following results:

Concerning Quality W, the target entity is above average by 90%;

Concerning Quality X, the test entity happens to be worse than normal by 3%;

Concerning Quality Y, the mark entity proves to be better than usual by 7%, and

Concerning the concluding Quality Z, the probed entity gauges below standard by 2%.

The Non-Subjective Valuing© computer calculates as follows:

W=plus $30; X=minus $2; Y=plus $23; Z=minus $5. Total dollar value difference between the NORM unit and the target object is plus $46 for the test entity, or its real value is $1046.

The percentage differences in quality are expressed in quantified dollars.

Example: in case of Quality W, the target entity rated 9% better than the NORM. This quality is important to society to the degree of 9%. 90% of $333 is $30, and so on.

Now, if the prices of various competing items in the probed group happen to be $1100 for item A and $1012 for item B, for instance, then it is extremely useful for all to learn that as far as our fictitious, perfectly informed society is concerned—one's greatly kowledgeable next-door neighbor who is very much like every man except for having ideal intelligence or optimal knowledge about the probed entity group—A's true value is $1046, and B is really worth $1127, and so on.

Additionally, when the user inputs his own preferences, his respective personal actual dollar worth considerations could easily turn out to be $987 for the item priced at $1100 and $1358 for the item selling for $1012.

This was never possible before this invention, because of at least the following reasons:

Not all communally quantified qualities of an entity were weighted.

Not all individually quantified characteristics of an entity were matched.

Not all qualities of an entity were accurately and independently measured for what they actually were and did either in terms of the normal American or in terms of the individual user.

No credible system existed accurately to render quality differences in monetary value.

The NORM did not exist that is the heart of the present invention: the discovery and scientific calculation of the hypothetical unit in any group that is societally precisely average both in every one of its qualities and its price.

It was not yet known that in fact every entity actually currently consists of nothing else but all of its contemporarily collectively (societally) discoverable characteristics as this invention teaches.

Nor were generally considered or understood, or in scientific circles expressed or accepted, other dictums taught by the present invention, including that price and value have always had very different meanings, that what somebody pays for something is not at all necessarily equal to its value, that the cost of manufacturing something might have nothing to do with its value, that the edict "you get what you pay for" is a completely unreliable proclamation, that the results of accurate market research regarding prices reveal nothing about values, but tell us only what people who know very little of something pay for it, that the price of something is not a factor of its value, and so on.

XII.

Non-Subjective Valuing© assumes that the buyer is interested in buying one entity, or going to consult one doctor, or purchase one car.

Take automobiles as a for instance. If an individual had the money and inclination to buy one two-seater convertible sports car for fun, a station wagon for family outings, yet another, prestigious automobile for business purposes, etc., etc., etc., then that buyer might not be forced into using the trade-off mechanism (to swap or compromise characteristics such as roominess for sportiness, etc.), but he will still want to apply Non-Subjective Valuing© to help him choose among sports cars, or among station wagons, among SUVs or among luxury cars based on these vehicles' respective relative worth as opposed to their respective market prices. In other words, assuming that money is no object, a normal individual might still want to pay $100,000 for a car that is really worth $120,000, rather than pay $100,000 for a car that has a true value of $80,000.

XIII.

Reading on, Canguilhem turns out to be a very elaborate way of subjective valuing in clear contrast to Non-Subjective Valuing©

Canguilhem's valuing is a perpetual motion attempt. Non-Subjective Valuing© has a working, independent engine, powered by natural (organic) resources yet. (FIG. 4 Steps ● and ●)

XIV.

Canguilhem, in column 15, line 16–28, touches upon the problem asymmetric information has forever created until the present invention. The purpose and achievement of Non-Subjective Valuing© is the solving of asymmetric information in the market place.

Canguilhem has no firm, standard, objective method (including an independently powered propellant such as set forth in FIG. 4 of the present invention) credibly to realize exact relative monetary worth of an entity either in terms of society as a whole, or a cash worth consideration relevant even to a specific, unique individual. Non-Subjective Valuing© does both (FIG. 4, Steps ●, ● and ● and FIG. 8, 9, 10 & 11)

Canguilhem refers to "FOCAL POINT," an ill-defined, uncertain and wholly arbitrary measuring entity, with no identified monetary value and no precisely quantified individual or sum characteristics, just to mention some contrasting fundamental shortcomings of the relevant prior art.

While the expression FOCAL POINT apparently can be understood to be a corresponding yardstick to what Non-Subjective Valuing© calls NORM, Non-Subjective Valuings©'s NORM is defined exactly, including its price. (FIG. 4, Step ●)

In fact, the NORM cannot exist without its precisely and scientifically calculated monetary value in the Non-Subjective Valuing© system, making the present invention 100% unique and effective, among other things by combining the science of inductive statistics with facts, such as that for all practical purposes, currently all things consist of 100% of their momentarily perceived, discoverable attributes.

Since no step in the process, set forth in FIG. 4, is partial, or arbitrary, the end result is an important "judgment," an "opinion" that truly lacks the traditional elements of "a point of view."

This invention overcame subjective evaluation by conclusively and immediately providing the value judgment of a fictitious society: one that is ideally educated on the given subject. This could never be done prior to the present invention.

For instance, if the average height of a man in a given society is 5'10", then to say that a particular man who is 5'10" is average in height, is not a prejudiced view in such community.

In the referenced society, 5'10" can be used as an impartial guide to relative height, although it lacks quantitative value, of course. (A 5'10" tall man can be a fast runner, a great computer analyst, a karate champion, or a mentally handicapped patient in a sanatorium.)

To begin with, numbers are essentially a manmade invention. Useful, but limited, because the question is always to what the numbers are assigned. Are two cars always more valuable than one? Are two $25,000 Fords never more valuable than one $250,000 Bentley? The answers are "No" to both questions, but on the average, generally one $250,000 Bentley is more valuable than two $25,000 Fords in our current society, since one can always sell the Bentley, buy two Fords, and keep the change. However, value-affecting factors in many cases involve more complicated real issues, such as was something produced by child labor, for instance. Society in general, or an individual user in particular, might not buy such an item virtually no matter its price out of conviction and moral consideration: an important human value-affecting component.

This invention starts quantitative calculations with average numbers the probed society unpollutedly provides.

If a particular new automobile is shown to a scientifically representative sample of society and it is ultimately uncovered from the series of surveys and focus groups that on the average this car's quality of outward appearance generally rates a "7.41" on the infinitely divisible scale of 0–10, 10 being best, then this "7.41" becomes the working value judgment for that one quality that the present invention uses to start calculating this automobile's sum current societal value. (FIG. 4, Step ●)

A man 6'4" is 10% taller than the average, but without quantification, this too is a meaningless number in a void, and the percentage math also remains meaningless. The only time the fact that somebody is 10% taller could mean anything at all is when other than that, two men are identical, which is virtually impossible. That is the reason this invention teaches that unless all societally discoverable characteristics are known and quantified about comparable entities, no scientific comparison may commence.

Once monetary value of an entity is established, apples may easily be compared to oranges using the method taught by the present invention.

If a family has $10,000 to spend, and pursuant to the computer's quiz (sample question: "On a scale of 0–10, 10 being most important, how important is having a new car?"—"On a scale of 0–10, 10 being most important, how important is lying on the beach in Hawaii?"—etc., etc., etc.) and following all family members keying in their respectively pre-weighed preferences, creating the family WIP pie, the Non-Subjective Valuing© computer tells them that for the available $10,000 they could either take the discussed specific vacation worth $8,000 to them, or trade in their station wagon for a new one, the second choice having a true value of $13,000 to them: the family can then make a decision based on the varying dollar worth of the two (otherwise seemingly incomparable) choices.

Monetary value is used by the present invention to express true value as the clearest, most direct and understandable way to compare one entity with another. What do we get for our $10,000: $8000, or $13,000? It is now easy to compare the alternatives.

In other words, as the flow chart and sequence of FIG. 4 explains, the present invention's calculations are quantified in terms of our society: the end numbers have specific, understandable and usable meanings. All other things being equal, a car that offers you more safety by a specific margin, better style by a quantified percentage, measurable superior reliability and a certain amount of finer comfort than another, and so on, is worth precisely calculable more dollars.

One of the important challenges this invention solves is calculating the relative true dollar values of many cars that offer varying attribute levels for every discoverable automobile characteristic, including safety, comfort, reliability and style.

By using the method set forth in FIG. 4, the precise current communal dollar worth of a car that is 16% safer than the average, 12% less comfortable than the average, 4% more reliable than the average and has a style that the community generally rates to be 8% better than the average, is precisely determinable. The same methodology works to determine the dollar worth and ranking of a specific doctor. This is further illustrated in FIG. 5 through 25.

XV.

Non-Subjective©'s NORM is the imaginary, rather complex, non-exitent automobile, whose 300+ characteristics are all precisely average (this imaginary car is calculated to rate a "5" [or is 100%], on the scale of 0–10, 10 being best, on every one of its attributes), and which car's price is also discovered through the survey series to have the precisely average price among therelevant group of cars as generally set forth in FIG. 4.

The Non-Subjective© NORM car is not somebody's description of an ideal car (a subjective proposition) but it is an illusory vehicle, all of its characteristics having been based on existing, measurable, identifiable reality: the average speed, the average ride quality, the average resale value, the average comfort, style, safety, etc., etc., etc., and the average price to complete the practical, relevant, natural yardstick. The Non-Subjective Valuing yardstick is not manmade, or artificial, that is, it is: not subjective.

Non-Subjective Valuing© provides not a disputable value judgment, but the real one and the only one that is not an opinion.

It unearths society's current, theoretically perfectly or optimally educated value judgment in reference to any subject.

The most important questions conclusively answered by the present invention are:

(1) What would this car be worth in our community today if all was known and understood about it? and (2) Which dentist would you, the user, choose if suddenly you had optimal, quantified information about all dentists?

That is why the survey/focus group/polls series of the representative segment of the relevant community (America, etc.) is an integral element of this particular invention that works hand in hand with the novel pie theory (100% of its components inevitably and always representing the total entity) to achieve the brand new science: Non-Subjective Valuing.

M. Canguilhem named his method Dimensional Synthesis, this inventor names the present method and procedure Non-Subjective Valuing.

Canguilhem alone attempted to do the same thing as this inventor has, but the present invention does succeed in overcoming the issue of subjectivity by identifying the observer as the community as a whole.

Here a flow-chart type presentation follow. All tables of 08/575,936 are 100% correct but for the 0–10 (for 1–10) definition change.

I. Through the specially conceived, designed, below described and explained organic application of the science of statistical averaging, accurately sampling a constantly and factually representative cross section of a given community at a certain point in time (the United States 1999, for example) 08/575,936's General Survey #1 discovers each and every perceivable/detectable characteristic by such current society of a designated entity, such object of the investigation being "a passenger car," "an HMO," "a theory," "a dentist," "a work of fine art," "a governmental policy," or any other subject, good, service, professional, idea, thing, precept or principle, etc.

Only if we learn and quantify every understood attribute of a thing can we scientifically compare one entity with another. (Example: Unless we discover the precise communal dollar value of a remote electronic door opener versus daylight running lights, scientific automobile worth comparisons cannot commence.)

Except for this invention's setting forth and solving this challenge, accurate comparison of one thing with another would remain impossible.

The relevant math formula for Non-Subjective Valuing Step #1:

$E=f^1+f^2+f^3$ etc.

E=Entity f=factor (characteristic, attribute)

(E could be "a car," "a doctor," etc.)

(f could be "education," "reputation," etc.)

Non-Subjective Valuing© polls ask enough respondents nationally in terms of central tendency and sampling theory science accurately to represent the meaningful American population cross section, to identify each and every concievable characteristic of E, ("a car" or "a doctor") that matter in our society today.

By representative cross section, Non-Subjective Valuing© means an "exit-poll" type sampling, large and wide enough accurately to represent all Americans.

Sample survey question:

"When you contemplate "a new car," please check all characteristics listed below that are relevant to your consideration:"
☐ Make reputation
☐ Quality of workmanship
☐ Resale value
☐ Comfort
☐ Safety
☐ Prestige value
☐ Style
☐ Power and speed
☐ Owner satisfaction rating
☐ Ride quality -continued ☐ Handling ease
☐ Professional Reviews
☐ Consumer Reports and similar opinion
☐ Profit margin of the manufacturer
☐ Per mile cost of operation
☐ Quality of warranty
etc., etc., etc., then
"Please continue this list by naming all other characteristics you contemplate in addition to the above listed ones:"
☐ _____
☐ _____
☐ _____
☐ _____
☐ _____
☐ _____ etc.

At the conclusion of this survey, Non-Subjective Valuing© will have the complete current inventory of all properties of "a car," or 100% of what "a car" in our society consists of E=100% or 100 points or the full pie.

Illustration of the principle:

If members of our society are able to perceive an HMO to have 1467 relevant characteristics for instance, then for here and now, this invention will have uncovered the definitive answer to what an HMO is. (See FIG. 4 through 11).

It is (for now) 100% of its presently discoverable characteristics.

(Of course, a year or a week later such characteristics will change in number and also in their relative importance, due to man's normal, interminable progress). Change is built into this present invention. It forever reflects CONTEMPORARY societal value.

This is one important point the present invention brings to fore, generally missed by evaluators of things. (For example, coin-evaluation systems customarily concern themselves with luster, imperfections, etc., forgetting changing fashions, historical value, and a great number of other value-affecting factors without which current accurate worth-determination is impossible—for instance What is a specific silver coin worth in 1999 if it had been owned by J.F.K?).

In contrast, the present invention unearths ever-current societal value without prejudging what characteristics might be important, or to what relative value-affecting extent, at any given moment.

The dollar value judgment of a hypothetically ideally knowledgable society is instantly provided by the present invention of computer-assisted non-subjective valuing, simply revealing the imaginary, true dollar worth-consideration of the community as if it were perfectly informed about the probed entity.

Ask 100 people what an HMO is and they will all have a few (or many) ideas, but 1. virtually none of them will be able to tell you right away all what "an HMO" means to him or her, and 2. at the same time, the asked individuals will invariably insist that it is not possible to unearth all that an HMO is, because "it's different for everybody."

Nevertheless, the present invention teaches that it is possible, because if the survey is done according to the precise description presented within these specifications, all currently discoverable characteristics of an HMO can indeed be unearthed, and Non-Subjective Valuing© can say conclusively and with unquestionable authority that this is the 100% pie for an HMO in the here and now. Non-Subjective Valuing© perpetually quantifies/adds any newly discovered attribute, assuring the continuous accuracy of the system.

Non-Subjective Valuing© learns everything that society would like to know about a probed entity.

Example. Non-Subjective Valuing© ultimately will have the accurate statistical answer as to the average American's determination concerning which characteristic is more important to him to helping an ill person get well, the treating doctor's level of education or the physician's apparent verified inherent talent to care about his patient? FIG. 4, Step ●.

$$f = \frac{(f^1 x)(f' x)(f^3 x)}{3}$$

(Further, after the second general survey (see below) Non-Subjective Valuing© reveals by % that, on the average, precisely how relatively important each of these 1467 HMO characteristics currently are to our community.)

The Non-Subjective Valuing© procedure for doctors follow, to demonstrate the invention's value and versatility.

Consider the fact that CNN Headline News talked about the recent Massachusetts experiment of providing, for the first time in history, Physicians' Profiles. One thousand inquiries were received on the initial day the list was made available by the State Government.

And that list is an unranked list, with very limited use for the professional, and virtually no practical benefit to the layman.

Using the actual Massachusetts Physicians' Profiles elements (9) and adding the present invention's own considerable, value-affecting factors (41), let us pretend that the scientific analysis of the Non-Subjective Valuing© surveys produce the following WIP pie slices, or how the typical American in fact contemplates/allocates the relative importance of various qualities of a heart surgeon:

| 08/575,936 WIP Chart, | |
|---|---|
| Some worth-affecting considerations (Not in order of Importance) | Pie Slices |
| 1. Number of patients recovered (success rate) | 6.6%✓✓ |
| 2. Patient complaints | 6.1%✓✓ |
| 3. Criminal Convictions | 5.9%✓✓ |
| 4. Education & Training | 4.7%✓✓ |
| 5. Expertise of staff | 4.3%✓✓ |
| 6. General reputation in the community | 4.4%✓✓ |
| 7. Average time spent with patient | 4.3%✓✓ |
| 8. Board Discipline | 4.1%✓✓ |
| 9. Medical Society's Opinion | 3.3%✓ |
| 10. Consenusual opinion of fellow doctors | 2.3%✓ |
| 11. Consenusual opinion of current and past patients | 3.1%✓✓ |
| 12. Hospital Discpiline | 3.5%✓✓ |
| 13. Reputation among insurance companies | 2.6%✓ |
| 14. Profit margin of doctor's business | 2.7%✓ |
| 15. General Disciplinary Actions | 2.5%✓ |
| 16. Personality | 3.1%✓✓ |
| 17. Reputation as to care | 5.7%✓✓ |
| 18. Reputation as to power to cure | 2.5%✓ |
| 19. Average time spent with patient | 4.3%✓✓ |
| 20. Average time spent in waiting room | 1.4%✓ |
| 21. Prestigious location | 0.2% |
| 22. Convenient location | 2.8%✓ |
| 23. Expensive decor | 0.1% |
| 24. Demographics of patients | 0.3% |
| 25. Consenusual staff opinion | 0.6% |
| 26. Malpractice settlement payments | 0.9% |
| 27. Quality, age, extent & cost of in-office medical equipment | 1.1%✓ |
| 28. Staff to patients ratio | 0.7% |
| 29. Law suits filed against | 0.8% |
| 30. Law suits lost | 1.3%✓ |
| 31. Law suits pending | 1.1%✓ |
| 32. Extent, quality & necessity of ordered tests | 1.1%✓ |
| 33. Number of patients operated on | 0.3% |
| 34. Year in practice | 3.1%✓✓ |
| 35. Number of patients died during operation | 2.1%✓ |
| 36. Rating of hospital at which this doctor operates | 1.1%✓ |
| 37. Jury awards against | 1.1%✓ |
| 38. Professional Publications by the doctor | 0.8% |
| 39. Fellow doctors' complaints | 2.1%✓ |
| 40. Drug Enforcement Agency complaints | 0.4% |
| 41. Family life | 0.2% |
| 42. Ex-staff opinion | 0.4% |
| 43. Salaries to workers | 0.6% |
| 44. Personal habits/life style | 0.2% |
| 45. Personal philosophy | 0.8% |
| 46. Doctors' friends' opinion | 0.6% |
| 47. Popularity | 0.5% |

-continued

08/575,936 WIP Chart,

| Some worth-affecting considerations (Not in order of Importance) | Pie Slices |
|---|---|
| 48. Number of patients seen annually | 0.3% |
| 49. Partners | 0.2% |
| 50. Media opinion (from published articles) | 0.3% |
| Etc., etc., etc. | 100% (Please see FIG. 8-11) |

The current (and ever changing) Non-Subjective Valuing for Heart Surgeons® 08/575,936 Ranking List of 475 heart specialists in Massachusetts might look like this:

| | | |
|---|---|---|
| 1. Dr. Abraham Smith | 469 points. |
| 2. Dr. Steven Pullman | 453 points. |
| 3. Dr. Ilona Powers | 421 points |
| 237. Dr. Morton Schwartz | 102 points |
| 475. Dr. Iliad Hingus | 89 points. |

Such Non-Subjective Valuing© list is not the result of an ordinary plebescite, a consensual opinion of citizens, a compilation of expert opinion, or a popularity contest, either among the uninitiated, or the professionals. The method on which this list is based is novel and greatly useful.

A ranking-list provided by the present invention simply and accurately mirrors the relevant prevalent collective judgment as if the community magically and instantly knew everything it wanted to know about heart specialists.

These (continually shifting) figures are trustworthy and reliable: their independence and integrity cannot be reasonably questioned: they do not express anybody's opinion.

The probing user no longer has to (vainly and impossibly):

Rely on guesswork or his own intuition attempt to analyze 127,000 doctors' profiles, trying to manage (in this instance) over 4,000,000,000 correlations (127,000×126,999×300+)

consider just a non-professional friend's (or many such friends') opinions, ponder only the (usually conflicting) partial experts' opinions, contemplate the views of some familiar & trusted, yet necessarily biased doctors;

deliberate the credibility of self-promotion by the doctors themselves, weigh a hospital's prejudiced recommendation, reflect a lot of advice based on extremely limited information, deliberate a magazine's subjective ranking, or be limited to try to weigh any other single or combined subjective and unquantified opinion.

AN ILLUSTRATION OF WHAT THE PRESENT INVENTION DOES

This is what the computer's brains might look like as to one of the 50+ WIP-factors of the typical American, concerning heart specialists, for this illustration working with the fictitious number 4.4%–see WIP Charts.

| GENERAL REPUTATION IN THE COMMUNITY | |
|---|---|
| 10 = (reserved) | |
| 9 = 102% (+$2200) | (Of the $100,000 fee, |
| 8 = 101.5% (+$1650) | the typical patient |
| 7 = 101% (+$1100) | pays $4400 for this |
| 6 = 100.5% (+$550) | specific factor, $4400 |
| 5 = 100% (same as the average, NORM doctor) | being 4.4% of the |
| 4 = 99.5% (-$550) | average charge. |
| 3 = 99% (-$1100) | $4400: 8 = $550-per |
| 2 = 98.5% (-$1650) | rating step . . . ) |
| 1 = 98% (-$2200) | |
| 0 = (reserved) | |

0 and 10 are reserved, since the ultimate scale will be tailored according to the survey result analyses revealing the maximum amount society would generally pay for a "perfect" entity in any group. 0 will be calculated according to the lowest real quality pertaining to an entity group. For instance, the worth of the worst break quality in an existing new car will be assigned as the fictitious quality of the conclusively 0 rated automobile to unearth such car's societal value.

In other words, pretending that:

1. the intial survey series discloses that people pay $100,000 for the average surgeon for a heart transplant, (this fictitious doctor rates a "5" on all his qualities and charges $100,000 for this operation) and 2. the subsequent scientific poll/study combination reveals that specific heart specialist Dr. David Kovacs rates an "8" on the factor of "GENERAL REPUTATION IN THE COMMUNITY," for instance; then if all other 50+ factors were equal (and they never are, of course): the value of a heart transplant operation by Dr. Kovacs would be $101,650.

For a specific individual, for whom a doctor's general reputation in the community is less important, again using a fictitious number (2% WIP), this user's Non-Subjective Valuing for Heart Surgeons© "GENERAL REPUTATION IN THE COMMUNITY"—page might look something like this:

10=(reserved)
9=101%.
8=100.75%
7=100.5%
6=100.25%
5=100% (same as the average, NORM doctor)
4=99.75%
3=99.5%
2=99.25%
1=99%
0=(reserved)

This invention's calculation/logic in this instant is identical to the one preceding it, simply substituting 2% for 4.4%, or 2:8=0.25% per increment for this greatly simplified illustration of the invention's idea.

If the relevant Non-Subjective Valuing© scientific poll/study combination reveals that specific heart specialist Dr. John Calder rates a "3" on the factor of "GENERAL REPUTATION IN THE COMMUNITY," for instance; then if all other 50+ factors were equal (and they never are, of course): the value of a heart transplant operation by Dr. Calder, for this user, is $95,000 (see value table, supra)

After the Non-Subjective Valuing computer caclulates the WIP of all 50 or 500 factors, the emerging number is accurate and exact.

This invention also provides the dollar value for the respective services of doctors, as follows.

For example, if the hypothetical average heart specialist (the 100-point—NORM doctor, who rates a "5" on all 50 or 5000 value-affecting factors) charges $100,000 for a transplant operation, then the actual value of an identical operation by a doctor who accumulates a total of 104 points, is 4% more, or is w $104,000. The corporate or private customer can now compare the following three numbers:

Dr. John Smith:
1. To the hypothetical, ideally educated society (having optimum knowledge of heart specialists), a transplant operation by this physician is worth . . . $104,000
2. To you, the user, according to your specific WIP, the same operation by this surgeon might be worth . . . $130,000
3. This doctor's actual fee for this operation is . . . $80,000

Dr. Adam Taylor:
1. To the hypothetical society having optimum knowledge of heart specialists, a transplant operation by this physician is worth . . . $160,000
2. To you, the user, according to your specific WIP, the same operation by this surgeon is worth . . . $110,000
3. This doctor's actual fee for this operation is . . . $300,000

Etc., etc., etc. FIG. 3 through 11)

The Non-Subjective Valuing© research method is an essential, integral part and parcel of CIP 08/575,936, since the present invention not only teaches how to compare the true dollar values of similar entities with 100% credibility based on organically quantified points, but obtains living starting numerals through scientific averaging of a representative societal sample, discovering a given entity's every last existing relevant characteristic and all these attributes' a respective precise relative importance.

The present invention's design is all-encompassing, not short of airtight, because through its series of surveys, focus group and poll combination, it unearths every last currently discoverable quality of an entity.

When combined with the NORM concept, such completeness and finality ultimately results in the unraveling of the challenge of subjectivity.

For example, by comparison, the government-published national inflation rate figure is much less reflective of the country's price-escalation degree than when Non-Subjective Valuing© unearths the name of the best passenger car sold in America is reflective of that reality, because here both the starting numerals and the calculation process are immensely less contrived and are not at all arbitrary or biased.

The U.S. government (understand: interested politicians and benign and responsible yet unavoidably predisposed bureaucrats) periodically revises the number, kinds and relative importance of price fluctuations of selected items it examines and measures to pronounce the nation's official current rate of inflation figure.

In contrast, starting numbers for calculations in Non-Subjective Valuing© are not decided by benefiting politicians, experienced government officials in a vacuum, the inventor or by experts.

The decision here by the hypothetical ideally educated contemporary society means a momentous difference, because only when you begin to calculate utilizing unbiased figures are the results scientifically mirroring the collective's ideally accurate estimates.

Ultimately the Non-Subjective Valuing© method will be used to determine the official inflation figure too, as this method is non-prejudiced and is constantly faithful in discovering true value in any and all human endeavors.

II. Through the specially conceived, designed, below-described and explained organic application of the science of statistical averaging, accurately sampling a constantly and factually representative cross section of a given community at a certain point in time (the United States 1999, for example) the present invention's General Survey #2 discovers the precise, percentage-wise expressable relative importance of each and every perceivable/detectable value-affecting characteristic by such current society of a designated entity, such object of the investigation being "a passenger car," "an HMO," "a theory," "a dentist," "a work of fine art" or any other subject, good, service, professional, idea, thing, precept or principle, etc. (FIG. 4, Step ●)

III. The present invention's Survey #3 discovers the hypothetical dollar price of the fictitious unit in the given entity-group, which nonexistent unit is scientifically calculated to be exact average in all its characteristics. (FIG. 4, Step ●)

This is the NORM unit, the measuring yardstick of Non-Subjective Valuing©, expressed by 100%, or 100 points: represented in the present invention as a FULL PIE (FIGS. 5 through 11)

It will become clear on the following pages describing the relevant process that this invention, for the first time conclusively (and in seconds) answers the question historically thought to be unanswerable: What is something worth?

As far as the true worth of anything is concerned, price theories such as that "something is worth what somebody will pay for it," or that "the value of something relates to how much it costs to make," are made obsolete by the present valuing invention as far as the true worth of anything is concerned.

Due to the present Non-Subjective Valuing© invention, from here on in, the actual dollar value of something can be listed next to its price.

Fictitious numbers are used for the following illustration:

| World Wide Web Live, Interactive List of Clothes Dryers' Accurate Appraisal Company a licensee of Non-Subjective Valuing © Appraised for user John Smith July 14, 1999 | |
| --- | --- |
| Sears Heavy Duty Automatic Clothes Dryer, Model #S1999ACD | |
| List Price | $312.00 |
| True Value | $278.00 |
| Value to You | $249.00 |
| Maytag Heavy Duty Automatic Clothes Dryer, Model #M1999ACD | |
| List Price | $414.00 |
| True Value | $398.00 |
| Value to You | $448.00 |
| Etc. | |

True Value as figured by Non-Subjective Valuing© is what current American Society would say these particular dryers were worth if the community suddenly magically knew everything it wanted to know about dryers. The individual user figure, on the other hand represents the dollar number that the unique explorer would say that the probed dryer would be worth if he instantly had perfect information about dryers. FIG. 1 through 11.

And the price is the current listed market price of that dryer.

Through Non-Subjective Valuing©, among others, the following become possible:

1. Matching with each-other the actual values of all clothes dryers, and
2. Having the quantified ranking of all 134 available dryers from least over-priced to most-overpriced, best to worst, and so on.

CARS

Following the inquirer responding to the relevant quiz series of 8, 24, 300 or more prompts by the computer concerning certain facts about a probed used automobile (FIG. 12–23), for instance, the Non-Subjective Valuing© computer gives the user the particular selected target automobile's current dollar values on that day, at that hour, in that town, as follows:

(Fictitious numbers for illustration only)

Appraisal for John Smith

The blue 1987 Mercedes C230 you inquired about, at Washington, D.C., 6:30 P.M., Jul. 14, 1998:

|  | Market Price | True Value | Value to You |
| --- | --- | --- | --- |
| retail | $26,350 | $27,400 | $24,950 |
| wholesale | $14,200 | $14,700 | $13,500 |
| average trade in | $9,783 | $10,200 | $9,400 |
| outright-sale-to-a-dealer | $7,600 | $7,900 | $7,300 |
| private party or auction sale | $19,800 | $20,000 | $18,800 |

The Non-Subjective Valuing© computer compares all the quantified attributes of any member of a group to the imaginary unit in that group that is scientifically calculated to be exact average in all its attributes and its price, called the NORM. (FIG. 4)

Except for switching the value-effective factors, the invention works the same for homes, works of art, HMOs, new cars, banks, appliances, cities, environmental regulations, tooth pastes, or anything else.

The sky is not the limit, because Non-Subjective Valuing© can of course assess the value of the sky too, as long as it is defined in human terms, and that is all Non-Subjective Valuing© can do.

THE OBSERVER

Since the observer necessarily makes any evaluation subjective, Non-Subjective Valuing© overcame such subjectivity by limiting its evaluations to a specific homo sapiens community and only of entities collectively understandable by that human society, nothing more or less. (For instance, to a fish, the offside rule of soccer will forever remain incomprehensible.)

Non-Subjective Valuing© simply reveals all toothpastes' rankings, best to worst, in terms of today's collective values, by comparing all toothpastes with the fictitious NORM toothpaste on the natural, sociatelly verified/quantified points, the hypothetical NORM toothpaste (Non-Subjective Valuing©'s YARDSTICK) that is accurately calculated to be precisely average in all its qualities and its price.

Buyers (and sellers too, to a lesser extent) today are totally confused about the relative monetary values of toothpaste as they are about the true dollar worth of everything else.

Comparing only three 6 oz. toothpastes for this illustration:

| Name: | Manufacturer-Claimed Qualities: | Price: |
| --- | --- | --- |
| ■ Ultrabrite | Advanced Whitening Formula, Original Flavor, Whitening Fluoride | $1.89 |
| ■ Aquafresh | Tartar Control, Fights Cavities, Freshens Breath, ADA Accepted | $2.39 |
| ■ Aim | With Baking Soda, Great Tasting Gel, Anticavity Fluoride | $3.19 |

THE SKY IS THE LIMIT, NOT

Buyers and sellers can use Non-Subjective Valuing© to help them make a good deal.

Price is always between the negotiating parties, of course.

Non-Subjective Valuing© never provides the inventor's or anybody else's opinion, but solely the 100% objective, universally credible true value of the test car, target dryer, probed government program, politician, philosophy, or any other entity. (FIG. 4)

Non-Subjective Valuing© is much more exact and scientific than traditional buying guides, or any valuing system currently in existence on or off the Internet, because it unearths value, not price. (In fact, most current buying guides misleadingly identify price as a factor of value, by asking the consumer "how important price is to him," without adding the indispensable expression "all things being equal)."

Everybody readily concedes that there are toothpastes that are better than others.

We all get into trouble when we attempt objectively to rank them though, and must admit that there is no recognized authority on earth today that can tell us even approximately if the above three toothpastes are worth precisely what they cost.

How could we find out?

Through Non-Subjective Valuing©.

The reason the true dollar values of Ultrabrite, Aquafresh and Aim are not available is because today, in the pre-Non-Subjective Valuing© world, we do not know how to correlate them. Until Non-Subjective Valuing© there was not even a universally accepted subjective yardstick, let alone an objective one, with which to measure dollar value.

Price theories were never value theories since the "free-to-choose" philosophy erroneously assumed that if left alone, people ultimately choose the best product and service in spite of advertising, promotion and other obviously misleading devices.

Until this invention, we had no match rules for toothpastes, government programs, or airlines as there are in sports and law.

We know the rules of a basketball game, and can declare a winner following a match.

NATURAL RULES

UNWRITTEN LAWS, UNSPOKEN BUT STRICT AND CLEAR COMMUNITY STANDARDS

Non-Subjective Valuing© by the described invented methodology and process (FIG. 4) directly from the community uncovers all the existing unwritten yet definitely discoverable and quantifiable relevant current societal rules that in fact apply to and govern the value of any contemporary entity, including procedures, things, objects, goods and services, cars, doctors, government policies, toothpastes and so on.

Who is a good soccer player? Very definitely definable, because we know the rules of the game.

What is a good anything?

The present creation invented, perfected and within these specifications specifies and describes the methods and formulas ultimately 100% objectively to provide that judgment for any humanly conceived entity.

Non-Subjective Valuing© makes up no rules for any game whatever.

What are the rules of the competition for the best toothpaste? Which one is the gold medalist or 14th best toothpaste?

The name of the game is as follows:

If society knew everything it wanted to know about toothpastes, how would it then respectively value Ultrabrite, Aquafresh, Aim, and the others? Given ideal information, societal value determines the real current dollar worth or ranking of anything, including toothpastes.

If you, the user, suddenly, as if by magic, knew everything you wanted to know about toothpastes, how would you then rank the above three toothpastes, for example? (FIG. 4, Step ●)

The competition rules of the contest for toothpastes (or cars, or doctors) were not invented by this inventor, he only discovered:

what societal value really was, how accurately to unearth that communal worth, and then how to use it as a yardstick, plus how to instantly and easily provide the customer with the precise dollar value of any entity by scientifically calculating its exact, current collective worth (True Value), as well as its exact dollar value to the inquiring customer himself or herself. (True Subjective Value).

Using the toothpaste illustration:

●

Non-Subjective Valuing© employs a series of scientifically designed surveys to discover the basic starting numbers it employs for calculating communal (or true) worth.

●

Non-Subjective Valuing© scientific Survey #1 discovers what every one of the attributes are that are considered relevant to a toothpaste by current society. (For instance: health/medical benefits, taste, looks, feel, ease of handling the tube, brand name recognition/confidence, popularity, fashionableness, consensuses of dentists and health professionals, breath-freshener ability, cavity control capability, whitening proficiency, etc., etc., etc.)

●

Non-Subjective Valuing© accurate Survey #2 unearths precisely how relatively important (by respective percentages, denoted as sizes of the slices of the Worth Importance Point [WIP] pie) each such attribute is to a given community, for example: the United States, 1999)

Sample question to a representative sample of the population: "On the scale of 0–10, 10 being most significant, how important is the quality of taste to you in a toothpaste?" (For how the respective societal slice sizes of the pie are calculated, please see FIG. 4, Step ●)

●

The Non-Subjective Valuing© computer through a quiz asks the inquirer (could be a family, a corporation,the U.S. Department of State, a group or an individual, etc.) to enter the user's very own preferences to create the investigator's own, unique WIP pie. (FIG. 25)

Sample question to the user: "On the scale of 0–10, 10 being most significant, how important is the quality of taste to you in a toothpaste?" (For how the respective individual slice sizes of the pie are calculated, please see FIG. 4, Step ●)

●

Through the series of polls, surveys, focus groups, medical reports, individual dentists' consensus, ADA opinion, Commerce Department, Food and Drug Administration, and other relevant government and industry records, results, specifications, statistics, studies, reviews and published and commissioned independent test conclusions, etc., the Non-Subjective Valuing© computer ultimately has on its database filed all the true, quantified characteristics of all toothpastes and their respective prices. (Fictitious example for an attribute, such as whitening quality:

Ultrabrite 105%,

Aquafresh 102%,

Aim 89%, and so on, 100% being the Non-Subjective Valuing©—precisely calculated average whitening quality for all competing toothpastes.)

This method and procedure may be used to appraise an entity's value on less than on all of its characteristics (FIG. 24 specifically, and FIGS. 12–13, generally) for less than optimal results. Although the description of the present invention contains many specificities, and unique examples, these should not be construed as limiting the scope of the present invention but as merely providing illustrations of some embodiments of said invention. For example, by changing the relevant parameters, NORM, value-affecting elements, or employing no surveys or general worth-influencing factor constituents at all, calculations of monetary value may still be achieved using this method and procedure. Thus the scope of this invention should be determined by the appended claims and their legal equalents, rather then by the examples and other specifics given. Also, this invention is not intended to be restricted to any particular form of arrangement, or any specific embodiment disclosed herein, or any specific use, since the same may be modified in various particulars or relations without departing from the spirit or scope of the claimed invention shown and described of which the described constituting elements intended only for illustration and for disclosure of operative embodiments and not to present all of the various forms or modifications in which this valuing system might be embodied or operated. While the present invention is described in considerable detail in order to comply with the patent laws by providing full public disclosure of at least one of its forms, said description is not intended in any way to limit the broad features or principles of the present invention, or the scope of patent monopoly to be granted.

Non-Subjective Valuing© scientific studies discovered what are all the hypothetical attributes of the fictitious, exact average (100%) toothpaste, and if it existed, what that imaginary toothpaste's price would be. This is the NORM toothpaste, the yardstick for the toothpaste-race for the gold medalist toothpaste per Non-Subjective Valuing©.

On the scale of 0–10, this fictitious toothpaste rates an exact "5" on all its attributes.

Its whitening capability, breath freshening ability, and cavity control and so on are all exact average.

A simple example for organically determining the fictitious average or NORM toothpaste.

In our example, the respective prices for these 6 oz. toothpastes were $1.89, $2.39, and $3.19.

This means that their average price is $2.49.

This $2.49 is the price of Non-Subjective Valuing©'s 100%, YARDSTICK toothpaste.

This fictitious toothpaste is accurately calculated to be exact average in all its qualities and its price.

The 100% comprehensive scientific studies also provide Non-Subjective Valuing© precisely what a rating of "5" means respecting each quality of a toothpaste.

So we know now that if the 6 oz. toothpaste that is exact average in whitening ability, cavity control, tartar containment, etc., etc., etc., existed today, it should cost $2.49.

Once the Non-Subjective Valuing© computer is programmed on its database to contain the precise, scientifically discovered qualities of each real toothpaste, including Ultrabrite, Aquafresh and Aim, it can compare each with the NORM and express the plus or minus total difference in dollars and cents (FIG. 4).

Due to the extensive scientific research and survey-series, the Non-Subjective Valuing© computer also learns precisely how relatively important each quality of a toothpaste is to the American people, and (due to the real-time responses of the individual exploring customer), the exact respective, relative weigh allocation of these qualities to the inquiring drug store chain or prospective individual buyer himself or herself.

To make this duplicative illustration of the Non-Subjective Valuing© process easier to comprehend, let us pretend that a toothpaste has only three qualities that matter, and that through the science of statistics it is revealed that to American society, on the average. these qualities are important to the following degrees:

taste=55% the opinion of the American Dental Association=25%, and brand name confidence=20%.

Now as to the true characteristics of the three brands of 6 oz. toothpaste, let us pretend that accurate, 100% unbiased research (as specifically described within this CIP application and the flow chart represented by FIG. 4) discovers that ultimately they measure up to or compare with the 100% average (NORM) toothpaste as follows:

|  | Taste | ADA Opinion | Name Recognition |
| --- | --- | --- | --- |
| Ultrabrite | 90% | 110% | 85% |
| Aquafresh | 110% | 95% | 107% |
| Aim | 80% | 115% | 90% |

This is how the Non-Subjective Valuing© computer then calculates the true respective values of these 6 oz. toothpastes:

Calculated price of the fictitious 100% toothpaste that is average in taste, ADA Opinion and Name Recognition Factor is $2.49. Of this, American society pays as follows:

55% for taste=$1.37,

25% for ADA Opinion=62 cents, and

20% for the factor of Brand Name=50 cents.

The Measuring Up Translated Into Dollars and Cents:

Ultrabrite 90% of 55%=$1.23

110% of 25%=68 cents

85% of 20%=43 cents, or Ultrabrite's True Value is $2.34.

Aquafresh 110% of 55%=$1.51

95% of 25%=59 cents

107% of 20%=54 cents, or the True Value of Aquafresh is $2.64.

Aim 80% of 55%=$1.10

115% of 25%=71 cents

90% of 20%=45 cents, or the True Value of Aim is $2.26.

Again, once the survey series provides the authentic starting numerals, these resulting calculation results are not somebody's opinion.

These are the current respective societal dollar values for these toothpastes.

If the community knew everything it wanted to know about toothpastes, (ideally informed society), this is exactly what they would say these toothpastes are respectively worth.

Figure 7:
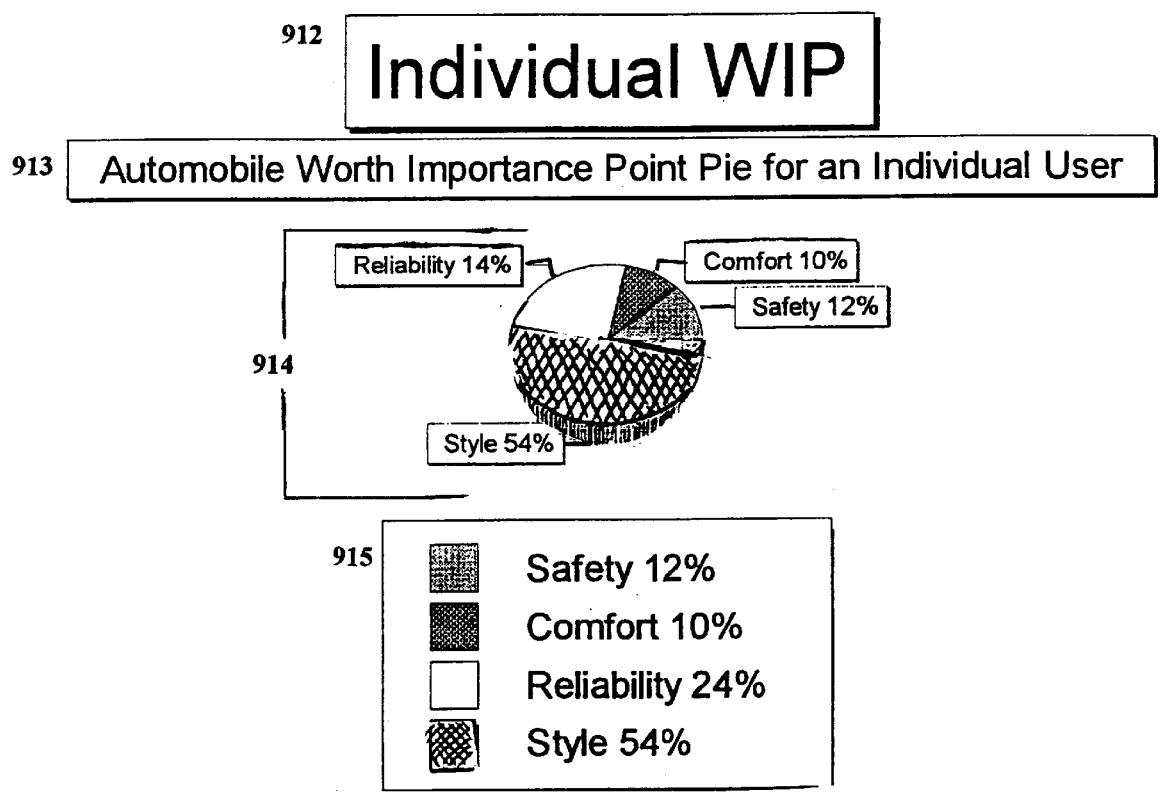
FIG. 7 pictures the mold of a Non-Subjective Valuing© individual PIE, using the hypothetical qualities of "cars," relating to Step ● of FIG. 4.

Of course, to a specific inquiring individual, the Non-Subjective Valuing© computer will also provide his very own monetary values based on his unique preference input. (FIG. 7)

For this illustration continuing to pretend that there are only three value-affecting elements considered in a toothpaste, supposing this particular unique individual responds to the prompts by the Non-Subjective Valuing© computer as follows:

"On a scale of 0–10, 10 being most important, how significant is the quality of taste for you in a toothpaste?" Say an individual chooses "8"

"Regarding a toothpaste, on a scale of 0–10, 10 being most important, for you, how consequential is the opinion of the American Dental Association?" Say "7" is selected. and "Considering toothpaste, on a scale of 0–10, 10 being most important, how critical is it to you, whether you have confidence in the brand name of the product?" Say the choice happens to be another "7"

8+7+7=22=100%

As we learned, the calculated price of the fictitious 100% NORM toothpaste that is average in taste, ADA Opinion and Name Recognition Factor is of course $2.49. Of this, our particular explorer is willing to spend money as follows:

8: 0.22=36%=90 cents for Taste;

7: 0.22=32%=80 cents for ADA Opinion, and

7: 0.22=32%=79 cents for Brand Name Value.

The relevant Non-Subjective Valuing© math in view of the scientific facts:

|  | Taste | ADA Opinion | Name Recognition |
|---|---|---|---|
| Ultrabrite | 90% | 110% | 85% |
| Aquafresh | 110% | 95% | 107% |
| Aim | 80% | 115% | 90% |

Therefore for this user:
Ultrabrite 90% of 90 cents=81 cents
110% of 80 cents=88 cents
85% of 79 cents=68 cents, or Ultrabrite's value to this investigator is $2.37
Aquafresh 110% of 90 cents=99 cents
95% of 80 cents=76 cents
107% of 79 cents=85 cents, or the value of Aquafresh to this user is $2.51
Aim 80% of 90 cents=72 cents
115% of 80 cents=92 cents
90% of 79 cents=71 cents, or the value of Aim to the present explorer is $2.35

So the toothpaste-list the Non-Subjective Valuing© central computer would virtually instantly produce for this particular individual's consideration would look like this:

[except that
it would instantly rank all toothpastes sold in the land, and list them in order of true value, or value to this user, or actual price, absolute savings, relative savings, absolute best-to-worst regardless of price, best for your teeth per the ADA, etc., etc., etc., according to the user's wishes, and
the list would be provided after the Non-Subjective Valuing© computer will have considered not three but all three hundred+ of all the toothpastes' quantified analogous characteristics]:

|  | Price: | True Value | Value to You |
|---|---|---|---|
| Ultrabrite | $1.89 | $2.34 | $2.37 |
| Aquafresh | $2.39 | $2.64 | $2.51 |
| Aim | $3.19 | $2.26 | $2.35 |

(the above list is of course 100% fictitious, for illustration only)

It turns out in this imaginary example that generally the most valuable toothpaste is Aquafresh, and the same brand happens to be worth the most to this particular user too.

However, the most money is saved on Ultrabrite, etc., etc., etc.

Addressing a possible objection to this invention and/or its name of saying: "No matter what, these evaluations are ultimately subjective," this objection would be valid only if the science of inductive statistics, accurate sampling, and central tendency mathematics are considered biased techniques.

In other words, if it were truly impossible conclusively to declare a winner in a boxing match by points, then to that same extent Non-Subjective Valuing© too is admittedly subjective.

If we accept no rules of law, rules and measurements and declare that for instance under no circumstances can a jury be objective, then Non-Subjective Valuing© too is necessarily biased to the same extent.

But that would mean that human beings could never ever objectively value anything at all, and objective truth could not exist.

But it does, although only relatively to our communal, or collective perception.

In the present invention, our optimally informed society is the observer.

RELATIVITY

Here and now, a man whose height is 6'8" is considered tall.

That is what we call tall.

He is generally considered tall in our society today, no matter if on another planet he would be considered a midget, and no matter if there are some persons who are much taller.

What the concept of "tall" means is also measurable by this invention.

That is all Non-Subjective Valuing© does: it evaluates entities on the average in terms of our current society, not some other, unknown circumstances. This invention has nothing to do with poll conclusions such as when a television news program announces: "According to our survey, 76% of Americans think women should be on the battle-field fighting alongside men" or similar pronounced inferences of unquantified measuring.

The media simply refers to a totally prejudiced, meaningless poll in comparison with a value-judgment provided by Non-Subjective Valuing©.

Non-Subjective Valuing© tells you what Americans would think about a specific thing if they knew everything they wanted to know about it, as opposed to today's polls asking people inevitably loaded questions about, things they know very little or nothing about and request that they comment on them in a vacuum, then publicize the result as if it meant anything at all.

It does not.

If society were ideally informed about toothpastes, how would it rank them then?

If people would know all the related, quantified ramifications they desired concerning "women on the battlefield," (or any other probed subject) including how relatively important is each and every discoverable relevant value-effecting factor to them and to society, that would be voting intelligently. Today we must decide in the dark.

Ideally informed simply means: (and this is an important Non-Subjective Valuing© definition and claim)

the community would know as much about the probed entity (thing, service, concept, etc.) as it wanted to know about it.

That is the measure and the Non-Subjective Valuing© definition of "ideal information."

It is not the inventor, not the government, not experts, not anybody but an ideally informed people itself that initially informs Non-Subjective Valuing© what it wants to know about something in the first place. (FIG. 4, Step ●)

Ultimately then this invention instantly and magically provides us with the dollar value mirroring society's judgment as if the community had ideal information.

Non-Subjective Valuing© solves the problem of asymmetric information in the marketplace, and may be the most significant consumer tool in the spirit of FREE TO CHOOSE since the birth of Capitalism.

In other words, in addition to a certain entity's retail and wholesale prices, the present invention provides the user that entity's scientifically calculated true communal, or collective dollar value, as well as its accurately measured true personal monetary value unique to the inquirer.

Non-Subjective Valuing©'s unobviousness is easy to prove: while there are a great number of biased and partial shopping guides on the Internet, there is not a single application that independently values anything at all.

To the question: What is something worth?—the present invention provides the answer that eluded man until now.

Non-Subjective Valuing© for the first time ever, does overcome the obstacle of subjectivity and allows the user (buyer, seller or third party individual or business) accurately to compare the dollar worth of something both with the current dollar value/ranking of others in its group and also its own actual value with its own market price.

PRICE AND VALUE

The definition of NATURAL PRICE by Adam Smith was the fictitious monetary value of an object in a perfect (nonexistent) world that could not be (then or now) calculated or obtained by society.

All other price theories and philosophies since then, including that of the Chicago School and Milton Friedman, inexplicably but stubbornly assumed (in spite of overwhelming evidence to the contrary) that in virtually every area of life, people know what they are doing, and that eventually in a free market the best product, idea, food, shopping center, book, religion, medicine, method of transportation, environmental policy, music, government procedure, politician, department store, toothpaste or service, etc. succeeds.

In contrast to conclusions of price theories, TRUE VALUE in Non-Subjective Valuing© represents accurately calculated and instantly furnished monetary worth of something in the real world, provided suddenly ideal information as desired by society were, as if by magic, universally credibly identified and comprehended by the community.

Here, the laymen, the majority-in-the-dark, the amateurs do not determine an entity's real value, although they may set its market price.

Market price is customarily determined by the seller (typically somewhat knowledgable about the product about to change hands) o the buyer (traditionally in the dark about the true value of a new car or other entity except for his own guesswork and intuition its wholesale and retail price, what rumors he heard about the entity from other laymen, what he read about the entity in specialty publications listing unquantified, hard-to-comprehend technical specifications and statistics (and therefore the entities are thus comparable only if they were all identical but for one single component)

to what extent he was impressed by relevant self-serving advertisements, what he read in necessarily opinionated or biased news media reviews, what he perceived in inevitably selective and partial Consumer Reports, J. D. Power, or IntelliChoice type of announcements and views, and other similarly fundamentally prejudiced, partial, unreliable and unquantified information, and so on.

Until the present Non-Subjective Valuing© invention we have been without a reliable standard compass or independent, universally credible yardstick when it came to exactly what a specific new car, or a unique 6 oz. toothpaste or anything else was really monetarily worth:

in terms of actual community standards or in terms of the user's own preferences.

Quick example: How many people today know precisely how comparatively important the quality of safety is to him in a new passenger car, relative to competing characteristics such as an automobile's comfort, style, speed, fashionableness, make-reputation, per mile cost of operation, passenger satisfaction, roominess, quality of warranty, gas mileage, and the other 300 considerable qualities?

And does anyone know by what respective percentages a Ford is safer or slower or more comfortable than a Saab? This invention instantly manages 8,000,000 such correlations in case of new cars for example.

The Non-Subjective Valuing© computer answers this question:

How would our society rank the 700 USA HMOs if the community suddenly knew everything it wanted to know about all of them?

Another example involving automobiles.

Say a user (person or company) rates the following attributes to be important to this observer to these respective ratings, 0–10, 10 being most important:

Safety . . . 6

Style . . . 8

Reliability . . . 9

Prestige . . . 3

Since a car always consists of 100% of its currently discoverable qualities, and we know that the fictitious exact average car sells for $22,000, then this invention is able to discover this unique entity's WIP and the corresponding dollar values, as follows:

6+8+9+3=26.

26=100%.

9 represents 35% (9: 0.26=34.62)(Reliability)($7700)

8=31% (Style)($6820)

6=23% (Safety)($5060)

3=11% (Prestige)($2420)

In such a case, for instance, a car that is very prestigious but rather unreliable, will have a lower dollar value to this user, commeasurate with his particular desires.

As a result, he might choose the automobile that is closest in matching his unique WIP pie.

This invented Non-Subjective Valuing© system automatically expresses the respective dollar worth of all cars according to this specific customer's wish list as well as in terms of American society, for an easy, comprehensive, universally credible comparison table that includes the four comparable dollar numbers:

actual $ price of the car, dealers $ invoice,

True $ Value and $ Value to You, the User.

When it comes to so called "incorrigibly subjective" factors, the present invention uses focus groups to reveal the "style" factor in our society, on the average, as the starting numeral for calculations, using the $\overline{X} =$ $$\frac{\sum FX}{\sum F} = \frac{\sum FX}{N} = \frac{(20)(4)+(40)(5)+(30)(6)+(10)(7)}{100} = \frac{530}{100} = 5.30$$

formula.

Fictitious comparison of a 1998 Ford Taurus SHO with a 1998 BMW528i in terms of the above, unique customer's WIP Pie:

Since we pretend for this example that accurate analyses of the Non-Subjective Valuing© Statistical Research Series, including scientific sampling and using polls, focus groups, surveys, etc., etc., etc., revealed that the Ford Taurus SHO rates as follows, the depicted percentages representing respective divergences from the analogous average (5=100%) quality: (Note: for this portrayal all fictitious figures are used and the word "style" represents contour)

Safety . . . 125%,

Style . . . 140%,

Reliability . . . 150%,

Prestige . . . 10% (minus 90%);

and the BMW528i measures up like this:

Safety . . . 135%,

Style . . . 90% (minus 10%),

Reliability . . . 145%,

Prestige . . . 500%;

then since the fictitious NORM car that is average in price turns out theoretically to cost $22,000, all its qualities being 100% (accurately calculated fictitiously average), including safety, style, reliability and prestige, then for this customer these are the respective values for these cars:

Ford Taurus SHO safety calculation based on 23% importance factor.

$5060 is paid for average safety by this customer.

The Taurus' safety however is 25% better than that of the average car.

Therefore $1265 (25% of $5060) must be added to the value of the Ford to obtain the safety value expressed in dollar terms.

Results of analyses of the focus groups, etc., etc., etc., reveal that the new Taurus' style is generally viewed as being 40% better than the analogous feature of the average car.

Since style (design, shape) matters to 31% to this customer, 31% of $6820, or $2114 must be added to the value of the Taurus concerning its dollar-expressed style value.

Average reliability is revealed to cost $7700 to this customer. The Taurus is 50% more reliable than the average car. Add $3850 to its value on this count.

Finally, for this example, we deal with the quality of Prestige. The computer figured out that based on his responses to the Non-Subjective Valuing©-questionnaire, this user happens to pay $2420 for average status-symbol quality, and the Ford having in fact a 90% negative value there, we deduct $2178 from the total value of this car for this user. (90% less than $2420)

So for this individual user, the 1998 Ford Taurus SHO is worth
$5060
$1265
$6820
$2114
$7700
$3850
−[$2178]

Total Non-Subjective Valuing© Value of the Ford Taurus SHO to This User . . . $24,631

Compare now the value of the BMW528i in this customer's terms:

BMW528i safety calculation based on 23% importance factor.

$5060 is paid for average safety by this customer.

The BMW528i' safety however is 35% better than that of the average car.

Therefore $1771 (35% of $5060) must be added to the value of the BMW528i to obtain its safety value expressed in dollar terms.

Results of analyses of the focus groups, etc., etc., etc., reveal that in current society the new BMW528i's contour is generally perceived to be 10% worse than that of the average car.

Since style (form) matters to 31% to this customer, 10% of $6820, or $682 must be deducted from the value of the BMW528i concerning its dollar-expressed style value.

Average reliability is revealed to cost $7700 to this investigator. The BMW528i is 45% more reliable than the average car. Add $3465 to its value on this count.

Last, for this illustration, we deal with the quality of Prestige. This user happens to pay $2420 for average status-symbol quality, and the BMW528i having in fact a 500% plus value there, we add $12,100 to the total value of this car.

So for this individual user, the 1998 BMW528i is worth
$5060
$1771
$6820
−[$682]
$7700
$3465
$2420
$12100

Total Non-Subjective Valuing© value of the BMW528i to this user . . . $38,654

In other words, the present invention unearths from the series of inquiries exactly how relatively important (by percentage) each quality of the probed entity is to society ("communal" WIP pie).

sf=survey-discovered rating of specific factor w%=worth value, expressed in percentages $$f^1 w\% = \frac{(sf^19)+(sf^17)}{2} = 8$$

(expressing the survey-discovered average rating number for a specific factor)

B. $8f^1 w\% = (sf^1 8)+(sf^2 2)+(sf^3 4)+(sf^4 7)+(sf^5 3)=24=$ 100% of pie

100%=100 points

100%=0.24 into 8=33.3%

2=8.3%

4=16.6%

7=29.2%

3=12.5%

This having nothing to do with the prices of these automobiles.

Price is always between buyer and seller. What good is such a list then?

For openers many inquirers will want to know the real dollar values of all $20,000 cars, for instance.

This system lists all cars in order of their respective true monetary value (FIG. 4), such as the winner among $20,000 cars might be the $20,000 car that is really worth $25,500, and at the bottom of the inventory the user could find listed an automobile priced also $20,000, but really worth $17,200.

3. The Non-Subjective Valuing© Survey #3 discovers the hypothetical dollar price of the fictitious unit in the given entity-group, which nonexistent unit is scientifically calculated to be exact average in all its characteristics. (FIG. 4, Step ●)

This is the NORM unit, Non-Subjective Valuing©'s measuring yardstick, expressed by and being equivalent to 100%, or 100 points: represented in the present invention as a FULL PIE.

Non-Subjective Valuing© unearths from the series of inquiries exactly how relatively important (by percentage) each quality of the probed entity is to the normal citizen ("communal" WIP pie).

sf=survey-discovered rating of specific factor w %=worth value, expressed in percentages $$f^1 w \% = \frac{(sf^1 9) + (sf^1 7)}{2} = 8$$

(expressing the survey-discovered average rating number for a specific factor)

B. $8f^1 w \% = (sf^1 8) + (sf^2 2) + (sf^3 4) + (sf^4 7) + (sf^5 3) = 24 = 100\%$ of pie 100%=100 points IV. Now, all true, verified and socially accurately quantified characteristics as well as their individual respective wholesale and retail prices all members of the selected test group are filed on the Non-Subjective Valuing© computer's database.

There is no question in Non-Subjective Valuing© that if car A has a verified top speed of 140 mph, and if the average (NORM) car has a calculated top speed of 100 mph, then car A is better than the average respecting this quality exactly by 40%, given the fact that all other things being equal, on the average, faster is better. (This is a mathematically simplified example.)

This "40%-better" determination is not a guess and represents no arbitrary number.

In the present invention, precisely what the dollar value of this "40%-better" fact is, in turn is again not the inventor's judgment, expert opinion, consensus of professionals, or some other consensus, a guess, the result of a plebescite, the outcome of traditional popularity contests, the consequence of an ad hoc numbers game, the conclusion of a simple poll, or astrological study, or any combination thereof.

Due to the invented, described, all-encompassing applied research method set forth in FIG. 4, this invention ultimately simply discovers precisely how many dollars this scientifically calculated percentage difference in top speed is currently communally worth. The same with all other 300 or 5000 attributes.

Since through the employment of this invention's specific series of survey/research-method of scientific sample/averaging there are not (and cannot be) any unquantifiable characteristics, and since every last characteristic of every car (or any other entity) is quantifiedly filed on the central computer's database, there is no doubt that the quantified comparison of a target car (or other entity) to the NORM car (or other NORM entity) obviously results in the Non-Subjective Valuing© computer being able precisely to calculate the true current societal dollar value or ranking of any unique automobile, HMO, Environmental Policy, or what have you.

The present invention accurately calculates 100% of the nature & value (all its attributes and its price) of the exact average (NORM) unit, (car, doctor), as follows:

P=price

E=Entity (doctor, car, etc.)

AP=average price (if car A costs $30,000 and car B costs $20,000, their average price is $25,000)

AC=average characteristic (example: top speed: if car A has a top speed of 120 mph and car B's fastest velocity is 110 mph, their average maximum speed is 115 mph)

$$\text{I. } P = \frac{(E^1 \$) + (E^2 \$) + (E^3 \$) + (E^4 \$)}{4} = AP$$

$$\text{II. } AC = \frac{E^1 \text{mph} + E^2 \text{mph} + E^3 \text{mph} + E^4 \text{mph}}{4} = AC(\text{max. speed})$$

V. The individual or corporate explorer enters his responses to the Non-Subjective Valuing© computer's questions concerning the customer's own preferences, (FIG. 4, Step ●) similarly creating a second PIE (in addition to the societal pie), such second pie reflecting the preferences of the individual user. We now have two pies, the first reflecting the preferences of the average member of society, the second one, those of the individual explorer.

The respective resulting dollar-value numbers concerning the probed entity produce the monetary figures as if society and the individual user were both instantly perfectly educated as to the test object, courtesy of Non-Subjective Valuing©.

Initial Survey Questionnaire Specimen.

(Propounded to representative population sample, referenced in FIG. 4, Steps ●, ● and ●.)
"Please rate the following passenger car characteristics as follows:

-continued

Column 1: How important is this attribute to you?  ☐

Column 2: How important do you g u e s s this attribute might be to the average American? (Your g u e s s as to what the final average number will be, concerning this attribute after Non-Subjective Valuing © analyzes/computes the answers by all respondents?)  ☐

Non-Subjective Valuing © Rating guide:

10 = essential (nonnegotiable, critical quality)
    9 = extremely significant
    8 = very important
    7 = important
    6 = of more than average moment
    5 = of a v e r a g e (normal) portent
    4 = of less than average importance
    3 = of little consequence
    2 = of very little moment
    1 = almost negligible
    0 = of no importance whatsoever

| Your Own "Level Of Importance" Rating ↓ | Your g u e s s as to how important this property will turn out to be to the average American ↓ |
|---|---|
| ☐ | ☐ |

(Abbreviated list for illustration purposes only)

1. Style.
(Please consider and include in this category image, design, esthetics, size, looks, lines, impression, fashionableness, expression, being fashionable and "with it," being "one-up," individuality, ego, conception, prestige-value, inside and outside layout, functions, aerodynamics, ergonomics, status symbol, how it makes you "stand out" or appear "unique" "special" or "different," or "better," or more sexy, desirable, or how much F U N, level of self-satisfaction & pride owning that car represents, etc.)

☐    ☐

2. Reliability.
(Includes consensual opinion of mechanics' and specialists', number of complaints, customer satisfaction ratings, professional automobile publications' reviewers' & critics' consensus, expected longevity and repair frequency, factory workers' opinion who build ths car, towing and breakdown frequency, NHTSA stats, etc.)

☐    ☐

3. Safety.
(includes crash tests, professional construction analyses, safety equipment quality and quantity, environmental advantage (ypur conscience and health), side crash protect, air-bags number, quality, reliability & effectiveness, belt adjustors, child seat, bumper strength, tires' quality, steering, engine power, total weight, maneuverability, occupant injury/fatality statistics, theft rating, NHTSA stats, etc.)

☐    ☐

4. Driveability.
(includes engine power, breaks' efficiency, speeds (off the mark, top, passing), acceleration, maneuverability, parking ease, turning cycle, agility, feel, response, transmission, suspension, roadworthiness, visibility (side, front, back, fun to drive, etc.)

☐    ☐

5. Comfort.
(includes your experience with the dealer, (attentiveness, friendliness, proximity, level of attention and professionalism, reputation, speed and efficiency of repairs, confidence, standard factory installed extras, incl. cooling systems, driving range, instrument panel, comfort of seats, ease of getting in and out, facility of operation, ride quality, suspension, quiteness, availability of parts, number of dealerships, etc.)

☐ ☐

6. Roominess.
(includes driver's and passengers' legroom, headroom, passenger number and cargo room, configuration, etc.)

☐ ☐

7. Per Mile Cost of Operation.
(includes gas consumption, expected repair, parts and labor costs, warranty quality, insurance premiums, normal service/maintenance/upkeep, cost and frequency, etc.) ☐ ☐

8. Reputation of Manufacturer. ☐ ☐

9. Resale Value. ☐ ☐

10. Workmanship.
(includes mechanical/technical and interior/exterior quality) ☐ ☐

11. IF YOU WERE MAKING $40,000 PER YEAR, WHAT IS THE MAXIMUM AMOUNT OF MONEY YOU WOULD PAY FOR A 1999 NEW PASSENGER CAR IF YOU DETERMINED IT TO BE "PERFECT" IN EVERY WAY?   $_____   $_____

↗ You    ↗ Your guess as to the $ number the average American will mark here!

12. IF YOU WERE MAKING $1 MILLION PER YEAR, WHAT IS THE MAXIMUM AMOUNT OF MONEY YOU WOULD PAY FOR A 1999 NEW PASSENGER CAR IF YOU DETERMINED IT TO BE "PERFECT" IN EVERY WAY?
$_____   $_____

↗ You    ↗ Your guess as to the $ number the average American will mark here!

(The responses to 11. and 12. above, serve to establish the value of a "10" rating, while the value of a "0"-car rating will combine the values of the lowest actual distinctive specifications in the group. Example, if the car with the worst top speed has a maximum velocity of 100 mph, and the car with the weakest breaks can stop 60 mph-0 in 200 feet, then the value of these (and all the other lowest existing) attributes will be assigned to the "0"-rated car concerning all its hypothetical characteristics, its sum true dollar value equalling the total of the minimum established values. "0" is only a designation. It stands for the lowest actual spec in the group. The figure "0" is never used in calculations, only the number that it stands for. ("0" denotes the worst possible top speed in the group, or 100 mph . . . in this example)

Sample (Partial) Weight Importance Point
Allocation Table for Non-Subjective Valuing
Illustration (using cars)

ABS (4 WHEEL) 0.3%
ABSOLUTE FUEL ECONOMY 1.2%
ACCELERATION 1–60 MPH 0.03%
AIR CONDITIONING 0.9%
AIR BAGS 0.55%
ALARM SYSTEM 0.4%
ALLOY WHEELS 0.1%
AM/FM RADIO 0.9%
ARM REST 0.1%
ARS (ACCELERATED SLIP CONTROL) 0.2%
AUTOMATIC HEADLIGHT WASHERS 0.1%
AUTOMATIC CLIMATE CONTROL 0.3%
AUTOMATIC PARKING BREAK RELEASE 0.2%
AUTOMATIC LOAD LEVE 0.2%L
AUTOMATIC SEAT BELT FUNCTION 0.2%
AUTOMATIC CLEAN LENSE HEADLIGHTS 0.1%
AUTOMATIC TRANSMISSION 2.9%
AWARDS (MAGAZINES, PROFESSIONAL ORGANIZATIONS, ETC.) 0.3%
BATTERY/ALTERNATOR GAUGE 0.1%
BODY CHROME TRIM 0.1%
BREAKING ABILITY 1.7%
BUCKET SEATS 0.7%
BUILT IN CUP HOLDERS 0.3%
BUILT IN COIN HOLDERS 0.1%
BUMPERS QUALITY 0.3%
CAR DESIGNERS' CONSENSUAL OPINION 0.7%
CARGO SPACE 1.2%
CARPET QUALITY 0.4%
CASSETTE PLAYER 0.5%
CD PLAYER 0.1%
CEILING COVER QUALITY 0.4%
CELLULAR TELEPHONE 0.4%
CIGARETTE LIGHTER/ASHTRAY 0.2%

CLOCK 0.6%
COLANT TEMPERATURE GAUGE 0.4%
COLOR KEYED EXTERIOR DECORATION 0.2%
CONSENSUS OF INDUSTRY INSIDERS' OPINION 1.5%
CONVERTIBLE 0.0%
CONVERTIBLE IMITATION TOP 0.1%
CORNERING ABILITY 0.8%
CRUISE CONTROL 0.2%
DAYLIGHT AUTOMATIC SAFETY RUNNING LIGHTS 0.1%
DIESEL ENGINE 0.0%
DOOR OPERATIONS EASE/SAFETY 0.3%
DRIVING RANGE (W/O REFUELING) 1.1%
EASE OF GETTING IN AND OUT OF CAR 0.5%
ELECTRONIC TRACTION SYSTEM 0.1%
ENVIRONMENTAL IMPACT RATING 0.2%
EXTERIOR NOISE LEVEL 0.5%
FAHIONABLE STYLE 1%
FILTERED VENTILATION 0.2%
FIRST AID KIT 0.1%
FOREIGN MADE 0.2%
FOUR WHEEL DRIVE 0.0%
FRONT HEADRESTS 0.1%
FRONT WHEEL DRIVE 0.5
FULL SIZE SPARE TIRE 0.1%
GAS TYPE 0.2%
GAS CAP LOCK, REMOTE/QUALITY 0.1%
GAUGES (NUMBER/CLARITY, GENERAL) 1%
GENERAL COMFORT FACTOR 1.2%
GLOVE BOX SIZE 0.1%
HAULING POWER 0.6%
HEATED SEATS 0.1%
HEATED WINDOWS 0.1%
HEATER 1.0%
ILLUMINATED VISOR MIRRORS 0.1%
INSIDE NOISE LEVEL 0.7%
INSTRUMENT PANEL EASE OF OPERATION & ACCESSABILITY 0.7%
INSURANCE COSTS 1.3%
INTEGRATED CHILD SEAT 0.5%
INTERIOR SPACE 2%
INTERMITTENT WIPERS 0.6%
JACK 0.1%
LEATHER WRAPPED STEERING WHEEL 0.1%
LEATHER SRAPPED SHIFTER 0.1%
LEATHER SEATS 0.44%
LEGROOM-BACK 0.8%
LEGROOM-FRONT 0.1%
LIGHTS INSIDE 0.2%
LONGEVITY (PROJECTED) 3.4%
LUGGAGE RACK 0.1%
LUMBAR SUPPORT 0.2%
MAP LIGHT 0.1%
MAP POCKETS 0.1%
MOON ROOF 0.1%
NHTSA CRASH TEST RESULTS 0.3%
NUMBER OF SPEAKERS 0.1%
NUMBER (1,2,4,6,8) AND QUALITY OF AIRBAGS 1.3%
NUMBER OF SPEAKERS 0.1%
OIL PRESSURE GAUGE 0.1%
OIL LEVEL GAGE 0.2%
OPERATING COSTS (PER MILE, INCL. REPAIR AND MAINTENANCE) 1.7%
OTHER PEOPLE'S OPINION 1.3%
OUTSIDE TEMPERATURE DISPLAY 0.1 %
OUTSIDE NOISE LEVEL 0.8%
PADDED VINYL TOP 0.2%
PAINT QUALITY 0.6%
PAINT DECAL 0.1%
PARALLEL PARKING EASE 0.5%
PARTS AVAILIBILITY FACTOR 0.4%
PASSENGER SIDE OUTSIDE REARVIEW MIRROR 0.1%
PASSING SPEED/POWER 0.8%
POPULARITY OF MODEL IN YOUR AREA 0.3%
POWER LUMBAR ADJUSTERS 0.1%
POWER SEATS (DUAL) 0.3%
POWER WINDOWS 0.4%
POWER DOOR LOCKS 0.2%
POWER TRUNK OPENER 0.2%
POWER REAR WINDOW OPENER 0.1%
POWER HATCH BACK OPENER 0.1%
POWER MIRRORS 0.2%
POWER ANTENNA 0.1%
POWER BREAKS 0.8%
POWER MOONROOF 0.1%
PRECISION STEERING 0.4%
PREMIUM SOUND 0.2%
PREVIOUS OWNERS' OPINION (OF SAME OR CORRESPONDING PREVIOUS MODEL) 0.9%
PROFESSIONAL REPAIRMEN'S CONSENSUAL OPINION 1%
PROGRAMMABLE VARIABLE ASSIST POWER STEERING 0.1%
QUALITY AND NUMBER OF SPEAKERS 0.3%
QUALITY OF WARRANTY 1.1%
RADIO QUALITY 0.6%
RATINGS BY CONSUMER REPORTS/CAR BUYING GUIDES AND SIMILAR TYPES 1%
REAR DEFOGGER 0.1%
RELATIVE (TO SIZE/POWER) FUEL CONSUMPTION 1.5%
RELIABILITY 7%
REMOTE DECKLID RELEASE 0.1%
REMOTE KEYLESS ENTRY 0.1%
REMOTE LIFTOATE RELEASE 0.1%
REPUTATION AMONG AUTOMOBILE DESIGNERS 0.4%
REPUTATION AMONG THE GENERAL PUBLIC 0.5%
REPUTATION AMONG AUTOMOBILE ENGINEERS 0.8%
REPUTATION AMONG CAR MANUFACTURERS EXECUTIVES 0.8%
REPUTATION AMONG NEW CAR DEALERS 0.9%
RESALE VALUE (BY RELATIVE PERCENTAGE, PROJECTED) 2%
RIDE QUALITY 3.7%
ROAD CALIBRATED SUSPENSION 0.1%
ROLLOVER PROTECTION SYSTEM 0.1%
SAFETY/SEAT BELTS' QUALITY 0.5%
SEAT COMFORT & HEALTH CONSIDERATIONS 1.0%
SEATING CAPACITY 2%
SIDE CRASH PROTECT 0.2%
SIDE CRASH PROTECTIVE AIR BAGS 0.5%
SLIDING REAR WINDOW 0.1%
SPEED OFF THE MARK 0.6%
SPEEDOMETER 1.2%
SPOKE WHEELS 0.1%
STATUS, PRESTIGE 1.4%
SUN-ROOF (SLIDING/FLIP UP) 0.1%
TACHOMETER 0.6%
T-BAR ROOF 0.1%
TELEPHONE SLOT 0.2%

TELESCOPIC WHEEL 0.3%
THEFT RISK FACTOR 0.5%
TILT STEERING WHEEL 0.4%
TINTED GLASS 0.2%
TRIP ODOMETER 0.8%
TRUNK CARGO ORGANIZER 0.1%
TWO-DRIVER MEMORY SYSTEM (SEAT, MIRROR) 0.4%
TWO-TONE PAINT 0.2%
U-TURN HANDLING EASE 1%
UNIVERSAL AUTOMATIC GARAGE OPENER 0.1%
USA MADE 0.4%
VINYL TOP 0.2%
VISIBILITY SIDES 0.3%
VISIBILITY REAR 0.6%
VISIBILITY FRONT 1%
VISORS 0.3%
WATER LEVEL GAUGE 0.3%
WOOD INTERIOR TRIM 0.2%
WHEELS (ALLOY, WIRE, PREMIUM) 0.1%
YOUR OWN PERSONAL TASTE IN STYLE & APPEARANCE 6.6% Etc.

The above is a draft list. The actual number and nature of questions will be determined by pre-survey polls, but all questions will be answerable by the respondents with ease and in seconds simply by marking a number (0–10, 10 being most important) in a box next to the question. (Probably not more than 20 questions per respondent to assure responses.)

VI. At this point, our Non-Subjective Valuing© computer has on its database:

(1) the NORM unit, denoting the 100%/100-point FULL PIE of the fictitious unit calculated to be exact average both in its fictitious precisely calculated price and in each one of its qualities (if the average car costs $20,000, and the average breaking distance for cars is 60–0 in 150 feet, and the average top speed for all such cars is 125 mph, etc., etc., etc., then this invention assumes for comparative calculation purposes that the imaginary NORM ($20,000) car stops 60–0 in 150 feet, its top speed is 125 mph, and so on, this non-existent yardstick car being theoretically exact average in every last one of its characteristics and attributes, all of which are both discoverable and scientifically quantifiable as set forth in FIG. 4)

(2) the corresponding societal WIP PIE, with its slice sizes denoting the relative weight the community allocates to each of these attributes (break quality important to 1.27%, etc., etc., etc.);

(3) the corresponding WIP PIE of the individual user (break quality important to 0.79%, etc., etc., etc.);

(4) all verified correspondingly quantified characteristics and attributes of all units or any specific unit in the selected entity-group. (A unique individual target car can stop 60–0 in 124 feet, its top speed is 145 mph, etc., etc., etc.)

The present invention tests the individual, target entity TE=(car, doctor), in those exact identified dollar/ranking terms, and compares the target unit with the average unit in the relevant group.

For instance, if the survey series ultimately unearths the fact that a particular doctor is 26% more popular among his patients than the NORM doctor, and if to society a doctor's quality of "popularity among his patients" is important to the degree of 4.8%, and if the average doctor charges $100 per visit, then, all other (300+) characteristics being equal, a similar visit by this particular doctor is really worth $101.25.

Suppose the Non-Subjective Valuing©—applied infinite statistical inference survey series reveals that for doctors, the typical American considers the attribute of "popularity among his patients" to be important to 4.8%.

Ultimately, a companion survey series (directed at different respondents identically mirroring the whole society) also reveals that the fictitious average doctor (with a 100% (or "5") rating on this [and all other] quality) charges $100. (FIG. 4, Step ●)

TYPICAL PERSON, AVERAGE QUALITY, AS STARTING POINTS

This means that the average person pays $4.80 of his $100 fee for the average quality of a doctor's "popularity among his patients." This is in comparison with the average qualities of doctor concerning his competing qualities of reputation, education, success rate, personality, professional equipment, state board of physicians' rating, . . . etc., etc., etc., all having a specific unearthed societal weight/value to add up to the 100%-size pie of attributes-allocation comprising everything "a doctor " is.)

Thus since 26% of $4.80 is $1.25, then as far as the average American is concerned, if all other qualities of this doctor were precisely average, a visit with him is worth $101.25.

Once 300+ qualities are quantitatively evaluated in this manner, in a third series of polls directed yet to different respondents similarly reflecting the entire society, and the various plus influences are added and negative considerations deducted from the value of the NORM, then the precise dollar worth of a specific visit with a particular doctor is unequivocally provided to the customer by Non-Subjective Valuing© , along with how much in reality such visit with this doctor costs.

At the same time Non-Subjective Valuing© also figures out the value of this doctor to the unique user in his specific WIP terms. For instance, to this entity (probing individual person, insurance company, HMO, government agency, medical school, etc.) a doctor's "popularity with his patients" might not matter at all, or in the case of a unique HMO, for example, it might even have a negative weigh . . . ) This optimally educated inquirer's Non-Subjective Valuing©—unearthed/provided final dollar worth number/ranking judgment (Your Value) can therefore be very different from that of the similarly perfectly informed average American.

Non-Subjective Valuing© facilitates comparison:

Dr. Clement Howard charges $200 for a visit. The True Value(*) of a visit with Dr. Howard is $172. Your Value(**) is $147.

Dr. John Ferenczy charges $80 for a visit. The True Value of a visit with Dr. Ferenczy is $230.

Your Value is $247.

(*) True Value=The dollar worth judgment of the imaginary society that knows everything it wants to know about all doctors.

(**) Your Value=The monetary value consideration of the user if he magically knew everything he wanted to know about all doctors.

Explanation: Once the Non-Subjective Valuing© computer has on its database filed both all discoverable, quantified facts about a specific car (its actual safety rating; its verified top speed, and all other of its actual qualities and properties) ad the user's Worth Importance Points Pie (i.e. how relatively important each quality—safety, speed, etc., etc., etc.—is to him), then since the Non-Subjective Valuing© computer also knows for what $ amount the fictitious NORM car would sell, (the hypothetical car all whose qualities are 100%- "5"-exact average), Non-Subjective Valuing© can at once rank all cars by their true values, from best to worst in terms of their actual relative dollar worth.

VII. Non-Subjective Valuing Quantification Formula.

AE=average entity in toto (NORM)

AC=average characteristic

AP=average price $$AC = \frac{E^1 mph + E^2 mph + E^3 mph + E^4 mph}{4} = AC(\text{max. speed})$$

How relatively important is an automobile's top speed to the typical American (mirroring current societal value)?

$QIC=dollar-quantified individual characteristic is the expression in dollar terms how important a specific attribute of a car (doctor) is to the typical American at any given time. In other words, that particular slice of the pie set forth in monetary terms.

If the average car costs $20,000, and if the societal value of the top speed of a car is revealed by Non-Subjective Valuing© accurate analyses of the results of the series of surveys usually to have a statistically discovered importance of 1.7 degrees (1.7%), then we know that typically $340 is paid for the average top speed by the normal person.

By comparing all quantified characteristics of any identified test unit both to the NORM PIE and to the individual user's PIE, this invention calculates the probed entity's true current dollar value, its value to the user, and lists them along with that entity's known wholesale and retail prices, such as for example:

| 1998 Mercedes C230 | |
|---|---|
| List | $32,000 |
| Invoice | $28,000 |
| True Value | $31,500 |
| Value to You | $33,000 |

VIII. Totaling Test Entity's Individual Quantified Dollar Worth by YARDSTICK=NORM in terms of current Societal (True) Value:

TA$QIC=dollar quantified individual characteristic for TA (typical American=societal (or true) value).

TA$QIC$^1$+TA$QIC$^2$+TA$QIC$^3$ etc.=TVTE(True Value of Test Entity)

IX. Totaling Test Entity's Individual Quantified Dollar Worth by YARDSTICK=NORM in terms of individual user ("Your Value"): IP$QIC=dollar quantified individual characteristic per user's unique WIP pie. (IP= individual Pie)

IP$QIC$^1$+IP$QIC$^2$+IP$QIC$^3$ etc.=IVTE(Test Entity's Value to the individual inquirer, IV=Individual's [could be a corporation] Value)

X. Concerning the point-comparison method that can parallel the quantified dollar-worth analogy.

The Non-Subjective Valuing© central computer, working parallel with the individual's computer establishes the quantified point difference first, then expresses such difference in dollar terms. (The total adds up to the various computed dollar-quantified divergences, yielding the same result as if the point-differences were first individually converted into dollar nomenclatures)

NORM=100%, OR 100 POINTS, $X.

SUPPOSING TEST OF TARGET ENTITY (TE) RESULTS IN ITS COLLECTING 115 TOTAL POINTS.

TE$=$X+15%

In other words, if the fictitious 100 point NORM car is worth $20,000, and a Target Automobile collects 115 points on the genuine, non-synthetic (*) Non-Subjective Valuing© test, then the target car's true value is $23,000.

(*) Non-synthetic means: it flows from nature. (FIG. 4, steps 1 and 2)

XI. Evaluation of the unknown or unknowable is not and cannot be attempted by Non-Subjective Valuing© . This category includes the future price of stocks or commodities, the chances for an invention to become commercially successful, the advance predictable success of a movie, Broadway show, or a song, or any other area or entity where the value-affecting factors have been proven to be simply forever unpredictable as being unknowable, including when the price of something (such as a stock) is tied to the "bigger fool" theory, whether this is generally known, recognized, or admitted. (No one would buy a stock if he thought its price would drop, no matter the "inherent value" of the stock.)

Unfixed horse-races do not belong in the above, excluded category, however.

If the Non-Subjective Valuing© computer scientifically considers/weighs every relevant (several thousand factors at a minimum) discoverable factor regarding a specific upcoming race, the precise chance (expressed in respective percentage figures) of each horse to win can be scientifically calculated by Non-Subjective Valuing© . (That is not to say that the winner can be predicted with certainty, of course.)

OBJECTS AND ADVANTAGES/ RECAPITULATION

The NORM denotes the hypothetical unit in any group that as set forth in FIG. 4, through the specified Non-Subjective Valuing© method and procedure is accurately calculated to be precisely average both in each of its socially discoverable characteristics and its price, serving as the Non-Subjective Valuing© Yardstick with which fictitious NORM the present invention compares any test unit in that same group on a quantified, value-affecting point basis, thus no imaginable entity exists to which this method is inapplicable.

By using the specific, unique polling method set forth in FIG. 4, every characteristic of any entity is both discoverable and quantifiable.

An entity consists entirely of its currently discoverable characteristics as unearthed by the unique, described Non-Subjective Valuing© survey series (FIG. 4), and while at various times the same entity may be many different things to many different people, at no time can an entity be other than everything everybody can then think of it.

Without using the Non-Subject Valuing© method, the true societal value of an entity cannot be discovered. The genuine societal value, communal worth, or collective value of an entity is that value which an ideally informed society would say the entity is worth. The ideally informed society is one that knows as much about the entity as it wants to.

The dollar price of an entity is decided by buyer and seller. The dollar value of an entity mirrors its actual, true monetary importance as discovered by the Non-Subject Valuing© formula. (FIG. 4)

Once all Steps in FIG. 4 have been taken, Non-Subject Valuing© conclusively answers the following questions in the most meaningful way, in monetary terms:

A. What would an ideally knowledgeable society say a particular unique entity (new car, doctor, philosophy, etc.) is worth if it suddenly knew everything it wanted to know about the entity? and B. What would the unique user say this particular entity is worth to him today if he magically knew everything he wanted to know about it?

Non-Subject Valuing© is the unique method of unearthing something's Societal Value by the specifically described series of surveys, focus groups, calculations, sampling, averaging and computing, (FIG. 4), overcoming asymmetric information, the ever present wrecker of fair markets.

From now on, Societal (or True) Value can be posted next to the Fair Market Value of any entity, the former denoting the actual monetary worth of something, the latter advertising its price.

A fundamental teaching of the instant invention is that value is not the same as price.

Non-Subject Valuing© pronounces dead, the now obsolete price theories of "something being worth what somebody pays for it," and that "the value of something is related to the cost of its manufacturing."

These doctrines never had anything to do with the true monetary value of an entity, but only its "market price," a totally different notion.

Even accurate market research discovers and supplies only the dollar figures laymen currently pay for entities about which they know very little.

Non-Subject Valuing© distinguishes between what something is monetarily worth versus its price.

To paraphrase Oscar Wilde, Non-Subject Valuing© tells you both the price and the value of something . . .

Non-Subject Valuing© considers an entity's accurately unearthed societal monetary value its true dollar worth. The present invention's described methods accurately uncover that value consideration, and immediately provide it to the user. (FIG. 1 through 25)

In sharp contrast to Non-Subject Valuing©, all current Internet and Web applications, and online and printed shopping guides, whether patented or not, deal only with prices usually based on market research, and while some services can discover for you where you can buy a certain item for the least money, none of them can tell you, (even if they tried, which they don't), what those items are actually monetarily worth.

It is clear that whatever people with little or no information about an entity pay for that entity, cannot possibly represent that entity's true value.

A specialized Web service might be able to tell you that the best price on a given day for a new Sharp PC-3030 Notebook is at Sears, for instance.

But what about convenience, expert, friendly, or fast service, financing, location, facilities, commitment, expert product support, warranty, etc., etc., etc., and decisively: All considerable quantified value-affecting variables considered, what exactly is the actual dollar value of this Sharp PC-3030?

Precisely what is the value of what it does and what is the value of what it has in terms scientifically quantified for and by current American society, and the user, personally? The solution to these issues is an important, original claim of the present invention. FIG. 1 through 25.

Market research that discovers "Fair Market Value" is simply the statistical determination of what uninformed laymen have paid for various goods and services versus the method this invention provides, which is the unearthing of the true monetary value of something INDEPENDENT OF ITS PRICE.

Part of this invention is the discovery that generally speaking, for evaluating its worth, a human being considers not more than approximately 300 (three hundred) characteristics of an entity, whether it is an appliance, a service, a thing, a philosophy, a professional, an HMO, or whatever.

All societies have ever-pertinent, well-established (if unwritten) value systems, concerning everything with which the community is involved, including the collective's value standards regarding morals, laws, rules, behavior, thinking, sports, fairness, fights, wars, respectability, power, regulations, social justice, music, art, taste, fashion, the concept of "good" and "bad", religion, and so on.

Non-Subjective Valuing© is the first and only method able to unearth that applicable collective value, concerning anything at all, by the series of the described, novel and unique steps and formulas. (FIG. 4)

Unless we unearth and quantify all currently discoverable relevant qualities of a group of entities, no helpful comparison of one entity with another is possible.

Imagine trying to discover the relative dollar values of two cruise ship experiences, without knowing everything that matter about both of them. Suppose the unbiased series of Non-Subject Valuing© surveys/studies (FIG. 4) conclusively reveal that Cruise "A" has excellent service (an 8.7 on 0–10, 10 being best), but the food is generally rated a 4.8; while Cruise "B" has a rather unfriendly, inattentive 3.6 crew, with food rated at 9.7. If one were told that "the food is excellent on this ("B") cruise" and not told that "service is terrible" he is getting partial, misleading information. (That it is unquantified information in addition to being partial, is another problem with existing rating guides.)

Or take automobiles. If one compares them on a great number of characteristics, but not on each one of their discoverable attributes, the result is consistently inaccurate.

Example, omit from the comparison of two automobiles the factor of resale-value, or status symbol or any other single value-affecting component, and the comparison is automatically and inevitably fatally flawed. Non-Subject Valuing© holds that when you compute the respective monetary values of automobiles, or anything else, the lack of quantification or the ommission from the equation of even a single applicable value-affecting factor inevitably results in the calculation of a universally inaccurate dollar value number.

For Non-Subject Valuing©, relative ranking, all members of a group of entities must be able to possess all the same qualities, although they do not all have to possess all or even many of the same virtues to belong to the same group. For instance:

All passenger cars could conceivably have side-protect air-bags, but they do not all actually have to have them to be objectively comparable for their respective standing positions in that group. The car that has them has a specific, exactly calculable monetary value advantage over one that lacks them. Non-Subject Valuing© discovers that specific difference in dollar value by applying the system described in FIG. 4.

Today, on the Internet, various companies provide so called side by side comparisons of two or more automobiles, listing the respective cars' specifications. Since the cars to be compared are not identically equipped as priced, and since all specs are untested and unquantified, very little meaningful matching is possible, in addition to the fact that the specs listed are arbitrarily selected and many of them are incomprehensible to the normal person due to the technical language.

The present invention overcomes all these inequities as follows.

Non-Subject Valuing© is all-encompassing:

It compares cars on each and every one of their discoverable characteristic;

It measures all qualities in terms of a normal person, and then expresses in respective dollar worth, what each car has and does, overcoming the layman's inability to interpret "Steer Diameter: Curb 33.5"—or "Torque 192@3600"-type of specs;

It quantifies each characteristic of a car in terms of its unearthed dollar worth to society and to the user; by comparing both the prices and the dollar values of cars as if they were identically equipped;

It ranks all cars best to worst in any of their qualities individually and in toto.

Non-Subject Valuing© can also be used to compare the true communal dollar values as well as the respective worth to the individual explorer of entities not in the same group.

Example: applying Non-Subject Valuing© , once the respective current dollar worth of a unique automobile and a specific mountain-climbing experience are both discovered, each entity now has a determined monetary value, and thus are comparable as such. Since this invented system provides value in terms of money, apples and oranges are easily comparable.

For relatively imperfect results entities can be compared with each other on less than all of their sociatelly discoverable characteristics using the method and system presented here.

The Non-Subjective Valuing©—presented unique combination of the science of inductive statistics, described survey series and specialized infinite relative weigh quantification method as described in FIG. 4 result in organic, unaffected, or NATURAL appraisal. The conclusive Non-Subjective Valuing©—provided dollar numbers are not synthetic, subjective monetary figures, but they actually mirror the true, current societal (and individual) value of the probed entity.

The expression Non-Subjective Valuing© was coined for this methodology because this is the only process that does not yield a biased evaluation: the provided dollar value number is not an opinion.

Non-Subjective Valuing©—furnished dollar numbers are not the result of familiar viewpoint polls, the inventor's opinion, the combined considerations from many sources, expert consensus, arbitrary weighing of the relative importance of inconsistently selected value-affecting factors, an artificial measuring element, or a combination of the above.

Non-Subjective Valuing© by the Steps set forth in FIG. 4 effectively and simply unearths the true, contemporary societal value of the probed entity, instantly answering the question: What would our hypothetically fully-informed community say this entity is worth today?

In fact, the dollar worth or ranking result of Non-Subjective Valuing© is less prejudiced than the final decision by the Olympic judges concerning the gold medalist gymnast, because here the rules of the game come directly from the people.

Example: Exactly how relatively important is the quality of "good breaks" ad what in fact are considered good breaks on a car are not determined by an elite group of "experts" here, while such consensus of relevant experts' opinion is always considered by Non-Subjective Valuing© to the precise respective % weigh extent that society considers "expert opinion" a relevant value-affecting factor. (An oversimplified for instance, to illustrate: expert tests might show the Ferrari's breaks to be the best, yet due to its relatively small, hard-to-reach break pedal, this might not be best for society on the average.)

Non-Subject Valuing© teaches that an entity's cost is not and cannot be a factor of its value, that without knowing and considering the importance of the qualities of an entity, weighing its cost is 100% meaningless and ineffectual.

If cost could be a factor of value, then in case of an automobile for example, the most reasonable thing would be to buy no car at all, and certainly the worst car one could have would be the $250,000 Rolls Royce.

In other words, if cost would be a component of value, then to pay $50 for a 12-year-old Ford would be twice as good a deal than to pay $100 for a brand-new Cadillac. The present invention ranks cars (or HMOs, doctors, restaurants, etc.) in order of true dollar VALUE, and their respective COSTs are inventoried alongside. Therefore, a customer who has $10,000 to spend on a car for instance, can readily consult the Non-Subject Valuing© ranking list to see: which $10,000 car is worth most (and least, and everything in between) in dollars. (Both to him, personally, and to society, generally)

Non-Subject Valuing© , by employing the unique combination of the science of inductive statistics and described specially designed proprietary survey series (FIG. 4) teaches that absolutely no imaginable attribute of any entity is unquantifiable as to its contemporary societal worth. At a certain point in time, everything knowable about "a car" is listed, and no quality is left unquantified.

Employing the science of central tendency, so-called "subjective" attributes, for instance whether a certain basketball player has "heart," or if a particular automobile's design rates a "9.27" or a "6.81" on the scale of 0–0, 10 being best, etc., are all statistically precisely discoverable/determinable characteristics.

There is an average societal number that Non-Subject Valuing© unearths for anything at all, no exceptions, since everything that is humanly observable is ultimately also quanitfiable in man's terms the same way a by-the-rules sports championship is won, or how a jury applies the law to the facts after it learns all it can about both.

As long as the "rules of the contest" are accurately/naturally discovered and identified (here discovered directly from the community by the described Non-Subject Valuing© methodology), a best and worse of anything and everything is discoverable, and an exact ranking can be had of doctors, HMOs, basketball players, philosophies, etc., in terms of TRUE COMMUNAL MONETARY VALUE, which is not an "opinion" but that scientifically mirrors contemporary collectively perceived dollar worth.

All presently societally discoverable attributes of an entity express the current sum total of that entity.

The statistically precise average price and all average qualities of any group of entities is organically discoverable by the Non-Subject Valuing© method.(FIG. 4)

The Non-Subject Valuing© natural "100-point" system and 0–10, 10 being best rating method are included in the essential steps/ingredients in the described unique formula that ultimately yields the accurate, current societal dollar value/ranking of the target unit, independent of its market price.(FIG. 4) In all cases the infinitely divisible Non-Subject Valuing© "100 point" rating system accurately expresses human beings' ability to rank something.

In the end, a certain characteristic of a new car for instance, on the average, can be societally discovered to rate 7.917265438 on a scale of 0–10, 10 being best.

A fundamentally similar system has been used satisfactorily to measure and judge all human endeavors, perceptions and concepts (the movie "10" doubtlessly denoting the perfect looking woman . . . ), including sports competitions, economic indicators, feelings, choices, medical research, architecture, etc., so for man,0–10, 10 being best is known that in the final analysis, it is always sufficient accurately to express and convey ranking and value.

Although "best" and "worst" are changing, yet at any one time they are finite, discoverable, precisely measurable, such as "7.917265438 on a scale of 0–10, 10 being best."

EXAMPLE

The result of a match of 1999 new cars could result in a minute Non-Subject Valuing© difference as follows:

Car "A" could be conclusively rated 102.871263544798% better than average, while Car "B" could have a measure of 102.87126354479%, perhaps resulting in one car being more valuable than another by 12 cents (whatever their respective prices . . . )

Non-Subject Valuing© conclusively renders, quantifies and expresses in dollar value all technical data, specs, stats and numbers in layman's terms and meanings.

It does not bother the user with either trying to make him understand in his own terms the actual meaning of exclusive technical language expressing various treats of a car (such as "recirculating ball steering" or "vented discs" or "axel ratio" etc., etc., etc.), nor does Non-Subject Valuing© attempt to induce the user himself or herself to try to contemplate a specific attribute's relative importance in the universe of considerable factors.

EXAMPLES

1. Vented discs do something specific versus other type of discs.

On the database of the central computer of Non-Subjective Valuing© precisely what vented discs do is already quantified in terms of a normal person, and the dollar value of vented discs is calculated relative to the other 300+ characteristics of "a car." A driver is interested in knowing what vented discs do for him or her, and everybody is interested in knowing how relatively important are vented discs compare to all the other qualities of a car. To possess vented discs' and other difficult-to-comprehend attributes' worth precisely and exactly expressed in dollar terms is novel and useful. (FIG. 4, Step ●, for calculating math formula)

2. Non-Subject Valuing© assumes that to a driver, it does not matter if a $50,000 Saab has a lot of fancy-sounding, or expensive, or even "proven" safety innovations if its passengers are all likely to die in a head-on crash with a $20,000 Chevy whose occupants are likely to survive. Or, if speed is important, it matters not to Non-Subjective Valuing© if a car has eight cylinders if another with four cylinders can beat it. To judge how good a doctor is, no knowledge of Latin should be required and here it is not.

Thus, this invention overcomes asymmetric information in this additional "instant enlightening" way too.

Non-Subject Valuing© in a flash provides the inquirer the respective, quantified dollar values of what "recirculating ball steering" actually does both in the user's own terms and in terms of the average driver/owner for bottom-line dollar worth comparison of one car with another and of one car's value with its own price.

PRIOR ART, PATENTED OR NOT

It is further proven by this invention that for the reasons enumerated above, all non Non-Subjective Valuing© valuing systems must be and are inherently biased, because among many other reasons that make them prejudiced and unreliable in one or more ways, they have no socially established NORM to which compare individual entities, (the NORM being the unit precisely calculated to be exact average in all its attributes and its price), plus they fail to discover each and every currently discoverable attribute of the probed entity, and then because whatever qualities of an entity they do subjectively choose to weigh, they do not measure them "naturally" (in terms of accurately discovered/quantified community standards), but gauge them arbitrarily.

Take Consumer Reports that claims to be unbiased just because they make judgments supposedly independent of traditional commercial interests. Even if it were true, and even if Consumer Reports did not represent the collective value judgment of an exclusive, relatively small, not representative, elite group of Americans (which they do), in contrast to Non-Subject Valuing© Consumer Reports would still be inherently and inescapably influenced by its own points of view.

For instance, it recently recommended to its readers to buy a certain Chevrolet model over a specific Oldsmobile model because except for the name the two cars are identical, and the Chevy is cheaper.

Consumer Reports might believe that this is impartial judgment, but it is not.

It represents the collective opinion of Consumer Reports' clearly prejudiced staff who apparently claim to believe that status symbol has no value. To believe that is their inalienable right of course.

But unbiased they are not.

(Further, if Consumer Reports editors do not truly believe that status value is no value, then they are misleading their readers as to that fact besides giving them a false sense of "objectivity".)

In clear contrast, Non-Subject Valuing© is able instantly to provide the inquirer the value judgment of the hypothetically ideally knowledgeable contemporary American society, as well as the theoretical dollar value judgment of the inquirer herself as if she suddenly and magically knew all she wanted to know about automobiles or any other entity.

For instance, for the "typical American" (the expression in Non-Subject Valuing© always interchangeable with "our society"), or a specific person, even forgetting the resale value matter, and a great many other relevant value-affecting factors, to pay a certain dollar amount for prestige might appear to be an excellent investment, and distinctly, an Oldsmobile has a specific, measurable prestige-advantage over a Chevrolet as might be discovered by the relevant Non-Subject Valuing© original, proprietary survey methods.

That is why the societal monetary value that is provided by Non-Subject Valuing© is, and can be the only yardstick for impartial measuring. The ultimate Non-Subject Valuing© "judgment" is not anybody's opinion, including the opinion of Non-Subject Valuing© .

Non-Subject Valuing© simply tells you what the hypothetically ideally car-wise society would say about the respective dollar values of that certain Chevy and that "identical" Olds.

The Non-Subject Valuing© dollar number is an objective verdict.

Consumer Reports opinion is not.

In fact, the Non-Subject Valuing© computer will be able to tell the Consumer Reports staff the relative dollar values of these two cars in Consumer Reports' own terms once their editors respond to the Non-Subject Valuing© -computer-provided relevant quiz.

Consumer Reports' dollar values might be very different from how our current society would value those two cars if the community knew everything they wanted to know about them, including, for one thing, precisely how much more prestige the Olds possesses that translates into a specific amount of "status symbol" which has a specifically calculable current collective dollar worth. (FIG. 4)

For a special individual, the Chevy might be more valuable, if for this person advertising "moderation" or "wisdom" about himself is important.

It is conceivable for example that one Consumer Reports groupie "A" will want Consumer Reports devotee "B" to know that fellow follower "A" bought the Chevy, not the Olds, and so "A" belongs! That "belonging" can be very valuable, and worth money to "A".

All individual qualities of an entity have both "on the average" measurable dollar worth to society (True Value), and precisley calculable monetary value to an individual in particular (Your Value)—both these dollar worth considerations are unearthed by the present invention no matter the price of the entity. (FIG. 4)

The present invention clearly teaches how to distinguish between actual value from market price, empowering consumers autonomously and scientifically to compare one brand (service, tenet, entity, product, object, concept, etc.) with another.

Monetary expression is the truest facilitator of comparison per Non-Subject Valuing© so it measures and expresses the value of any entity (the worth of a specific doctor's time, a certain professional soccer player's current annual true monetary value, the dollar worth of a specific cruise on a specific ship), in dollar terms, as that is the most understandable, most precise, and fairest way to contrast entities.

Rankings flow from the revealed respective dollar values.

A government environmental cleanup program that is worth $3 million and costs $300,000 will be higher on the list of ranking/worth-order than one that costs $3 million and has a value of $300,000.

Figure 9:
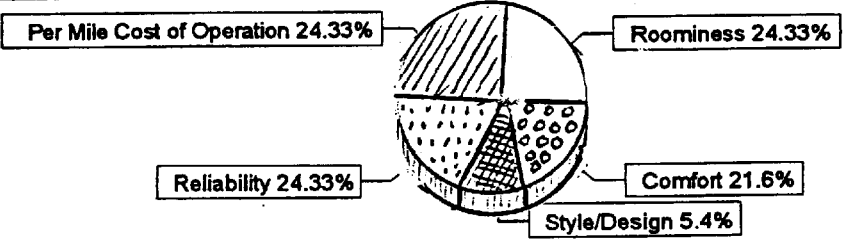
FIG. 9 depicts the example for an individual company's preference Worth Importance Point Pie (WIP), using a Taxi Cab Company's hypothetical preference allocations.

For each field (used cars, dentists, race horses, banks, cities, alarm companies, philosophies, religions, government programs, policies, politicians, experiences, vacations, appliances, stock brokers, events, systems, leaders, restaurant chefs, soccer coaches, produce, products, services, professionals, etc., etc., etc.) a separate database is created, and the value-affecting factors switched to match the probed group. (For instance, for used cars the number of miles factor matters to a specific degree; in the case of HMOs their respective success rate (cured patients) has a specific relative importance, and so on.) (It follows that entities can be valued and ranked for specific groups, taking their unique objectives into consideration, such as blind people, or bad swimmers, or tall women, etc. as illustrated in FIG. 9, Taxi Cab Company's WIP Pie)

A General or Environmental Factors value-affecting coordinate may be installed in each case, its function being to correlate events affecting to an accurately calculated specific degree the monetary value the whole group, or a certain part of a group, relying on historical data and experience, comparative/statistics and other relevant evidence. For example, in case of works of art, current action-attendance records or gold prices may come into play as general value-affecting factors, while in the area of television sets, unexpected news of a new invention making existing sets suddenly obsolete would be an important common value-affecting factor, while a rise in crude oil prices could have a measurable affect on small and large automobiles' relative values.

The Non-Subject Valuing© NORM unit is always the imaginary, 100% unit in the examined group. The fictitious NORM is accurately calculated to be exact average in that group as to all its qualities and its price. If a target unit, once all things are considered, is in toto valued to be 10% better than the NORM unit, then that target unit is worth 10% more dollars than the exact average NORM unit.

Unless all characteristics of an entity are known and considered, no credible comparison of one entity with another is possible.

Through the described methods Non-Subject Valuing© unearths and quantifies all currently discoverable characteristics of all target entities in any test group. (FIG. 4)

A Non-Subject Valuing for Racehorses© database, for example, contains all rivalrous, discoverable quantified value-affecting factors relevant to each competing horse concerning a specific impending race.

Figure 1:
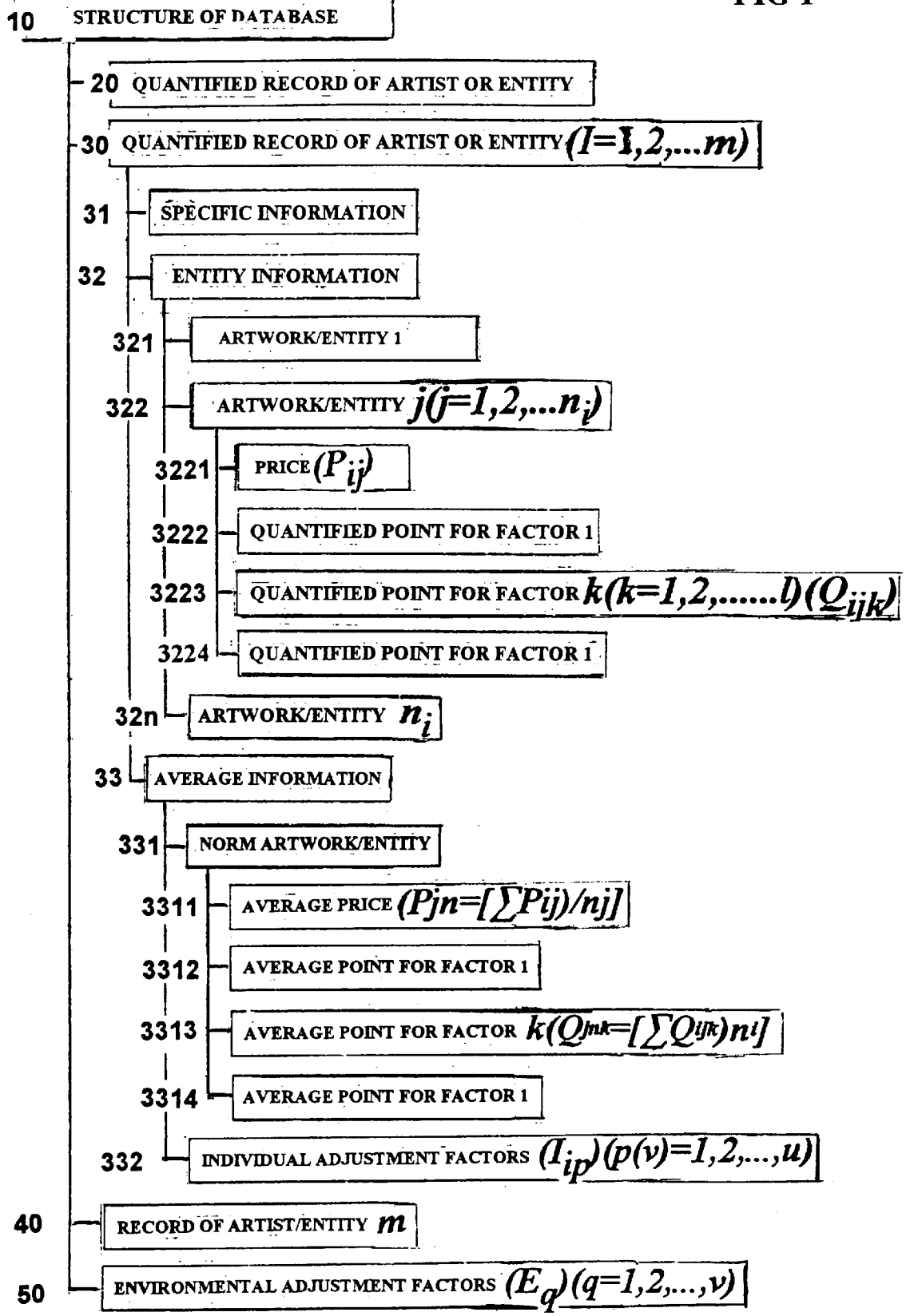
FIG. 1 depicts the sequence/progression and graphical view of the workings of the interactive Non-Subjective Valuing© database.
Figure 2:
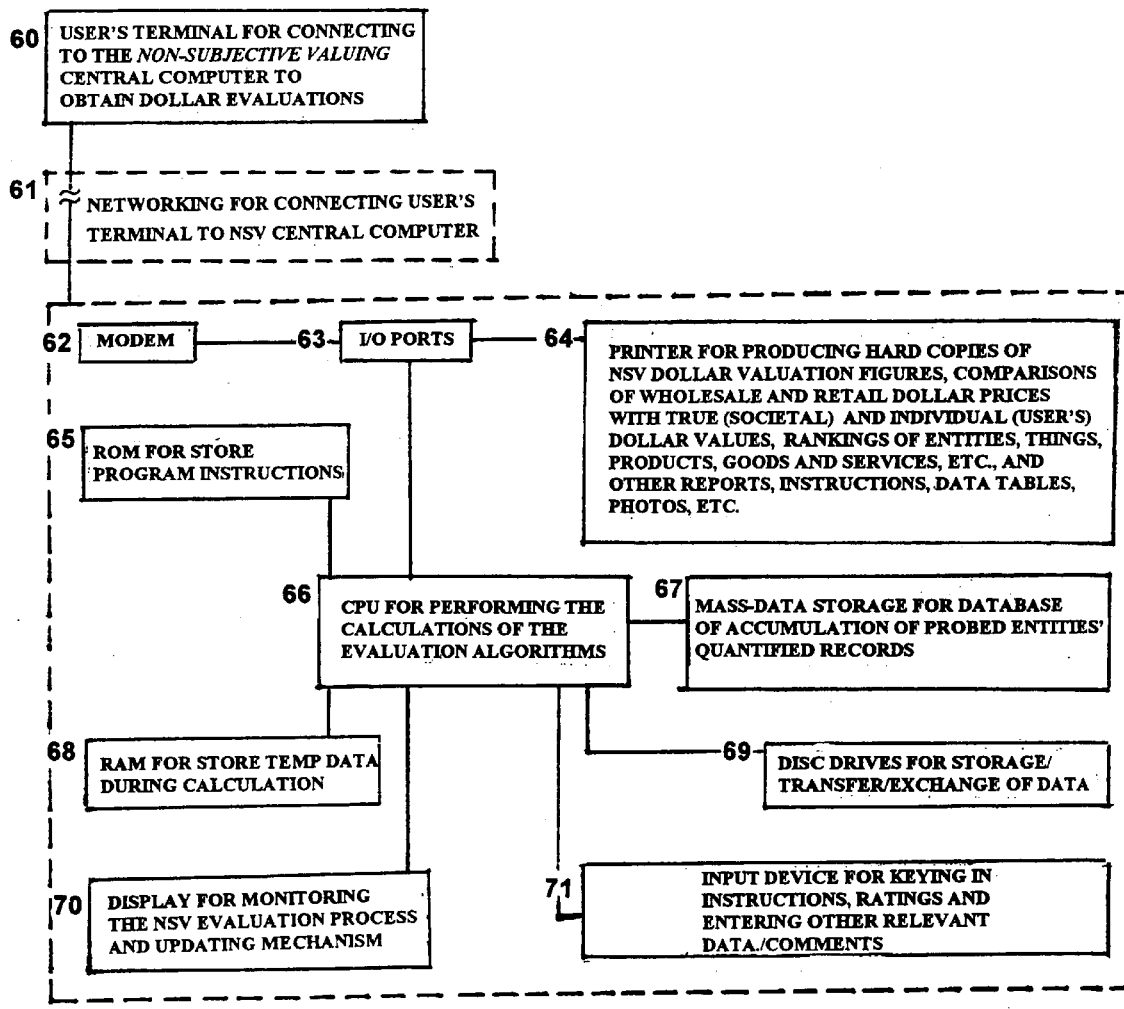
FIG. 2 portrays the arrangement and cycle of the Non-Subjective Valuing© hardware.
Figure 3:
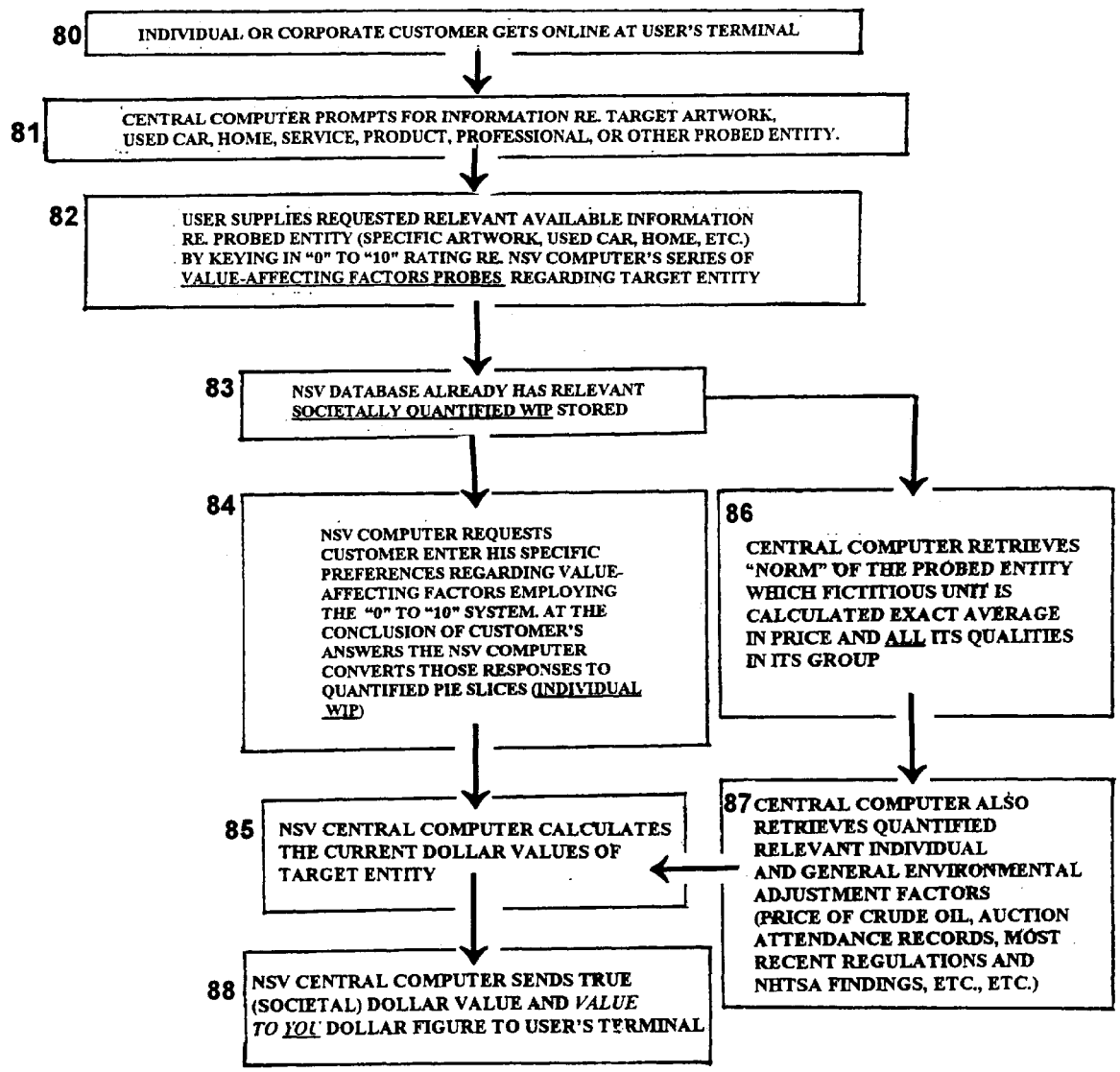
FIG. 3 represents and describes the steps taken by the user and the Non-Subjective Valuing© central computer.

Non-Subject Valuing© is thus an undisputed edge for any enthusiast, because while everybody handicaps, until the present NORM and PIE concepts taught by this invention (FIG. 1 through 25), including the described specific survey series that is directed to and accomplishes the discovery of every charcteristic of a probed entity group, plus the specific calculation series set forth in FIG. 4, and the interactive system described in FIG. 1, 2, and 3, it was not possible:

A. to consider/weigh/calculate all the relevant value-affecting factors to their precise respective proven relative importance, or B. to unearth and accurately quantify all such value-affecting factors, or C. immediately to manage 100,000,000 such correlations, or D. instantly provide the user in monetary or ranking terms the result of the accurate calculation.

Each contending element is expressed by Non-Subject Valuing Racehorses© as a percentage of the 100% value-affecting pie.

Included are the quantified slice sizes of each entering horse's heritage, age, size, anticipated mood under the specific predictable circumstances, relevant quantified speed record curves on that (or similar) type of tracks/weather conditions and distances, injury records, the horse's past performances against the specific (or similar) competition, the present reputations and records of the owner, the jockey, and the trainer, winning records, and 1000 other historically or experience-related, known, on the average, always precisely calculable, quantified correlations, including even the prospective online customer physically observing the horses just prior to post time to judge their respective last minute appearance, moods, bearing and carriage relevant to the animals' immediate respective readiness—and entering on his hand-held computer such observation, rating each of them them 0–10, 10 being best, to be instantly factored into the Non-Subject Valuing© mix for exactly what it's worth, its specific relevant weigh importance as to each horse's chances of winning that race, this relative value factor depending of course on the observer's relevant experience also, (which he himself can expertly rate by clicking on the provided screen button from 0–10, "10" being "the greatest expert observer . . . " to "0" denoting "couldn't possibly tell if a horse was up to it . . . "), to allow his opinion in this regard to be given the appropriate weight by the interactive Non-Subject Valuing© central computer, along with the other 1000 on-file relevant value-affecting factors).

Following the instant calculations on the quantified points, under all the currently applicable, quantified circumstances, this invention compares each horse to the fictitious 100% NORM horse, filed on the Non-Subject Valuing for Racehorses© database.

That average, or NORM horse is the hypothetical horse that would finish evenly third in a five-horse race, for instance. (Or precisely in the middle of the given group of racers)

Then Non-Subject Valuing Racehorses© would show to the user, on his hand held, radio operated computer screen, a few minutes before the race, a table like this:

In Race #4, Del Mar, Jul. 14, 1999, 6:48 P.M.:

|  | Horse #1 | Horse #2 | Horse #3 | Horse #4 | Horse #5 |
|---|---|---|---|---|---|
| Chances of Winning | 15% | 11% | 8% | 27% | 39% |

It is then up to the user at the track also to enter onto the Non-Subject Valuing© computer both the official odds and race-track-posted respective payoffs on the site, wait for the computer's instant advice on the best bet and make his move.

The above listed relative percentages simply represent the ultimate prediction, because it is based on scientifically calculated odds, is all-encompassing by including all relevant chance-affecting factors, and uses the novel NORM method and formula, without which all the knowledge and research in the world could not approach objectivity or scientific evaluation.

The truth is that no matter which horse eventually wins, Non-Subject Valuing© will always have allowed the user prior to the race to know the humanly most foreseeable outcome.

Non-Subjective Valuing© takes into consideration all scientifically quantified, value-affecting factors to the very extent each such element, on the average, has proven to contribute to the payoff.

The very great number of accurately quantified value-affecting factors interact, making for the wisest possible decision. In the long run, on the average, the NORM-based prediction will always prevail over individual guesses for all unfixed races.

An honestly run horse race is much more predictable than the future prices of stocks and commodities, because those changing future prices invariably depend on "the bigger fool" theory and therefore will probably remain forever unpredictable. (Having advance insider information is the sole sure chance to win at the stock or commodity markets.)

When the variables cannot be ascertained due to an inability to peg them to anything but unknown, chance factors, this invention cannot be successfully used.

The "bigger fool theory" is predictable only as far as the law of averages may be used to predict the next tossed coin being heads or tails.

Under unfixed circumstances, if heads result twenty times in a row, the chances of tails coming next is greater than after heads come up once, because the law of averages is just as strong a variable as the other truth, which is that each time a coin is tossed, the chances of heads or tails remain at 50—50. (Otherwise, theoretically, at one point, the world could be left with males only, for instance)

The truth is that if one keeps tossing a coin, at one point tails will come up, because of the very fact that tails always has a 50% chance of occurring.

Now, professional horse race handicapping individuals attempt to weigh the relevant a competing value-affecting factors too, of course, except that short of Non-Subject Valuing© , they have not the NORM, meaning they have no precise, scientific internal yardstick, and in their evaluations they include at their inclination relatively few worth-influencing components, and the competing determinants considered by these experts have on the average no historically precisely verifiable, precise, greatly methodical, or otherwise scientific or even subjective-but-standard relative weights.

They are not much different from a J. D. Power, or Consumer Reports type of particular, contrived evaluation process, well-promoted, but hopelessly unscientific, synthetic, and biased. Subjective, even if J. D. Power has an internal yardstick of some sort.

The J. D. Power judgment for example reflects only a partial, subjective and unquantified opinion, not even attempting to approximating what the exact communal dollar value of each probed car might be. Only Non-Subject Valuing© can do that. (J. D. Power for example considers CUSTOMER SATISFACTION in a vacuum, which specific quality is not even one of the more important automobile qualities to most people. However, a J. D. Power, or similar group, even retaining a policy of partial evaluation, (on one or on a few attributes). will be able to license at least one important aspect of the present invention, as follows.

If some people feel that to them only a single quality of "a car" is important (for instance, the characteristic of customer satisfaction), and are willing to assume (as they must, whether they know it or not) that all other things related to the probed entity are equal, then as long as the method taught by this invention is applied to this single slice of the WIP pie, the monetary value differences among cars can be unearthed for such users.

Societally, if surveys indicate that to the community the property of owner satisfaction is important to 25%, and the relative importance of no other trait is referenced, then a J. D. Power type outfit can calculate as follows:

a Say the average cost of a car turns out to be $30,000 at the time of this calculation. 25% of $30,000 is $7,500.

So the NORMal person pays $7,500 for the average attribute of owner satisfaction. (The fictitious car that rates a "5" (100%) on that quality on the scale of 0–10, 10 being most important.)

A test car that rates 15% better on this quality, is worth 15% of $7,500 more than the average car, or its true total monetary value is $31,125. A test car that turns out to be 3% worse than average on the owner satisfaction rating, is worth 3% of $7,500 less than the NORM car, or its true value is $225 less than $30,000, or $29,775. Of course if J. D. Power has an interactive Internet system, by licensing the methodology taught by this invention J. D. Power will then be able to figure out the rankings and relative monetary values of all cars for an individual user to whom (all other things (mistakenly) assumed equal), the trait of owner satisfaction is worth 2% or 50%, using a similar calculating method. Today, J. D. Power provides distinguished rankings on one or more unquantified attributes. Question: would one purchase a very ugly looking car that collected the most points for "customer satisfaction" by the people who had purchased than automobile in the first place?

(This above example does not event take into consideration the scientific conclusion of just exactly what is accepted by the probed society to constitute owner satisfacion, which fact (as all such relevant basic facts) is discovered by the present invention initially, employing a relevant version of the survey series, for instance: "On a scale of 0–10, 10 being most important, concerning the quality of OWNER SATISFACTION, how important is the average age, (or profession, gender, education, etc.) of the respondents?" and so on, because for instance, an older lady might not care if a teenager boy loves his Miata, and so on: in other words, when a certain car is named the winner of the owner satisfaction race, no one knows what it really means, just as the quality in a vacuum of MOST ECONOMICAL CAR means nothing, since all other things are definitely NOT equal, for example safety, reliability, roominess, comfort, speed, prestige, to name a few, and the truth is that the most economical car is the one one does not buy at all, saving 100% of the cost of an automobile.)

For lack of the relevant, all-encompassing, here explained Non-Subject Valuing© —proprietary research series that ultimately produces the, J. D. Power cannot objectively value cars. It has no 100% Worth Importance Point Pie: its comparisons and point systems are made-up, arranged, colored and irrelevant, whether the public understands it, or not. (The present invention will be able objectively to rate the relative usefulness, ranking and worth of competing buying guides such as IntelliChoice, J. D. Power and so forth.)

Ask J. D. Power, Kelleys Blue Book, or IntelliChoice to provide the accurate dollar value difference among three fictitious new SUV vehicles that are identical in all their qualities and prices except as follows:

1 has a top speed of 140 mph vs. the other two's even 115 mph,

2 has a warranty for 4 years vs. the other two's identical 3, and

3 has tires that last exactly 17% longer than those of the others'.

J. D. Power and all the others will admit that they have no idea how to do this, and these are only three cars with one variable correlation each. No one can set himself up as judge in a vacuum.

Further, inherent and set forth in the present, Non-Subject Valuing© invention is its design continually to stay current on societal values, automatically learning from experience and making this system self-correcting by incorporating the requantifying of value-affecting factors with the inevitable changing times by continuing fundamental surveys to calculate based on ever changing times and values of society. For instance, the analyses of 1000 past races as to the quantified characteristics of the winning horse versus the "also rans" will teach the Non-Subject Valuing© computer that generally, the quality of favorable weather conditions to a specific horse might have 1.87% more correlative importance than previously thought, or the quality of best previous time of a horse on a similar track/distance might be generally a 0.63% less value-affective factor than earlier believed, or that there is a newly discovered variable that if properly quantified contributes some measurable value-affecting component, all other 1000 things being equal.

For example, even a most experienced and successful handicapper will not be able to tell you a universally credible or even a private, but standard and precise correlation among three race horses, pretending for this illustration that all three animals were identical in every way except that Horse A customarily does worse than usual in the applicable weather by 9.2%, Horse B was injured three months before this race, but seems to have recovered 91.5%, and Horse C has a brand new trainer as of three weeks ago and the animal traveled 3000 miles two days ago to participate in subject race.

And these are only three horses with basically one variable each.

Now compare this with Non-Subject Valuing© instantly managing the evaluation of say 7 horses, with 500 immediately relevant dimensions each, which is about 1,746,500 variable-correlations.

The NORM blueprint allows dollar value/ranking comparisons with a credible, usable yardstick, correlating each horse's chances to win to that of the fictitious average (100%) horse.

Add to this Non-Subject Valuing Racehorses©' ability to continue altering the practicable odds up to two minutes before post time yet, according to such last-minute personal input by an onsite user or an onsite experienced professional and you have a greatly useful device.

This illustration is not meant as a comment on the commercial viability of the invention, or on the desirability to have horse races, or even that the invention should be used for horse races, but solely to throw light upon precisely why this invention is not like any other that ever existed, or an example for what Non-Subject Valuing© can do in a specific area, one that is proverbially one of the hardest logically to approach: horse races . . .

Non-Subject Valuing© is not an invention that:

just conducts common or uncommon surveys to detect the value of something, simply unearths all communally/collectively discoverable characteristics of an entity to estimate its worth, only quantifies and then somehow matches each such characteristic from the points of view of the individual user and contemporary society to figure the entity's respective dollar values, merely considers every aspect of an entity to measure its dollar worth, and so on.

None of these elements individually or combined add up to being this invention based on the NORM.

That is the NORM, a difficult notion to comprehend at first because of its striking novelty in being the first and only truly objective basis for comparative evaluation traditionally considered nonexistent and undiscoverable.

A. To belong to a Non-Subject Valuing© group, an entity must be able to have all characteristics of all other members of that group. Six horses in a race meet this criterion.

B. Using the described formula, Non-Subject Valuing for Race Horses© first discovers all the characteristics for the fictitious horse that would be exact average among the participating animals, having the exact average chance to win the race, or to put it another way, to finish precisely in the middle of the field.

C. Then Non-Subject Valuing For Race Horses© compares all actually participating horses on the quantified point system to the imaginary average horse. Each horse's actual chances to win is accurately calculated by the central computer instantly and changed according to relevant, scientifically quantified factors, up until post time.

The correlative/interactive steps in toto, as described below are original, proprietary formula to the present invention to serve as a recapitulation and

BEST MODE FOR CARRYING OUT THE INVENTION (ENABLING DISCLOSURE)

● Non-Subject Valuing© Survey #1 unearths all societally discoverable characteristics of the probed entity.

$E = f^1 + f^2 + f^3$ etc.

E=Entity [(could stand for "a car," "a race horse," "a doctor," etc.,)

f=factor (characteristic, attribute—could stand for "education," "speed," "reputation," etc.)]

● Survey #2, by employing the science of statistical inference and accurate sampling of the population unearths the prevailing relative societal importance of each such attribute, expressing their respective discovered relative weighs in percentages or as respective pie slices that is called the Societal Worth Importance Point Pie (WIP)

$$f = \frac{(f^1 x)(f' x)(f^3 x)}{3}$$

sf=survey-discovered rating of specific factor w %=worth value, expressed in percentages A. $f^1 w \% = \frac{(sf^1 9) + (sf^1 7)}{2} = 8$ (expressing the survey-discovered average rating number for a specific factor)

B. $8f^1 w \% = (sf^1 8) + (sf^2 2) + (sf^3 4) + (sf^4 7) + (sf^5 3) = 24 = 100\%$ of pie 100% = 100 points 100% = 0.24 into 8 = 33.3%
2 = 8.3%
4 = 16.6%   → Relative pie size slices always add
7 = 29.2%      up to 100%.
3 = 12.5%

No matter the number of identifiable factors, or their discovered relative importance-rating: the Non-Subject Valuing© full pie is always 100% large for any entity.

● By responding to questions concerning the user's own preferences, the customer establishes his unique, personal WIP (See ●above)

● By applying the weighted arithmetic mean, Non-Subject Valuing© calculates the mathematically precise hypothetical $ price of the theoretically exact average unit in the probed group. Math Formula:

$$\bar{x} = \frac{(1)(70) + (1)(90) + (3)(85)}{1 + 1 + 3} = \frac{415}{5} = 83$$

● Non-Subject Valuing© uses mathematical averaging and the science of Central Tendency to unearth and reveal the hypothetical unit in any entity group that is exact average (rates a "5" or 100% or an infinitely divisible 100 points) in all its socially contemporarily discoverable characteristics.

AC=average characteristic (example: top speed: if car A has a top speed of 120 mph and car B's fastest velocity is 110 mph, their average maximum speed is 115 mph)

I. $P = \frac{(E^1 \$) + (E^2 \$) + (E^3 \$) + (E^4 \$)}{4} = AP$

II. $AC = \frac{E^1 mph + E^2 mph + E^3 mph + E^4 mph}{4} = AC(\text{max. speed})$ ● Non-Subject Valuing© now fuses ● & ●, resulting in the NORM, encompassing the hypothetical $ price for that fictitious unit that is calculated to be precisely average (5) in all its attributes.

This novel merger results in the yardstick or NORM or 100%/100-points unit, to which Non-Subject Valuing© compares all test units in the group, employing the described quantified points system.

● All quantified attributes of all members of the designated entity group and their respective $ prices and discovered values are filed on the Non-Subject Valuing© computer's database. (Example: New car e MSRP=$17,500, Invoice=$15,850, if NORM is $20,000, and $e^1$ happens to score 103.5% on the Non-Subject Valuing© sum rating, then $e^1$'s true value is tabulated: $20,700, and so on.)

● Now the Non-Subject Valuing© computer has on its database the fictitious NORM unit in the probed group that is calculated exact average in all its characteristics and its price, (this NORM stands for the "100%" or 100-point element), all respective similarly quantified attributes and prices of all members of the selected entity group, the prevailing societal WIP pie, and the user's WIP pie.

● Whether a target unit is already filed on the Non-Subject Valuing© database, or just then identified/rated by the customer, by comparing individual test units with the NORM unit on the organically quantified Non-Subject Valuing© scale, the Non-Subject Valuing© computer calculates and supplies the respective dollar values of any or all target units, both in terms of societal value and value to the user, and displays the dollar numbers alongside the respective prices of the individual units, such as for instance

| 1998 Mercedes C230 | |
| --- | --- |
| True Value | $33,500 |
| Value to You | $34,200 |
| Dealer's Cost | $27,900 |
| List Price | $31,400 |

(The last two dollar figures from published records/research.)

(What automobile safety (or any other quality of any other entity) means to our society is determined by the relevant survey series, not arbitrarily decided by experts, the government, or anybody else. The present invention seeks to learn precisely what constitutes safety to the average driver in our society, (or any other quality of any other entity) then match the cars' relative safety (or any other quality of any other entity) according to that societal definition.)

(In case of comparing only two cars, for instance, after the true dollar values of both cars' are calculated as if they were equipped identically, their average price is arrived at by adding up the two real values and dividing the figure by two. Now the true dollar values of all present or missing specific traits (air conditioning, disc brakes, etc.) are calculated and they are either added to or deducted from the average number to attain the true dollar value of each car AS THEY ARE ACTUALLY EQUIPPED.)

Pursuant to the user's command and choice, Non-Subjective Valuing© is immediately able to rank and list all individual members of a group (for instance all 650 HMOs in the U.S., or in a specific city of state) in order of best to worst (in true value), best to worst in Value to the User, retail price (highest to lowest), wholesale price, comparative actual dollars saved considering respective differences between price and value, comparative actual dollars saved considering respective differences between retail and wholesale prices, money saved in relative percentage terms, or provide the ranking list concerning any considered specific characteristic, for example: safest to least safe in automobiles, or highest formal education to lowest formal education in case of doctors, or best to worst success rate for HMOs, and so on.

(Please see "MyPie for New Cars" working source code)

However, the basic Non-Subjective Valuing© default register is the listing of all members of the group best to worst according to their true dollar worth, with their respective dollar values to the individual user and retail and wholesale prices immediately following.

For instance: (fictitious list)

New Convertibles 1999
Best to Worst Ranking per True Value

| Make/Model | True Value | Value to You | MSRP | Invoice |
|---|---|---|---|---|
| 1. Porsche 911 Carrera Cabriolet | $147,000 | $155,000(1) | $135,000 | $121,500 |
| 2. Mercedes-Benz SL | $129,000 | $130,000(3) | $170,000 | $153,000 |
| 3. Saab 900 Cabriolet | $120,000 | $141,000(2) | $85,000 | $77,500 |
| 4. BMW 325i Cabriolet | $102,000 | $119,000(4) | $156,000 | $140,000 |
| 5. Audi Cabriolet | $71,000 | $65,000(6) | $55,000 | $45,000 |
| 6. Jaguar XJS Convertible | $68,000 | $81,000(5) | $90,000 | $80,000 |

Non-Subjective Valuing© is therefore a method utilizing a computer system for appraising a target entity of whatever nature, comprising:

a. storing in a mass storing device the database of multiple records, each including specific information of an individual member of the target group, including all relevant historical and other information of all individual members of that group, corresponding to the specific value-affecting factors, each assigned multiple levels with respective value-affecting rates;

b. computing and filing by the central processing unit the NORM (average) price or ranking, and a collection of NORMal points based on the described formula, including all relevant societally discoverable value-affecting rates in the probed field of inquiry;

c. prompting a series of inquiries by said computer system to obtain the specific, value-affecting factors of one or all individual members of the group;

d. quantifying in societal terms all relevant attributes of each member of the group;

e. quantifying in terms of the user all relevant attributes of each member of the group;

f. compare to the NORM on the 100-quantified point=100% basis: each requested individual entity, by retrieving from the stored database of the mass data storage device the collection of NORMmal points for both the exact average unit and for the probed target entity.

The Non-Subjective Valuing© method as defined within this application further comprising the steps connecting the computer system to an online network so that the user can utilize said computer system at a remote location to gain access to the Non-Subjective Valuing© results.

The Non-Subjective Valuing© method can store the Non-Subjective Valuing© database on a portable mass storage medium.

The Non-Subjective Valuing© method monitors the operation of the Non-Subjective Valuing© system on a display device.

The Non-Subjective Valuing© method and nature of interactive communication between the user and the central database online, fax, telephone, email, letter, in person or in other ways, Non-Subjective Valuing© insuring that the responses to the Non-Subjective Valuing© computer quiz regarding the individual user's own observations concerning the probed entity reflect his or her specific level of expertise concerning the test entity as well as that this customer's relevant ratings of the value-affecting factors (0–10, 10 being best) for specific target entities is quantifiedly ascertained.

The Daily Operator entering onto the Non-Subjective Valuing© Database the relevant most recent value-affecting general and specific information on the quantified point basis for the computer to incorporate such information onto the calculating mechanism.

The Non-Subjective Valuing© central computer converts relevant keyed-in information into value-affecting factors, each entity assigned the multiplicity of all relevant value-affecting factors and respective worth-affecting rates, and conclusively transforms and expresses the results in dollar numbers and/or rankings based on such monetary differences.

Rankings/monetary worth-estimates way be had locally, nationally or world-wide and always provided by the Non-Subjective Valuing© in the relevant form and meaning.

EXAMPLES

I. Non-Subjective Valuing© prior to a specific five-horse race gives the user the chances of each horse to win that race as follows:

1. Horse #5=47.5%;
2. Horse #1=26%;
3. Horse #2=10.5%;
4. Horse #3=8.3%;
5. Horse #4=7.7%.

II. Non-Subjective Valuing© Hourly Fee Values- Your Values- (Actual Charges) for Debt Collection Lawyers in "Your City" on Jul. 14, 1999:

1. John Malle, Esq. $275-$220-($200)
2. James Collins, Esq. $270-$195-($225)
3. Joe Stanton, Esq. $267-$200-($225)
4. Ferenc Simandy, Esq. $229-$165-($200)

Etc., listing all relevant attorneys.

II. Non-Subjective Valuing© True Values- Your Values- (Actual Costs) of Delivered Medium Size Pizzas, located within 1 mile radius of your home:

1. Galileo Pizza $12.50-$11.25-($10.75)
2. Shaker's $11.25-$11.50-($9.49)
3. Rome Nights $10.75-$12.15-($9.25)
4. Little Frank's $9.40-$7.20-($10)

The Non-Subjective Valuing© computer, after the customer responds to the quiz series, provides the user the values in the user's particularized terms too, in all cases.

For instance, a certain handicapper may enter his or her own preferences for judgment regarding the establishment of respective chances for each horse to win a particular race. Those entered preferences are then quantified and applied to all the facts momentarily stored on the computer's database to serve as a special worth-influencing factor to calculate for that individual.

EXAMPLE

To a special someone, the relative importance of a horse's speed at its most recent previous race might be more important than such factor's relative weigh is computed based on the average considering historical facts.

Or, to a particular individual, fast delivery of a pizza has a greater comparative weigh than to the average person. (These weigh differences are always exactly calculable using the WIP pie as set forth above)

Taking into consideration all such unique preferences, the Non-Subjective Valuing© computer is customized each time, and is able to provide societal value as well as current dollar or ranking worth to the very user. (FIG. 4, Step ●)

The Non-Subjective Valuing© true dollar value/collective ranking is always based on the determination of the relative societally discovered importance of all factors ON THE AVERAGE.

The continually updated Non-Subjective Valuing© central computer databases contain:

A) all the quantified value-affecting facts about all individual entities in the specified group for which the particular database is programmed (all relevant lawyers, cars, artists, mountain-climbing-experiences, ocean liner cruises, airlines, or whatever field), B) the computers also have on their respective files the NORM unit that is calculated exact average on all its characteristics and price for the probed entity group. Example: the organically calculated 100% mountain-climbing-experience is average in all discoverable respects, including affecting the average individual's health, mood, learning experience, etc., etc., etc., each to a rate of "5". This fictitious NORM mountain-climbing-experience has a precisely and naturally calculated dollar value attached to it, C) once the matching, unique quantified characteristics of a specific, target entity (mountain-climbing-experience, or whatever) is received, the computer calculates its value by comparing it to the average, NORM mountain-climbing-experience (or whatever) on the quantified point basis.

If the average, 100% mountain-climbing experience is worth $1750, then a matching outing that is 8% better will have a Non-Subjective Valuing© of $1890.

This way all mountain-climbing-experiences from best to worst, both generally and specifically to the user, may be put in ranking/dollar value order and listed for the explorer by Non-Subjective Valuing©.

The Non-Subjective Valuing© method is to be licensed to those interested in valuing anything at all. Each field must have its own applied central computer database, conduct the described, complex, relevant research series, surveys, polls, focus group sessions, collection and analyses of historical data, projections, interviews and so on, to create the relevant correct database containing the NORM and all the relevant facts about all the individuals in the NORM's group, faithfully following all the Steps advanced in FIG. 4.

The Observer's qualifications matter, and Non-Subjective Valuing© deals with it as follows. The user must rate his or her own expertise level concerning the target entity. For instance, a professional realtor can judge the condition of plumbing in a home better than an amateur can. Once the qualifications of the user (rated 0–10, 10 being most qualified) are noted by the computer, the proper MARGIN OF ERROR caution comes on, telling the user the relative exactitude he or she can expect from the Non-Subjective Valuing© computer.

Non-Subjective Valuing© as often as needed conducts fresh research of societal values to serve as updated basic numerals for its calculations to change with the times and keep being correct in unearthing ever-current societal values.

Said method and procedure may be used simply to discover the current market dollar value of a specific entity as described in drawings FIG. 11 through FIG. 23. By establishing the NORM in any entity group (the unit that is exact average in at least one, or the desired number of value-influencing attributes and its hypothetical price, such unit having 100 points, corresponding to its 100% constitution), any test entity may be compared to the NORM, and that test entity's monetary value discovered based on its precise quality difference from the 100% value of the NORM. For example, if the NORM house in a specific neighborhood costs $100,000 (the fictitious house that is average in all of its contemplated qualities as mutually selected by the provider and the user, at least one quality being selected) then if a test house in the relevant neighborhood collects 107 total points on the quantified comparison scale, that particular test house will have a current dollar value of $107,000. Another test house collecting 91 points will have a value of $91,000. Each characteristic (one or more) is assigned its proper operative importance weigh. The condition and the quality of the plumbing may be important to 3.78%, the size of the backyard to a point of 7.94%, and so on, or homes may be compared on one single quality only. For example, in this example, given the $100,000 average house in the given neighborhood, if the plumbing is assigned an importance factor of 3.78%, then it means that in this area, a normal person pays $3780 for plumbing that is average. Now if a test house has plumbing that turns out to be 30% better than normal, then the computer adds 30% of $3780 to the value of the test home. All other things being equal, this test house is worth $101,134, and so on.

DESCRIPTION OF THE DRAWINGS 10 relates to the Structure of the Database.
20 describes the quantified record of an artist or entity.
30 identifies the workings of quantified record of artist or entity (I=1,2, . . . m).
31 relates to Specific Information.
32 refers to Entity Information.
321 reports Artwork/Entity 1.
322 appertains to the workings of Artwork/Entity j(j=1,2, . . . $n_j$).
3221 refers to Price ($P_{ij}$).
3222 identifies Quantified Point for Factor 1.
3223 denotes the formula used for Quantified Point for Factor k(k=1,2, . . . I($Q_{ijk}$).
3224 communicates Quantified Point for Factor 1.
32n refers to Artwork/Entity $n_j$.
33 identifies Average Information.
331 catalogs Norm Artwork/Entity.
3311 denotes the math for Average Price Discovery ($P_{jn}$=[$\Sigma P_i/nj$].
3312 relates to Average Point for Factor 1.
3313 Average Point Factor Formula k($Q^{ink}$=[$\Sigma Q^{ijk}$)$n^i$].
3314 signals Average Point for Factor 1.
332 denotes Individual Adjustment Factors Formula ($I_{ip}$O (p(v)=1,2 . . . u).
40 indicates Record of Artist/Entity m.
50 designates the workings of Environmental Adjustment Factors ($E_q$)(q=1,2, . . . , v).

FIG. 1 depicts the sequence/progression and graphical view of the workings of the live Non-Subjective Valuing© database or the structure of said database, 10–50.
60 describes the step of the initial connection.
61 represents the actual bridge.
62 refers to the Modem.
63 refers to the I/O ports.
64 describes the utility of the printer.
65 ROM reference.
66 references the CPU function of the relevant calculations.
67 database reference in the sequence.
68 RAM identification.
69 cataloging Disc Drive functions.
70 delineating monitor functions.
71 feed-back function description.

FIG. 2 portrays the arrangement and cycle of the associated hardware and their functions in sequence, 60–71.
80 explains the first step in the sequence.
81 defines quiz to user to determine user's preferences.
82 value-affecting factor discovery step.
83 indicating that the central computer has on its database results of the surveys and analyses.
84 describes user's preference-conversion to analog pie slices.
85 representing the sequential step of the comparison of the individual member of a group to the exactly average member of that group, the computer now calculating the precise monetary value of the probed test entity.
86 denoting the computer recovering the NORM.
87 marking the step of calculating the environmental factors.
88 signalling the conclusive step of the central computer transmitting the results to the user.

FIG. 3 represents and describes the interactive steps taken by the user and the central computer, 80–87.

FIG. 4 illustrates the Non-Subjective Valuing© process, including the nature and sequence of the fact-finding survey series, and including denoting the relevant employed math formulas leading to the conclusive dollar value numbers, 1–9.

Figure 5:
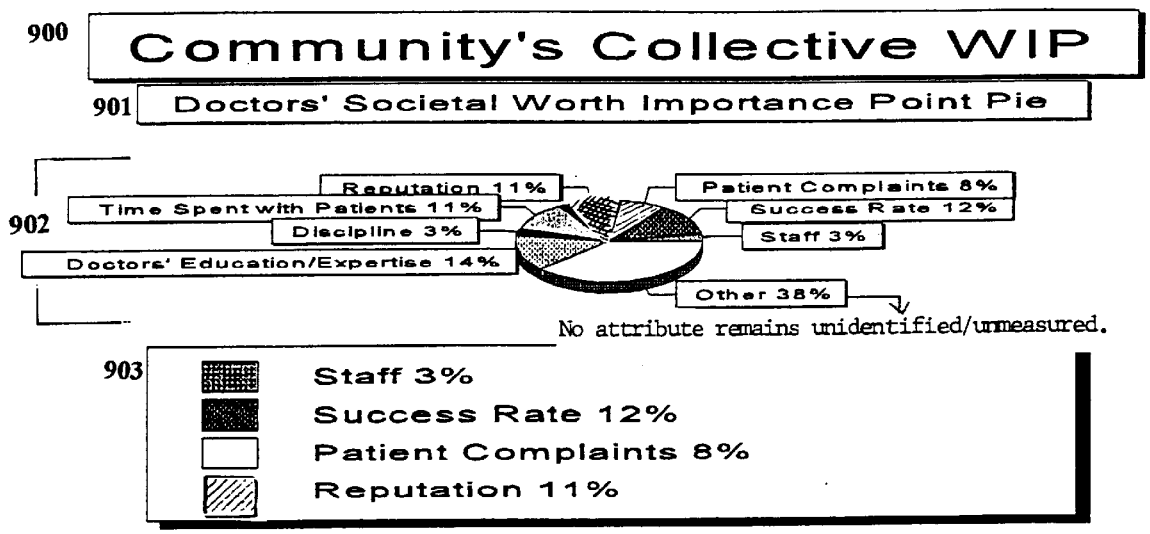
FIG. 5 exemplifies the constitution of a Non-Subjective Valuing© societal PIE, using the hypothetical qualities of "doctors," relating to Step ● of FIG. 4.

FIG. 5 exemplifies the constitution of a Non-Subjective Valuing© societal PIE, using the hypothetical qualities of "doctors," relating to Step ● of FIG. 4; 900 identifying possessor of the preference pie, 901 identifying the probed entity, 902 depicting some considered value-affecting factors, 903 lists some such factors referenced in 902.

FIG. 5/a pictures the form of a Non-Subjective Valuing© individual PIE, using a few hypothetical qualities of "doctors," relating to Step z,3 of FIG. 4; 904 identifies the owner of the WIP pie, (a specific prospective patient in this case), 905 references the probed test group (doctors in this illustration), 906 catalogs a few considered value-affecting elements, 907 lists a few contemplated components.

Figure 6:
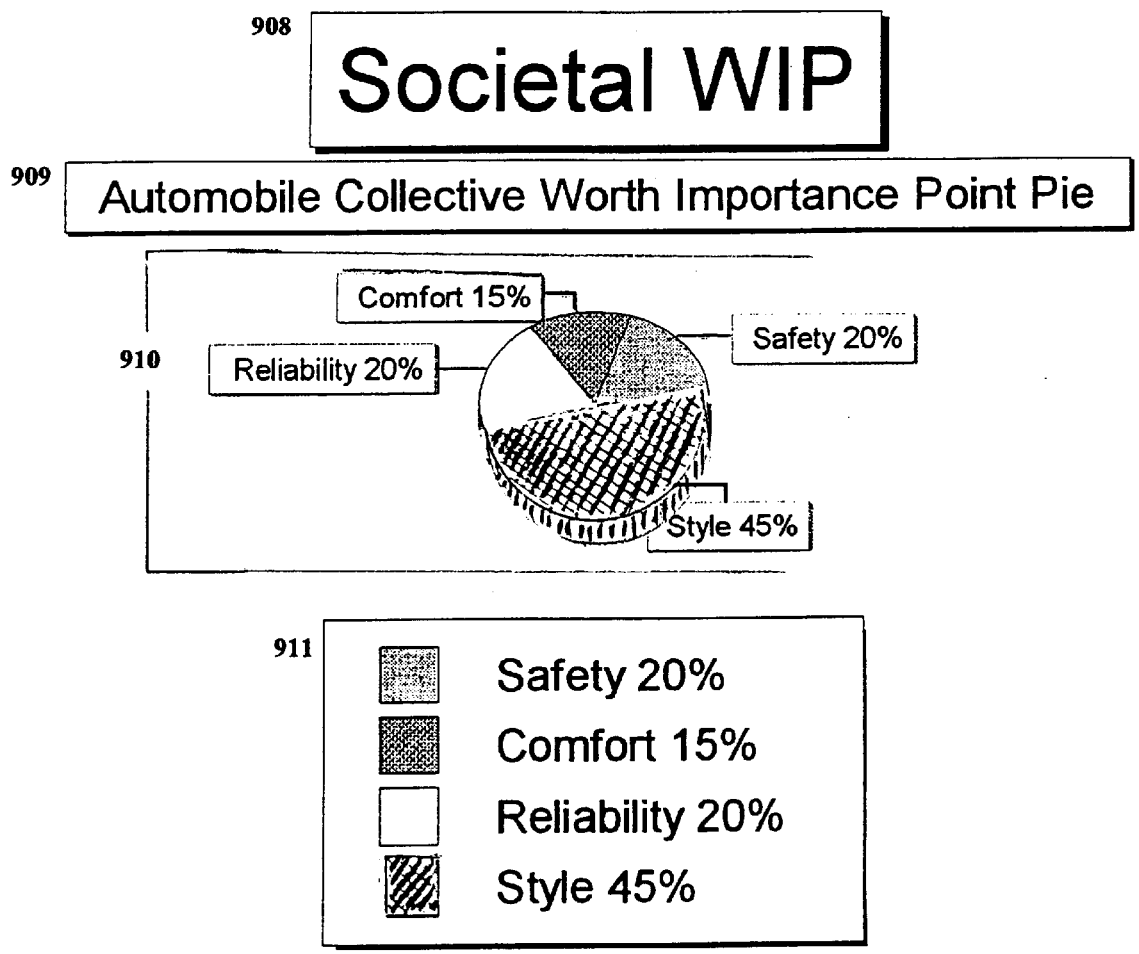
FIG. 6 enacts the make of a Non-Subjective Valuing© societal PIE, using the hypothetical qualities of "cars," relating to Step ● of FIG. 4.

FIG. 6 enacts the make of a Non-Subjective Valuing© societal PIE, using the hypothetical qualities of "cars" as they might be rated by a collective or community, relating to Step ● of FIG. 4; 908 identifying holder of the WIP pie, 909 classifies the probed test group, 910 renders how the survey series leads to quantified collectively perceived comparable pie slice sizes representing relative importance percentages for a few selected qualities, 911 lists these chosen attributes and their values expressed in percentage numbers.

FIG. 7 pictures the mold of a Non-Subjective Valuing© individual PIE, using the hypothetical qualities of "cars," relating to Step ● of FIG. 4, 912 identifying the owner of the WIP pie, 913 denoting the probed entity group, 914 and 915 demonstrating the possible differences in numbers concerning relative importance in reference to FIG. 6, showing the present invention's method of reflecting and accomodating communal and individual value systems for calculations of divergent monetary worth.

FIG. 8 symbolizes the composition of a Non-Subjective Valuing© societal PIE, using many hypothetical qualities of "doctors," relating to Step ● of FIG. 4, 916 identifying the WIP pie owner, 918 depicting some value-affecting factors and how they are represented by relative pie sizes, 919 lists some worth-influencing considerations, their relative importance expressed in percentages.

FIG. 9 depicts the example for an individual company's preference Worth Importance Point Pie (WIP), using a Taxi Cab Company's hypothetical preference allocations. Example for group pies: a family of four must first constitute their unique WIP with the help of the Non-Subjective Valuing© computer pre-allocating the precise relative significance of votes as cast by each member of the family in percentage-comparison to the other family members. For instance, the head of the family's, the 40 year-old father's opinion will weigh specifically more in the balance than that of the 6-year old son's, the family members negotiating such respective weights in response to the Non-Subjective Valuing© computer's relevant pre-quiz, the computer storing the results of said pre-quiz for subsequent accurate calculation, quantifying the entered respective votes by the family members according to the relative weigh in that particular family's terms. The illustrated Taxi Cab Company's preference pie too is arrived at by their president, board members, drivers, dispatchers etc., casting votes having varying importance, prior to unearthing the ultimate slice sizes of their company's WIP pie. 920 depicts the proprietor of the WIP pie following the company's internal allocation of relative weights as to various input by respective individuals or group of individuals, (the sub-pie (not illustrated) of how relatively important are said individuals' opinions concerning the probed entity), 921 refers to the fact that there can be innumerable factors a taxi cab company might want to consider relative to a car, here only illustrating the methodolgy by five such value-affecting components, 922 illustrates the depiction of the competing elements by pie slice sizes, 923 lists some such elements by percentage numbers to be used in the calculation series per FIG. 4.

Figure 10:
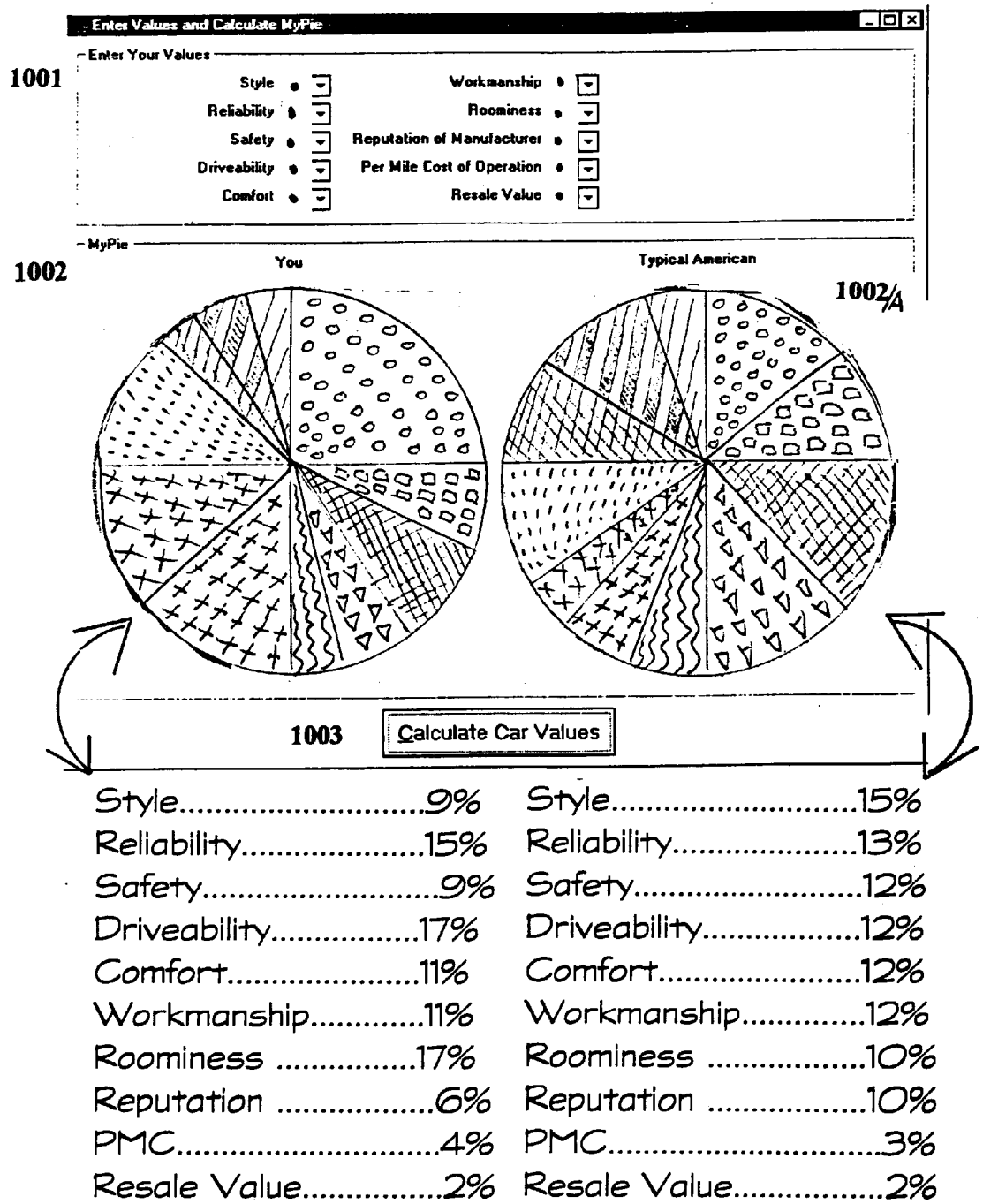
FIG. 10 shows for comparison a hypothetical societal WIP pie versus a fictitious individual's WIP pie.

FIG. 10 for comparison depicts side by side a societal WIP pie, 1002, and an individual WIP pie, 1002/A, as well as illustrates how the user selects his own values 0–10, 10 being most important, concerning the various value-affecting elements, 1001, and how the values are respectively calculated, in this particular illustration using only six new cars and ten value-affecting factors. At least one factor must be used, but there is no limit to how many woth-influencing components may be included. There can me 10,000 or more pie slices accurately to measure the monetary value of a specific entity. The first pie, 1002, titled "You," contains the respective slices following this particular user's entering his private preferences by rating the selected value-affecting qualities, by entering 0–10, 10 being most important on the "Enter Your Values" section, 1001, concerning the chosen relevant elements. In this example, concerning new cars, this user selected for importance-to-him 4 for style, 7 for reliability, 4 for safety, 8 for driveability, 5 for comfort, 5 for workmanship, 8 for roominess, 3 for reputation, 2 for pmc and 1 for resale value, 1002. The computer converted these unique ratings into depicted corresponding pie slices, or percentage values as shown in the pie entitled "You," 1002. (To speed the process, the user is initially informed to enter no rating for anything that is not more or less important to him than "normal," since the computer automatically counts unrated attributes as having average (5) importance.) The "Typical American" WIP, 1002/A pie depicts hypothetical results of the surveys as both as pie slices and as a list, inventorying the relevant unearthed respective societal, or collective, values for the selected attributes. (All discoverable attributes that might be common in a probed entity group must be measured for accurate comparison, but at least one such characteristic must be measured to employ this method.), 1003 illustrates the last step the user must take before the computer calculates monetary values of the probed test entity.

FIG. 11 depicts a few of the ranking lists this system can provide, using six new cars to illustrate. 1101 shows the user how to obtain such ranking lists, instructing him to click on column heading such as True Value, or Style and so on, for the computer to rank all the cars best to worst according to the selected quality. 1101/A illustrates how probed entity group members are depicted, here by make and model of automobiles. 1102 shows the respective known retail prices of the cars listed in the preceding columns, 1103 displays the wholesale prices of those automobiles, 1104 provides the surveyed fair (average) market price of each car, 1105 gives the user the true monetary value of each automobile, compared on all their qualities, in terms of an optimally informed society, 1106 provides the inquirer the dollar values of those cars as if the user himself were ideally knowledgeable about such automobiles, or knew everything he wanted to know about cars and the car market, 1107 displays the monetary savings pertaining to each automobile (the list reproduced here from the computer screen put these cars in order of this particular column), 1108 depicts the respective savings in percentage numbers (for instance, of these six cars, these hypothetical numbers indicate that as far as all that these cars in fact have and do, the Ford Crown Victoria is by far the best buy as far as saving money is concerned, all other things being equal), 1109 shows the user the respective societally discovered (average) ratings of those cars as far as their respective styles are concerned, 1110 inventories the accurately measured respective factors of reliability relevant to those cars, 1111 lists the true safety ratings of those cars 0–10,10 being safest, 1112 catalogues the accurately measured driveability ratings of these automobiles and 1113 lists the cars' respective comfort levels, and so on.

Figure 12:
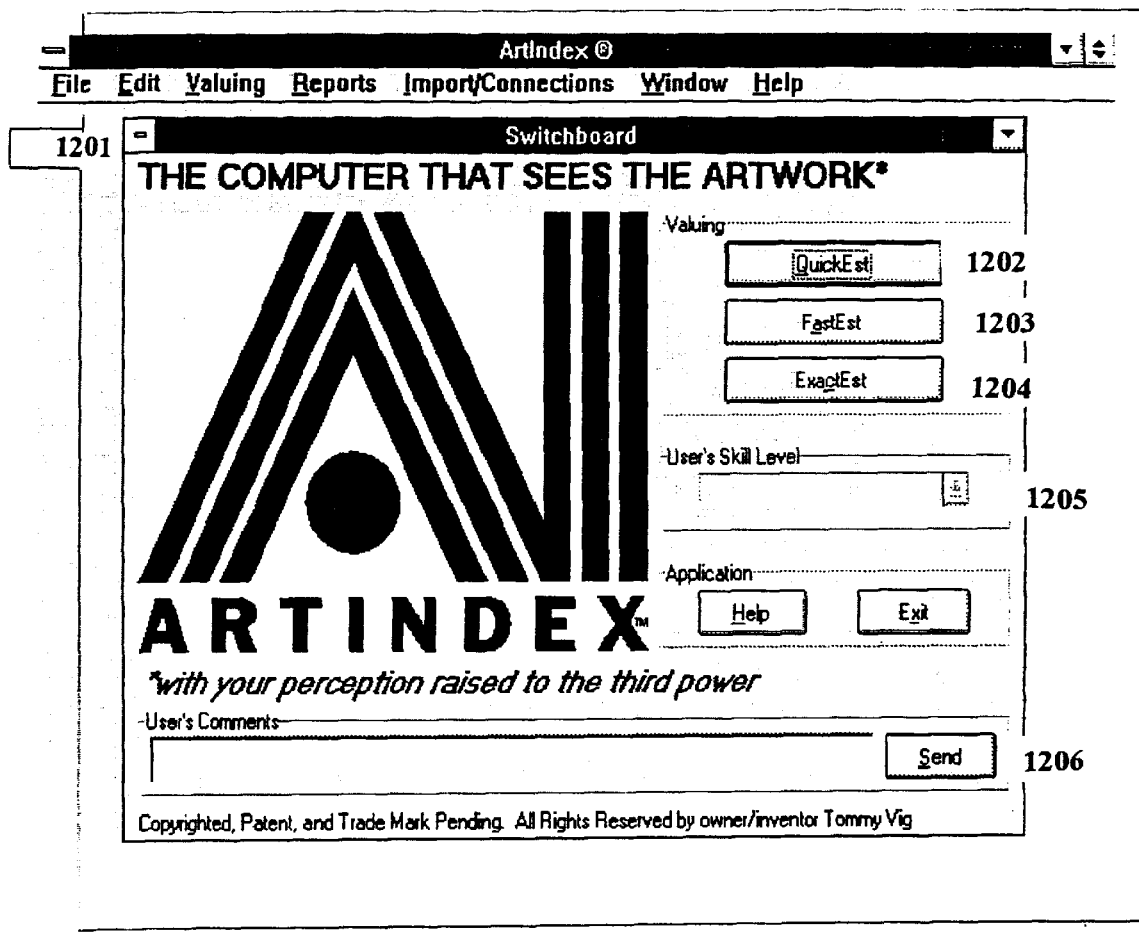
FIG. 12 computer screen reproduction for works of art application of the invention FIG. 13 computer screen reproduction for step of selecting artist for appraising one of his works FIG. 14 computer screen reproduction for a step of how precise value is determined by the observer of a work of art by his inputting facts about that work of art which reflections the computer then automatically quantifies and converts into exact monetary value FIG. 15 computer screen reproduction for illuminating some value-affecting factors regarding works of art FIG. 16 computer screen reproduction for how this invention works for family residences FIG. 17 computer screen reproduction for illustrating the valuing of homes in a certain section of a city FIG. 18 computer screen reproduction for demonstrating how various value-affecting elements impact on the worth of a home in a certain section of a city FIG. 19 computer screen reproduction for an example for choices the user may make respecting value-affecting factors FIG. 20 computer screen reproduction for title page for the valuing of pre-owned automobiles FIG. 21 computer screen reproduction for some choices the user will have relevant to the valuing of used cars FIG. 22 computer screen reproduction for illustrating a specific used automobile's possible value-affecting factors and one's ratings of same that is similar to providing the opportunity for the user to evaluate aspects of any observed entity (can opener, computer, university, vacation, philosophy, tenet, service, etc.)

FIG. 12 is the reproduction of the initial screen from the computer whose database happens to be programmed to value works of art, 1201 rendering the picture of the relevant Switchboard, 1202 depicting this invention's selection technique leading to the system considering from one to eight value affecting factors; 1203 shows how to select the inclusion in the system's calculation 12–24 factors; 1204 displays the way to pick 300 or more value affecting factors for more and more exact valuing; 1205 indicates the spot where the user should enter his own considered level of expertise, 10 denoting a perfect expert in the relevant field, 0 signifying one who knows nothing about the pertinent area, since the observer's proficiency can be a factor, for instance, in such works of art application, the director of the Getty Center would probably rate himself an 8 or a 9, while an average art dealer might enter a 6 or a 7, this ingredient going to the ultimate "margin of error" determination by the computer, as in case of a 10 rating, there will be no margin of error, whereas in case of a 0 rating, the margin of error could be as high as 50%, because the unique probed work of art one looks at as he enters the ratings must be assessed for various qualities, and while the size, medium, subject matter, decorative value, condition, etc., are relatively easy to judge, the quality and some other facts about a work of art are harder to ascertain, and need more expertise; 1206 is reserved for feedback including critique and commentary, to the central computer from the user.

Figure 13:
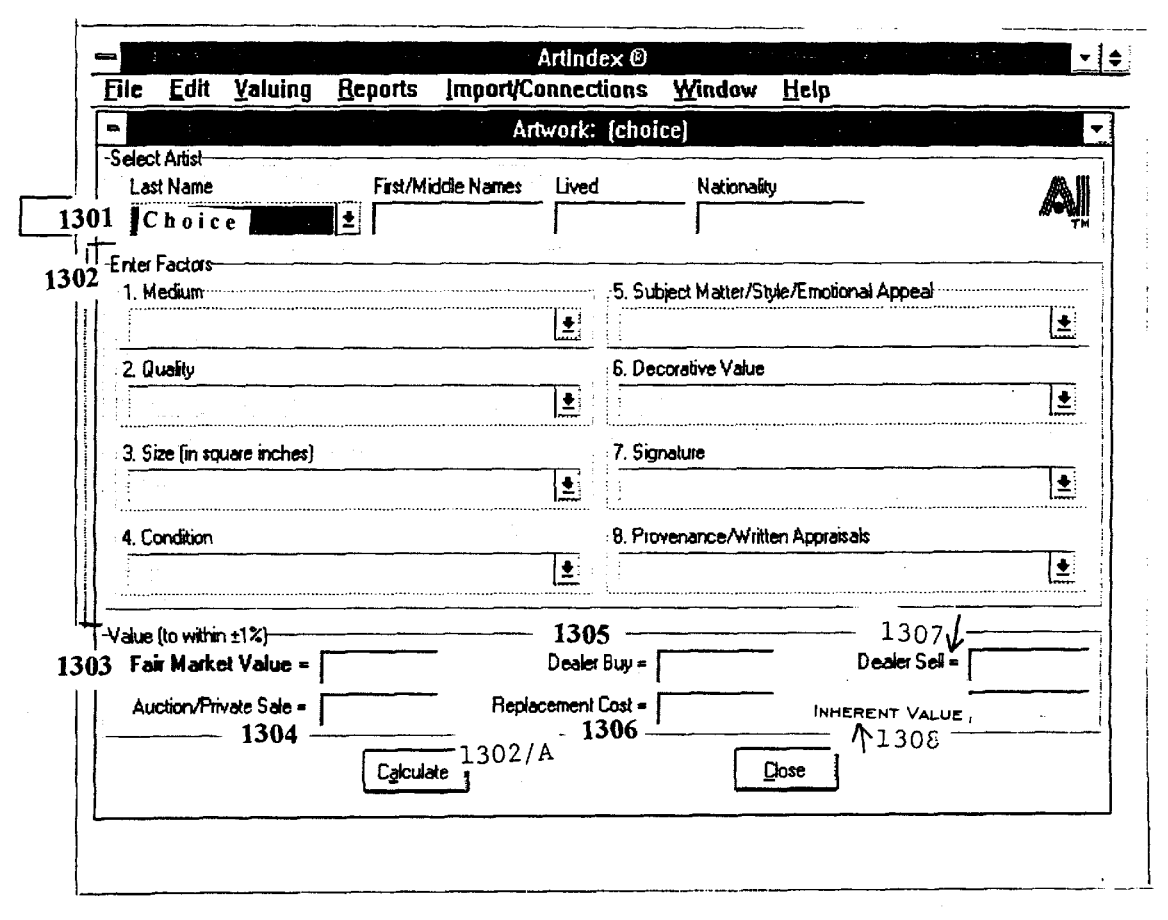

FIG. 13 shows the view following the screen to the one depicted in FIG. 12, 1301 indicating in this particular case of artwork-valuing, the selection of an artist by the user by his last name, whose first name, date of birth and death and nationality are then automatically displayed by the computer on the same line; 1302 displays eight value-affecting factors as a general example, relative to the probed entity each such component to be evaluated by the user who is observing the entity, or in this case, the specific target artwork, the rating method being 0–10, 10 being best; the drop down combo boxes indicating precisely what each rating number stands for; 1303–1308 work any time after the user presses the CALCULATE button notrf as 302/A; 1303 giving the probed entity's FMV, 1304 shows the indicated auction price of the specific probed artwork, 1305 displays the specific test piece's manifested price when sold to a gallery, 1306 is the appraised cost of replacement, 1307 shows what a customer is expected to pay to an art dealer for the target work, while 1308 figures the true value of the test artwork according to the method FIG. 13 actually indicating precisely how this system is usable for this valuation of anything at all, be it dentists, clothes dryers, restaurants, motorcycles, colleges, HMOs, government environmental programs, or anything else, by switching the value-affecting factors and the NORM to match any selected probed group.

Figure 14:
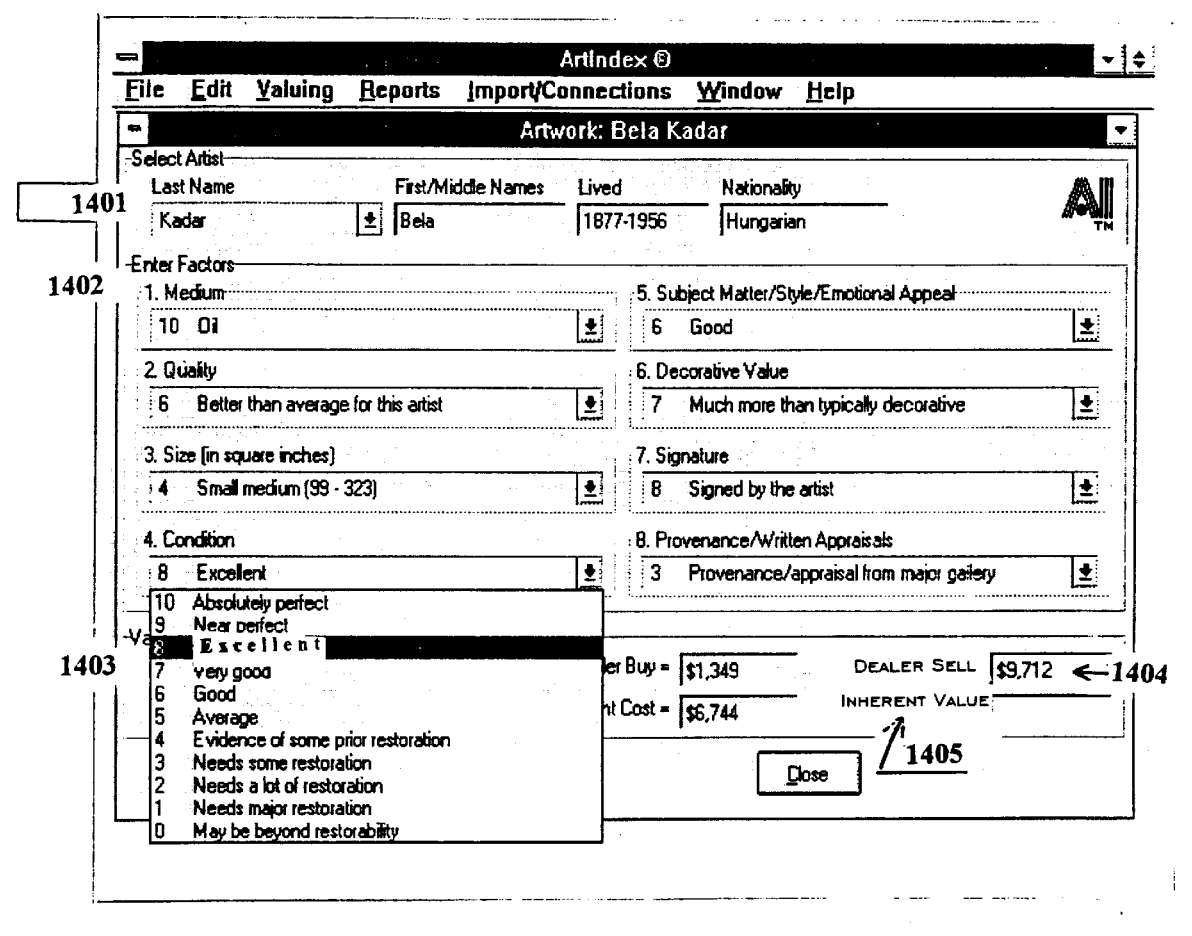

FIG. 14 is an example for how the method works for unearthing precise market value, 1401 showing some basic facts about the probed entity, 1402 depicting some relevant value-affecting factors to be rated by the user who is observing the target entity, 1403 exemplifying the accurate description in each case precisely what each number in the employed 0–10, 10 being best rating system stands for, 1404 shows retail price and 1405 indicates true value figured according to the present method.

Figure 15:

FIG. 15 is another example for how this application works for artworks, or anything else, 1501 displaying the chosen entity group -here the selected artist—1502 displays some relevant value-affecting items, and 1503 through 1507 shows the varying expectable prices for the target entity, while 1508 displays its true value according to claim 36 appraising method and procedure.

Figure 16:
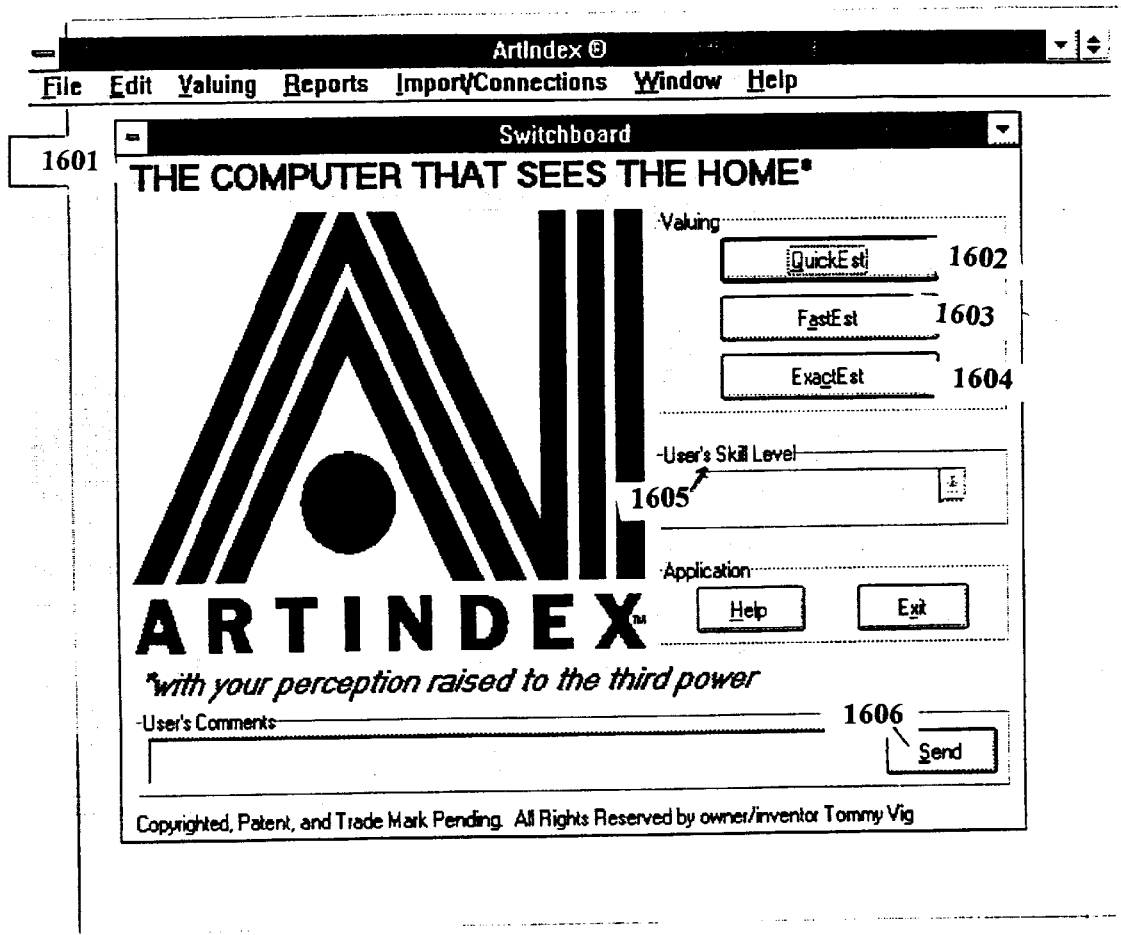

FIG. 16 presents another example, the appraisals of homes, 1601 depicting how the object field is identified, and 1602, 1603 and 1604 demonstrate the user's ability to pick the exactness of the valuing process, that is on one, many, or a great many worth-influencing considerations; 1605 allows a real estate agent to enter a higher rating than a shopper would, highlighting the observer's role here, with the appropriate margin of error noted by the system, 1606 serves continually to improve the system by accepting users' comments.

Figure 17:
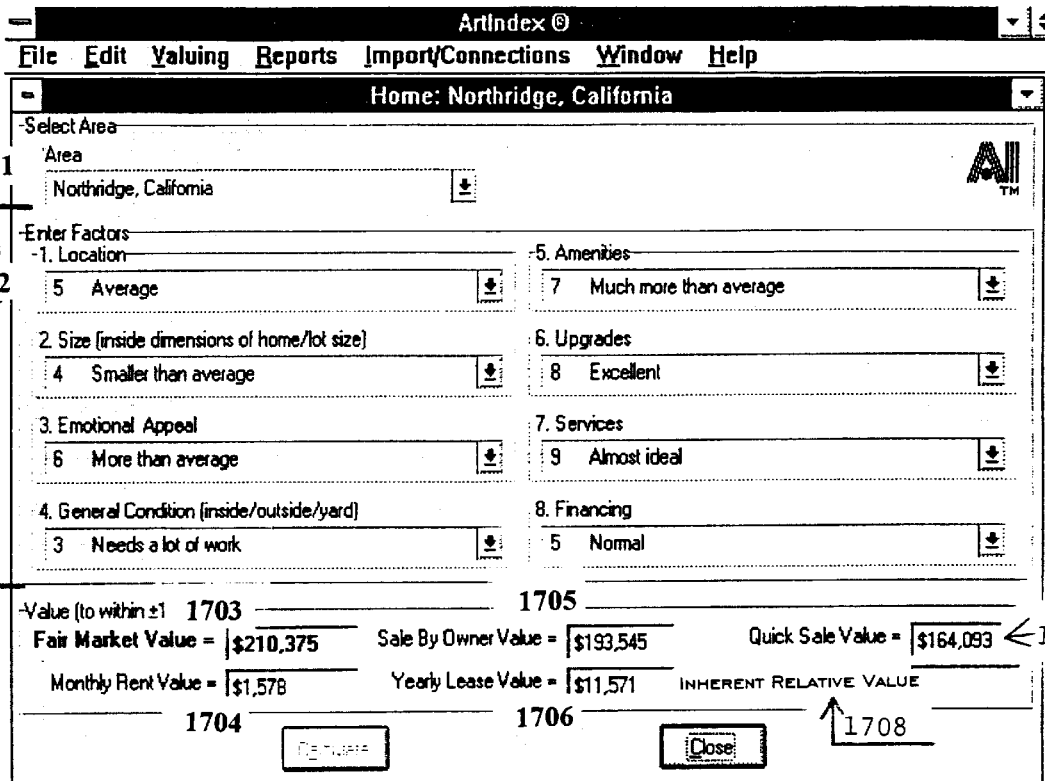

FIG. 17 shows how the method works for homes. The price of an average home in Northridge, Calif. (or in any block in any city) is on the database here, fused with the precise average characteristics and attributes that are relevant to such a home, forming the NORM unit 1701 shows the entire computer screen relevant to how the present method works for family homes; 1702 identifies a few such worth-influencing qualities that the observer rates o-10, 10 being best, and on that basis 1703–1707 demonstrate the various applicable expected prices, while 1708 will show the true value of the probed home as calculated by the method set forth in claim 36.

FIG. 18 Demonstrates the dollar difference the contrasting ratings result in, compared to FIG. 17, showing that assigning weight differences to various value-affecting factors is essential, great plumbing has a certain value and so does a large backyard, FIG. 18 demonstrating how the present system reconciles the trade-offs, 1801 identifying the area, 1802 displaying some value-affecting components, 1803–1807 providing the applicable prices and 1808 giving the true value of the home in terms of claim 36.

FIG. 19 demonstrates the method and procedure for the appraisal of homes, this time showing, 1906, how the drop down combo boxes precisely identify what each rating number stands for to obtain precise, uniformly reliable results; 1901 depicting the selected area; 1902 specifying the selected relevant worth-influencing factors to be rated; 1904 describing the margin of error according to the process set forth in FIG. 12, 1205; 1903 identifying the area FMV is provided; and 1905 delineating the relevant expectable monthly rent amount, 1905 as well indicating that in different fields different considerations are relevant and the present system accomodates the proper contemplations in each probed entity group.

Figure 20:
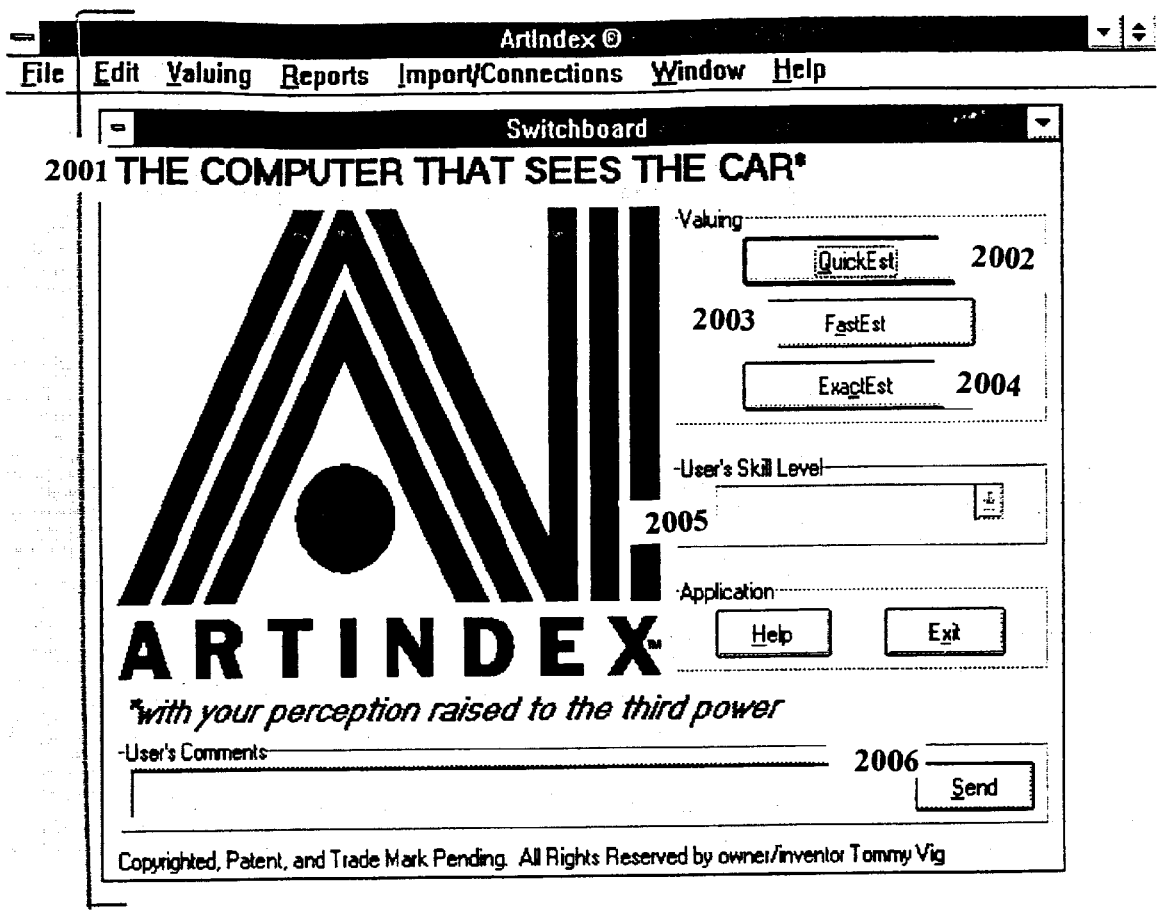

FIG. 20 2001 denotes the initial interactive computer screen for the evaluation of used cars, identifying the selection area for the user to choose the level of valuing certainty to be performed by the system, by selecting one to eight factors to be matched, QuickEst, or quickest estimate, 2002, or FastEst, or fast estimate, 2003, matching the target entity to the NORM on eight to twenty-four characteristics; or pressing ExactEst selection, or exact estimate 2004, for 300 or more comparisons that takes longer than either 2002 or 2003, but that is the method capable of comparing all discoverable qualities of a probed test entity with its NORM unit, making the most accurate monetary value estimate a probed target entity, in this case, a specific used car, while 2005 deals with the variations of the knowledge of the observer, a used car dealer being able more exactly to tell what he is looking at than an amateur, leading to a different posted margin of error respecting the calculations, 2006 accepting comments and critique from the user continually to improve the system.

Figure 21:

FIG. 21 represents the screen that follows the one described in FIG. 20, 2101 showing the selecting area, 2102 giving an example of a few relevant value-affecting factors to be rated by the user who is observing a target vehicle, 2103 through 2106 detailing the various monetary estimates in respecting situations 2107 denoting the wholesale value for the probed car for instance, and 2108 exhibiting the area where the user is provided by the true value of the used car or other probed entity, not its predictable market price, according to the present method.

FIG. 22 depicts the screen following the one described in FIG. 21, which is the one that appears as a result of the user pressing the CALCULATE button, 2201 showing the user's selection of the probed entity, here a 1993 Camaro automobile, 2202 depicting the user's assessment by numbers of various qualities of the observed target, here the referenced vehicle; 2203 exhibiting the so-called "FMV," 2204 the expected private sale price, 2205 the price a dealer would charge for said target vehicle or entity, 2206 presenting the price for replacing said target vehicle or probed entity, 2207 displaying the target's wholesale price, while 2208 producing for the user's consideration the true value of the vehicle or entity according to the method and procedure outlined here in.

Figure 23:
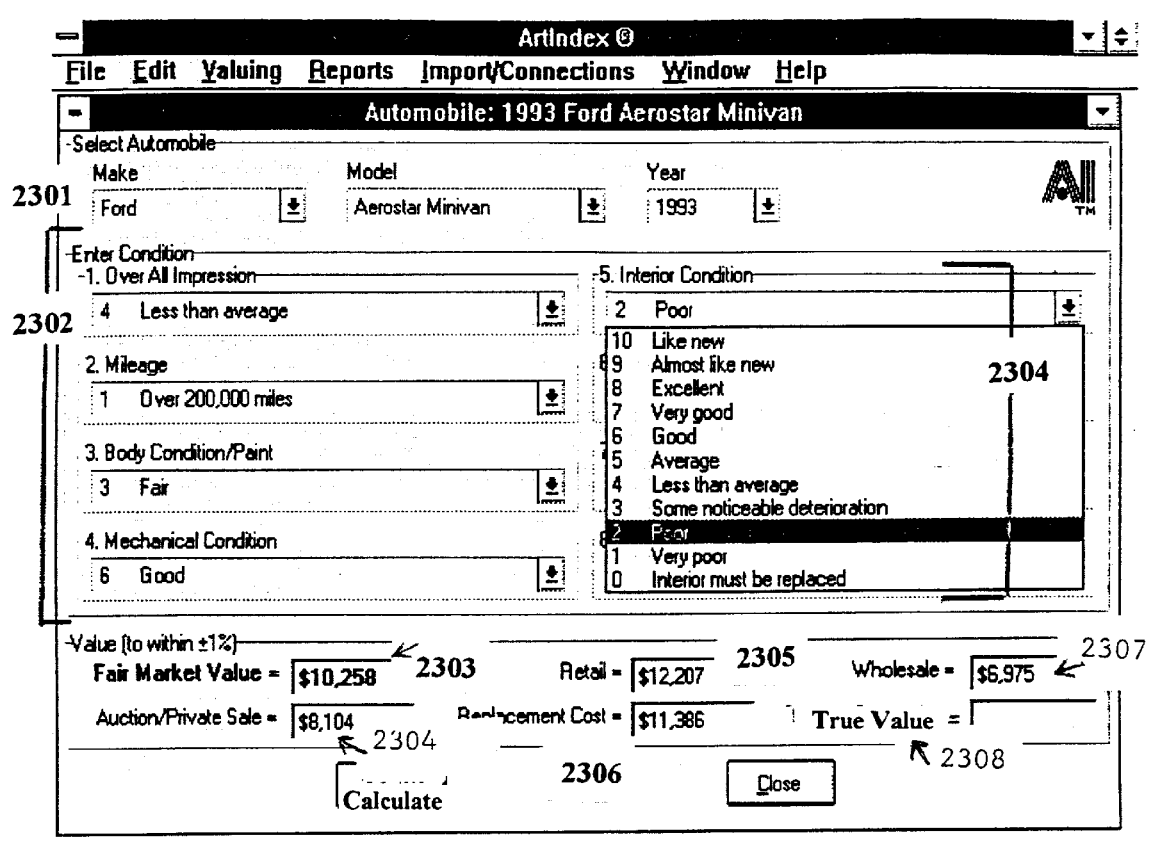

FIG. 23 shows a variation or another example, specifically how different quantified ratings affect the calculation outcome, that is how by assigning different weights to each value-affecting factor and considering the observing user's skill level, varying price and value estimates result, 2301 displaying the user-selected car or entity; 2302 presenting some ratable value-affeting characteristics, 2309 demonstrating how the system assists the user in providing precise descriptions for the meanings of all eleven ratings for all drop down combo boxes, whether the inquirer chooses to compare the target entity to the NORM unit on one or 5000 qualities; 2303–2307 depicting the various resulting expectable prices; and 2308 revealing the true monetary value of the probed car or other selected target or test entity in terms of the present calculation method and process for the user's consideration, that is showing the inquirer what the test car or other probed entity would be worth to a society once such society were optimally knowledgable about the relevant subject matter, the screen not showing the Value to You area that provides the user the target entity's true value to the user himself, were he ideally knowledgeable about the probed field, in this case about cars in general and the 1993 Ford Aerostar Minivan in particular, or knew everything he wanted to know both about the probed area generally and about the unique target entity specifically.

Figure 24:
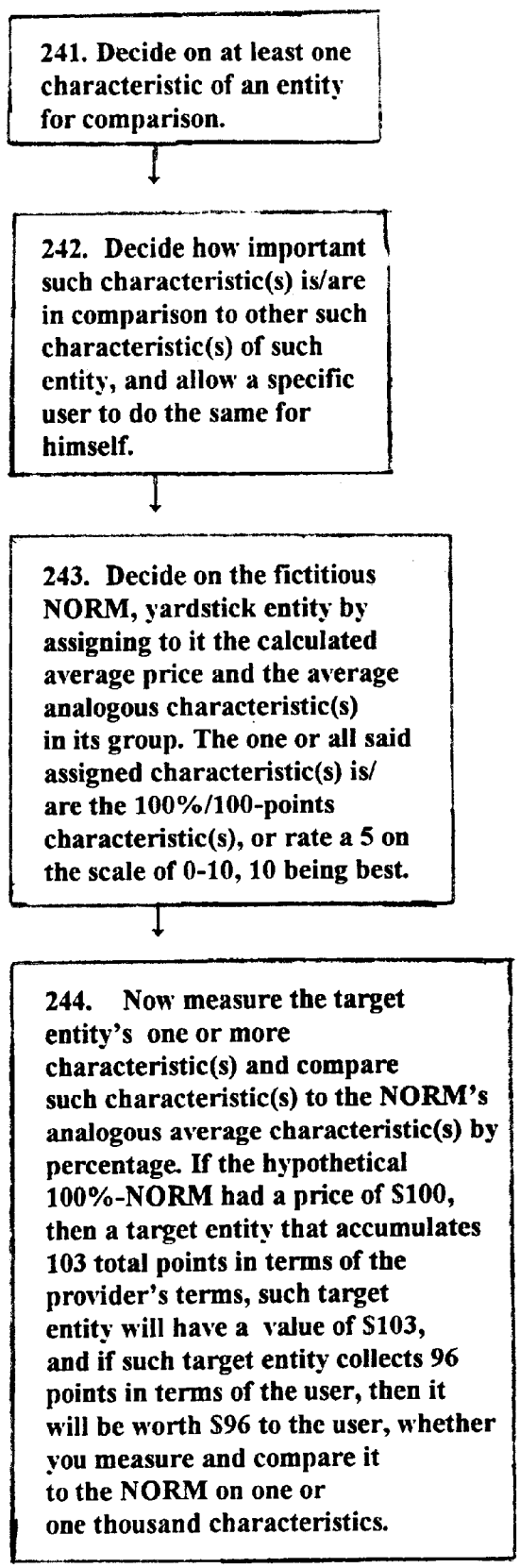

FIG. 24 demonstrates how this method and process may be used employing as few as one comparable characteristics.
241 describes the initial step of deciding on a characteristic.
242 denotes the step of determining such characteristic's relative importance.
243 indicates the step of determining the NORM.
244 explains the relevant math.

FIG. 25 shows the construction for the pre-pie in case of a group assessment process.
2501 indicates the initial step a group must take.
2502 explains the relevant math.

What is claimed is:

1. A method and procedure, implemented on a computer system that dynamically links data, used in conjunction with and pursuant to a survey series, said survey series employing, among others, the science of inductive statistics, accurate sampling and central tendency; and said method and procedure having at least one parameter; said method and procedure mapping data into frame or table type representation, storing and mapping said data in multiple, associated knowledge databases on said computer system; said method and procedure employing infinitely apportionable analogous weigh quantification, relative to said method and procedure's submission that any said probed test entity's sum (100%) constitution always consists of not more and not less than what everybody can then think of said probed test entity; said method and procedure having the purpose of discovering both the communal and particular monetary value of any said probed test entity in terms of a hypothetically ideally informed society and/or a theoretically optimally knowledgeable unique individual, regardless of said probed test entity's actual market price; said method and procedure comprising the steps of:

a) surveying an accurately representative cross section of a selected community or any group of two or more to unearth every currently discoverable characteristic, advantage, disadvantage, quality, trait, virtue, endowment, peculiarity, feature, distinction, property, effect, component, ingredient, part and aspect relevant to said probed entity group or concept, be said probed test entity group pertaining to morals, laws, rules, behavior, thinking sports, fairness, fights, wars, peace, agreements, respectability, power, regulations, prestige, social justice, music, art, taste, fashion, politics, politicians, policies, the concept of "good" and "bad", philosophies, concepts, religion, laws, elections, propositions, objects, goods, services or any other known or imaginable entity;

b) polling said typical segment of said designated society or any group of two or more, to unearth and then express
in percentage-terms, the prevailing precise collectively perceived relative weigh of each said characteristic, quality, trait, feature, property and aspect relevant to said probed entity group;

c) an interactive computer system, employing at least one monitor screen, or similar display device, conducting a quiz in reference to the user, discovering and expressing in percentage-terms the exact comparable importance to said user, of each said characteristic, quality, trait, feature, property, attribute, and aspect relevant to said probed entity group;

d) calculating the monetary value of an assumed unit in said designated entity group which hypothetical unit is computed exact average, rating a 5 on an infinitely divisible 0–10. 10 being best scale, on every one of its characteristics, qualities, traits, features, properties, attributes and aspects; said fictitious unit called the NORM, said NORM unit having a total value of 100 points, representing a 100% pie constituting the sum total make up of said NORM unit, this 100% expressing the aggregate of said slices of a pie, or any other graphic analog depiction of appropriate portions of the whole, as long as such other portrayal faithfully pictures the relative importance weighs in percentages, or in another manner, of the respective value-affecting components making up the total constitution of the said probed test entity;

e) storing on said computer's database the accurately calculated hypothetical market price of said fictitious, average, 100% NORM unit;

f) further storing on said computer's database all said average NORM unit's appertaining hypothetically perfectly average characteristics, qualities, traits, features, properties and aspects, the analogue value numbers accurately quantified to represent the said precise relative societal importance of all said characteristics, qualities, traits, features, properties and aspects as revealed by said poll referenced in b) above, such representation called the societal Worth Importance Point pie (WIP), said pie's slice sizes representing the respective percentage proportions depicting said respective relative societal weights to said community of all said characteristics, qualities, traits, features, properties and aspects;

g) further storing on said computer's database the respective value numbers accurately quantified to represent said individual user's precise weigh preferences or the respective relative importance of all said characteristics, qualities, traits, features, properties and aspects as revealed by said quiz, referenced in c) above, to parallel said NORM's said comparable average characteristics, qualities, traits, features, properties and aspects, such representation called the individual Worth Importance Point pie (WIP), said pie's slice sizes representing said varying percentage proportions depicting said individual user's said preferred respective relative weigh allocations relative to each said characteristic, quality, trait, feature, property and aspect;

h) further storing on said computer's database said relevant real numbers accurately quantified in terms of said poll referenced in b) above, representing each tested and measured said actual characteristic, quality, trait, feature, property and aspect, as well as the real market price of each said real member of said probed test entity group;

i) employing said knowledge tables, said computer comparing the said quantified numbers that represent the accurately measured real analogous actual characteristics, qualities, traits, features, properties and aspects of each real member of said probed test entity group with said quantified numbers representing said corresponding characteristics, qualities, traits, features, properties and aspects of said fictitious NORM unit, said comparison resulting in comparable respective percentage values for each said member of said probed test entity group;

j) for more exact calculations a "General Factors" value-affecting coordinate is installed on said computer system, mirroring the relative weight-affects of discovered influencing considerations relevant to the entire said probed test entity group or one or some members of said probed test entity group, such environmental worth-influencing component being applied proportionately to sway said monetary value calculations, k) said computer converting, on the basis of said societal WIP, referenced in b) and f) above, said respective percentage values of each said member of said probed test entity group into respective monetary figures, by matching each said probed test entity member's said comparable percentage relationship to the said 100% or average monetary value of said NORM unit;

l) said computer further similarly converting, on the basis of said individual WIP, referenced in c) and g) above, said respective percentage values of each said actual member of said probed test entity group into monetary figures, by comparing each said real entity member's said respective percentage relationship to the said 100% hypothetical monetary value of said fictitious NORM unit;

m) said computer then displaying for comparison, on said monitor, the respective societal monetary value, called True Value, of each said probed test entity group member, as well as the respective individual monetary value, called Your Value, of each said probed test entity group member, alongside the known, real respective wholesale and retail market prices of each said probed test entity group member, said comparison revealing (1) the monetary value difference between the societal or True monetary value and actual market price of each said probed test entity, (2) the monetary value difference between the individual or Your monetary value and real, existing market price of each said probed test entity, and (3) the monetary value difference among all said tested entities compared with each other, and (4) facilitating the worth-ranking by said computer of all said actual entities according to their respective said total True Values, or (5) said total Individual Values, or (6) ranking said actual entities on any single one of their said characteristics, qualities, traits, features, properties and aspects, or (7) a specific user-selected combination of said characteristics, qualities, traits, features, properties and aspects, or (8) rank said actual entities according to their said relative differences between said actual individual entities' wholesale and retail prices, or (9) between said actual individual entities' True and Individual Values, or (10) between said actual individual entities' retail prices and True Values, or (11) rank said actual individual entities according to any other single or combined said criteria selected by said user.

2. A method according to claim 1, to establish an exact average unit in any entity group, called the NORM, which is a hypothetical unit in any said probed test entity group that through the method set forth in claim 1, is accurately calculated to be precisely average in every one of its currently socially discoverable characteristics as well as its price, serving as the 100% yardstick unit, to which fictitious NORM unit each actual accurately tested individual member of the entity group is compared on a quantified, value-affecting percentage basis, facilitating an accurate value-measuring of any imaginable entity.

3. A method of a polling series according to claim 1, wherein said sociatelly unearthed data enables the subsequent quantification of every characteristic, quality, trait, feature, property and aspect relevant to any entity group, facilitating accurate monetary comparison of one said real entity with another by comparing each said real entity's actual, accurately measured characteristic, quality, trait, feature, property and aspect to those average, 100%/100 point characteristic, quality, trait, feature, property and aspect of said fictitious NORM entity as revealed in claim 1.

4. A method according to claim 1, wherein by unearthing every said currently discoverable characteristic, quality, trait, feature, property and aspect relevant to a said entity group through said surveys, said process inevitably revealing the present accurate sum total constitution of a representative member of said probed entity group, constituting said indispensable initial step in making possible said accurate contemporary monetary value comparison among said members of said probed test entity group, because while at various times said entity may be many different things to many different people, at no time can said entity be other than everything everybody can then think of it.

5. A method according to claim 1, wherein every said sociatelly currently discoverable characteristic, quality, trait, feature, property and aspect relevant to a said entity group is collectively and individually quantified through said process, such mechanism constituting said indispensable step in making possible an accurate contemporary monetary value comparison among members of said probed test entity group, because accurate comparison of one said entity with another is never possible in the absence of communally and individually quantifying all of said probed test entity group members' respective relevant sociatelly discoverable characteristics, qualities, traits, features, properties and aspects, since if said entities are compared on less than on all of their said collectively discoverable, quantified comparable characteristics, qualities, traits, features, properties and aspects then the so resulting monetary value number so calculated is necessarily inconclusive, subjective and partial, thus being fatally defective as a general accurate judgment of said probed test entity's monetary value.

6. A method according to claim 1, that conclusively discovers a genuine societal monetary value, communal monetary worth, or collective monetary value of said probed test entity, said method and procedure leading to the unearthing of that monetary value which a hypothetically ideally or optimally informed society would say said probed test entity is monetarily worth, said hypothetical society being thus ideally informed by said claim 1 method and procedure, said computer instantly providing said user said probed test entity's precise monetary value in terms of said probed test entity's accurately measured and quantified concrete characteristics, qualities, traits, features, properties and aspects, and while the market price of any said probed entity is decided by buyer and seller in a free market, the accurate monetary value of said probed entity, as distinct from its market price, since said monetary value as ultimately unearthed by the method and procedure according to claim 1, mirrors said probed test entity's actual, true societal, collective or communal as well as such probed test entity's individual monetary importance, said method and procedure according to claim 1 conclusively answering the questions: What would said ideally knowledgeable society say said probed test entity (a car, an HMO, a philosophy, etc.) is currently worth monetarily if said community knew everything said collective wanted to know about said probed test entity? and What would said unique user say said test probed entity is monetarily worth to said unique user if said unique user knew everything said unique user wanted to know about said probed test entity?, said method facilitating the posting of (1) the societal (True) monetary value of said probed test entity, plus (2) said probed test entity's monetary value to the user (Your Value), and (3) said probed test entity's market price, the first said monetary number denoting the actual value of said probed test entity in terms of said community, the second said monetary number denoting the said actual value of said probed test entity in terms of said individual user, and the third said monetary number advertising said probed test entity's actual said market price, thus said method and procedure referenced in claim 1 clearly revealing and expressing said contrast between (A) said price and (B) said value, and articulating said method's documentation based on claim 1, that the said value (B) of a said probed test entity is not necessarily what somebody (or everybody) pays for said probed test entity (A), and neither is said true monetary value (B) of said probed test entity necessarily related to the cost of manufacturing or creating said probed test entity (A), since the said true monetary value (B) of any said probed test entity can be unearthed by said method according to claim 1, while the said market price (A) of said probed test entity is reached by a different method and procedure and constitues a totally different notion, said market price (A) of said probed test entity being clearly that price (A) that people with little or no information about said probed test entity pay for said entity, said price (A) therefore cannot, by definition, possibly represent said probed test entity's said true value (B).

7. A method according to claim 1, that conclusively discovers and in seconds provides the user the genuine societal monetary value of a probed test entity, in contrast to said probed test entity's said market price, as said probed test entity's said market price could be discovered by the known method of market research, contrasting said claim 1 procedure ultimately providing said user said probed test entity's said precise and exact calculated true monetary worth in terms of a community, said community hypothetically having ideal or optimum knowledge about said test entity due to said claim 1 method and procedure, plus said claim 1 method and procedure providing said user said probed test entity's calculated monetary worth in terms of said individual user, as if said individual user possessed said maximum information regarding said probed test entity, as opposed to said known market research method discovering and providing said average market price of said probed test entity, calculating from data discovered by said known method of market research measuring how much money people who know very little about said probed test entity currently pay for such probed test entity, said resulting monetary differences expressed by said method and procedure set forth in claims 1, between said average monetary value in terms of the said uninformed customers versus said monetary value in terms of said fully informed customers, the latter called true value, the former called market price, thus said method and procedure according to claim 1 correcting inequity in the market place caused by asymmetric information.

8. A method and computer program according to claim 1, that dynamically links data, used in conjunction with and pursuant to a survey series, having at least one parameter, for discovering both said communal and said particular monetary value of any said probed test entity in terms of the value of at least one relevant characteristic, quality, trait, feature, property or aspect, regardless of said probed test entity's market price, mapping data into frame or table type representation, storing and mapping said data in multiple, associated knowledge databases on said computer system, the method comprising the steps of:

(1) surveying a representative cross section of a selected community to unearth at least one currently discoverable characteristic, quality, trait, feature, property or aspect relevant to said probed entity group, said probed entity group being unlimited as to such entity group's nature or consitution;

(2) polling said typical segment of said designated society to unearth the current precise collectively perceived relative weigh of said characteristic, quality, trait, feature, property and aspect relevant to said probed entity group;

(3) an interactive computer, connected to a monitor, conducting a quiz in reference to the user, discovering exact weight of importance to said user, of said characteristic, quality, trait, feature, property or aspect relevant to said probed entity group;

(4) calculating the monetary value of an assumed unit in said designated entity group which hypothetical unit is computed exact average, rating a 5 on a scale of 0–10, 10 being best, on said characteristic, quality, trait, feature, property or aspect, said fictitious unit called the NORM, said NORM unit having a total value of 100 points, representing a 100% pie;

(5) storing on said computer's database the hypothetical market price of said average, 100% NORM unit;

(6) further storing on said computer's database said average NORM unit's hypothetically perfectly average said characteristic, quality, trait, feature, property or aspect, the analogue value numbers accurately quantified to represent the precise relative societal importance of said characteristic, quality, trait, feature, property and aspect as revealed by said poll referenced in (2) above, such representation called the societal Worth Importance Point pie (WIP), said pie's slice size representing the percentage proportion depicting said respective relative societal weight of said characteristic, quality, trait, feature, property or aspect;

(7) further storing on said computer's database the value number accurately quantified to represent said individual user's precise weigh preference or the respective relative importance of said characteristic, quality, trait, feature, property or aspect as revealed by said quiz, referenced in (3)above, to parallel said NORM's said comparable average characteristic, quality, trait, feature, property or aspect, such representation called the individual Worth Importance Point pie (WIP), said pie's said slice size representing the percentage proportion depicting said individual user's said preferred weigh preference relative to said characteristic, quality, trait, feature, property or aspect;

(8) further storing on said computer's database the relevant real number accurately quantified in terms of said poll referenced in (2) above, representing the tested and measured actual such characteristic, quality, trait, feature, property or aspect, as well as the real market price of each said real member of said probed test entity group;

(9) said computer comparing the said quantified number that represents the accurately measured real analogous actual characteristic, quality, trait, feature, property and aspect of each real member of said probed test entity group with said quantified number representing said corresponding characteristic, quality, trait, feature, property oraspect of said NORM unit, resulting in comparable respective percentage values for each said member of said probed test entity group;

(10) said computer converting, on the basis of said societal WIP, referenced in b) and f) above, said respective percentage values of each said member of said probed test entity group into respective monetary figures, by comparing each said probed test entity member's said comparable percentage relationship to the said fictitious 100% price of said NORM unit;

(11) said computer further similarly converting, on the basis of said individual WIP, referenced in (3) and (7) above, said respective percentage values of each said actual member of said probed test entity group into monetary figures, by comparing each said real entity member's said respective percentage relationship to the said 100% hypothetical price of said fictitious NORM unit;

(12) said computer then displaying for comparison, on said monitor, said respective societal monetary value, called True Value, of each said probed test entity group member, as well as the respective individual monetary value, called Your Value, of each said probed test entity group member, alongside the known, real respective wholesale and retail market prices of each said probed test entity group member, said comparison revealing (1) the monetary value difference between the societal (True) monetary value and market price of each said probed test entity, (2) the monetary value difference between the individual (Your) monetary value and market price of each said probed test entity, and (3) the monetary value difference (including True Value ranking) among all said tested entities compared with each other on the basis of the said comparative value of said characteristic, quality, trait, feature, property or aspect.

9. A method according to claim 1 wherein generally 300 said characteristics, qualities, traits, features, properties and aspects of any said probed test entity must be communally and individually discovered and quantified as set forth in claim 1 for said method and procedure conclusively to produce accurate, authorative and scientifically representative monetary value figures or rankings concerning any said probed entity group, be said probed entity group relevant to appliances, motor vehicles, philosophies, professionals, HMOs, politicians, restaurants, vacations, morals, or whatever, but ultimately 100% precise monetary value judgment comparisons can only be made if every one of an entity's discoverable characteristics, qualities, traits, features, properties and aspects are collectively unearthed and collectively and individually quantified, no matter the number of said relevant characteristics, qualities, traits, features, properties and aspects.

10. A method according to claim 1 wherein in order to belong to a said specific probed entity group, each and all said members of a said probed entity group must be able to possess every said characteristic, quality, trait, feature, property or aspect any other member of said probed entity group, whether or not each said probed entity group member in fact possesses all or even many of said characteristics, qualities traits, features, properties or aspects.

11. A method according to claim 1 wherein said method conclusively facilitates monetary value comparison among any number of probed test entities whether or not said probed test entities belong in the same probed entity group, because since said method expresses said value differences in said monetary terms, then when a specific vacation calculated by said method to have a true monetary value of $1000, said specific vacation is then precisely twice as valuable according to said method as set forth in claim 1, as a unique bicycle calculated by said method to be truly worth $500.

12. A method according to claim 1 herein in contrast to known manmade, arbitrary, synthetic or contrived measuring methods using unnatural, invented yardsticks such as the Richter Scale to measure earthquakes, or the point system for gymnasts or figure skaters, said method according to claim 1 produces instead an organic, naturally quantified yardstick that is gleaned directly and unaffectedly from the community, leading inevitably to an untouched, genuine method of valuing, said method conclusively unearthing, without hindrance, impediment, obstruction, restraint, alteration or filter, a hypothetically ideally informed community's value judgment regarding any said probed entity, said method and procedure named Non-Subjective Valuing, said method and procedure actually mirroring the true, current societal, and/or individual, value of said probed entity in terms of a society or an individual who is theoretically informed to the maximum, the results of said method's calculations not being the conclusion of a consensus of experts, (such as is the relative worth or ranking result of the final decision by the Olympic judges concerning the ranking of gymnasts, that decision being based on contrived, invented game-rules), or scientists' consensus, or familiar opinion polls, a popularity contest, the inventor's judgment, the combined considerations from many sources; unimpeded, accepted, traditional democratic choice by partially-informed or uninformed community members; majority opinion, arbitrary, subjective weighing of the relative importance of value-affecting factors, using a manufactured or created measuring element, or a combination of the above; said method according to claim 1 instead effectively and simply unearthing the contemporary societal value of said probed entity, in terms of said hypothetically optimally informed community or ideally knowledgeable individual inquirer, not even using "representatives," but a people itself directly revealing what they want to know about a probed test entity to begin with, then through the method set forth in claim 1 obtaining said entity's monetary value as if said society suddenly were armed with said optimal information.

13. A method according to claim 1 wherein inquiring entities may obtain said valuing results of any said probed test entity from said central computer alternatively, that is without the aid of being interconnected to the central computer by an individual computer, or even being online or on the Internet, said inquiring entity interacting with the central computer through the central operator to respond to the central computer's posted quiz and then obtain conclusive said value numbers and rankings results through fax transmission, by telephone through the mail, in person or any other means of communication; further alternatively, said method and procedure according to claim 1 can be completed without the aid of any computers whatsoever, but using relevant calculations by persons, performed manually, and according to all steps according to claim 1, the essence and workings of said method and procedure being independent of any computer system, the interactive computer system simply speeding the procedure, making said method and procedure practical.

14. A method according to claim 1 wherein neither the cost of manufacturing, nor the market price of any said probed entity can be a factor of said probed entity's true monetary value, since without knowing, quantifying and considering the monetarily expressible true importance of the all said probed entity's characteristics, qualities, traits, features, properties and aspects, or what in fact said probed entity has and does in terms of claim 1, weighing said probed entity's cost or price is 100% incomprehensible, or paying $50 for a 12-year-old Ford Escort would be twice as good a deal as paying $100 for a brand-new Cadillac Seville.

15. A method according to claim 1 wherein by employing said unique combination of said science of inductive statistics, accurate sampling and central tendency, and said survey series set forth in claim 1, no collectively unearthable, imaginable characteristic, quality, trait, feature, property or aspect of any said probed entity is unquantifiable as to its contemporary societal worth, including for instance so called "subjective" attributes, such as whether a certain basketball player has "heart" or if a particular automobile's shape societally rates a 3.16 or 7.42 on the average, 0–10, 10 being best, since there is a communally average number that is invariably discoverable for any quality at all by said science of inductive statistics, accurate sampling and central tendency as set forth by said method and procedure in claim 1.

16. A method according to claim 1 wherein the sum of all said currently societally discoverable characteristics, qualities, traits, features, properties, attributes and aspects of said probed test entity conclusively express said contemporary 100% constitution of said probed test entity, or that all so collectively unearthable, identified elements, characteristics, qualities, traits, features, properties, attributes and aspects of said probed test entity definitely and ultimately constitute the prevailing totality of said probed test entity.

17. A method according to claim 1 wherein the said statistically precise average price and all said average qualities of any said group of entities is organically discoverable by said method and procedure set forth in claim 1.

18. A method according to claim 1 wherein the said natural "100-point" system and said infinitely divisible said 0–10, 10 being best, rating method; in conduction with said method and procedure set forth in claim 1, ultimately yields said accurate, current societal dollar value or ranking of said probed target unit, independent of said probed test unit's market price, said endlessly divideable "100 point" rating system being able accurately to reflect and express the entire range of a human being's opinions, inclinations, preferences, concerns and feelings, said opinions, inclinations, preferences and feelings extending from worthless to perfect, from useless to most valuable, from absolutely despicable to ideally admirable, that is from zero to ten, namely a value difference in a specific relevant characteristic, advantage, disadvantage, quality, trait, virtue, endowment, peculiarity, feature, distinctiton, property, effect, component, ingredient, part or aspect of said probed test entity being expressible here as having a rating of 7.917265438 on a scale of 0–10, 10 being best, versus another said probed test entity's relevant analogous characteristic, advantage, disadvantage, quality, trait, virtue, endowment, peculiarity, feature, distinctiton, property, effect, component, ingredient, part or aspect possessing a measure of 7.917265439, determining the conclusive applicable monetary deviation between said competing probed test entities to be very great, or to be a penny, or less, if the numbers so indicate pursuant to the method and process described in claim 1.

19. A method according to claim 1 wherein employing a relevant survey series, one, many or all discoverable complex, specialized, formal, scholarly, scientific, hard-to-comprehend, or technical data and specifications relating to said probed test entity are conclusively measured, rendered and quantified in layman's terms and said true or individual value of said one, many or all complex, specialized, formal, scholarly, scientific, confusing, hard-to-comprehend, or technical data and specifications are immediately and automatically expressed in plain, comprehendable monetary tems; or what a probed test entity has and does is gauged, quantified, and communicated to the user expressed as monetary values in terms of what each and every said relevant complex, specialized, formal, scholarly, scientific, confusing, hard-to-comprehend, or technical data and specification factually and practically means to the nonprofessional.

20. A method according to claim 1 wherein worth-differences among actual value variations of probed test entities are ultimately exactly and accurately expressed in said monetary terms, facilitating said accurate and plain ranking lists concerning said probed entities whether or not such said probed entities are in the same said probed test entity group.

21. A method according to claim 1 wherein for each distinct field, domain, realm, sphere, area, focus, specialty, discipline, or profession a separate database is created with the relevant NORM and all said established relevant and deciding value-affecting factors switched to match and be applicable to the probed test entity group.

22. A method according to claim 1 wherein for yet more precise valuing, a "General Factors" value-affecting coordinate may be additionally installed on said computer system in each case, said extensive environmental-conditions measuring element mirroring the relative weight-affects of discovered one or more specific influencing considerations relevant to the entire said probed test entity group or one or some members of said probed test entity group, said value-controlling element being applied proportionately accurately to influence the monetary value calculations properly applicable to said test entity according to the method and formula set forth in claim 1.

23. A method according to claim 1 wherein whether relevant facts pertaining to a said target probed test entity are already filed on said computer's database, or said value-affecting factors are rated and interactively identified by the user during the inquiry, by comparing said individual test unit with said NORM unit on said quantified 100-point system, said computer calculates and supplies the respective said monetary values of any target unit, both in terms of said societal value and said value to the user, and displays on said monitor said monetary numbers adjacent to the respective said known wholesale and retail prices of said individual probed test unit, whether said retail or wholesale prices are provided in real time by said user or already exist on the database.

24. A method according to claim 1 further comprising the steps connecting the computer system to an online network so that the user can utilize said computer system at a remote location to gain access to the valuing results.

25. A method according to claim 1 wherein said daily computer operator entering said database said relevant currently occuring value-affecting information, for said computer continually to incorporate such recent information onto the calculating mechanism, thus keeping up with ongoing worth-influencing developments, said relevant information being converted into said quantified value-affecting factors, each probed test entity assigned the multiplicity of all relevant value-affecting factors and respective worth-affecting rates, said computer conclusively transforming and expressing the final results in monetary values and/or rankings.

26. A method according to claim 1 wherein all specifically applicable considerations and pertinent value affecting components concerning any unique probed test entity group are taken into consideration and entered onto a relevant computer-database, thus customizing said procedure to enable said method employing said specialized computer system then to value or rank anything at all for anybody at all.

27. A method according to claim 1 wherein said database of said computer is periodically, daily, hourly or otherwise updated, such database containing: a) all said relevant quantified value-affecting elements' current representative numbers of said individual probed test entities; b) the most recent available analogue relevant quantified value-affecting elements' current representative numbers of said NORM unit, said fictitious NORM unit calculated to be exact average on all its analogue relevant quantified value-affecting elements' numbers as well as said NORM's said hypothetical price; c) said computer calculating the monetary value of said probed individual test entities by comparing each said probed test entity to the NORM on said 100-point basis, ultimately expressing the percentage variations in monetary terms.

28. A method and procedure wherein each field to which said system is applied has its separate, dedicated central computer programmed as set forth in claim 1, the licensees of the method and system conducting said relevant surveys, research series, studies, examinations, focus group sessions, collection and analyses of historical data, projections, interviews, applicable specifications, statistics and so on according to claim 1, to create specified said relevant databases containing relevant NORM and relevant quantified facts about all germane individual probed test units in said NORM's group.

29. A method according to claim 1 wherein users of this system become instantly, optimally and objectively informed regarding the relative values of competing elements of Propositions on a State Ballot, United Nations policies, automobiles, works of art, car rental services, and so on, depending to what specific field the employed computer database is dedicated, ideally informed or optimally knowledgeable meaning knowing as much about an entity as desired, said information quantified by this method and procedure both in terms of the community and in terms of the user, and the relative values of said probed test entities expressed in monetary terms both as to their communal and individual values, for transparent results.

30. A method according to claim 1 wherein said method establishes said Worth Importance Point Pie, or other appropriate graphic or other depiction by unearthing and quantifying each said attribute of said probed test entity in terms of their relative weigh, expressing said relative importance values as pie slices, or percentages of the 100% pie, or other appropriate graphic or other depiction both in terms of society as said societal WIP, and in terms of the user as said individual WIP, providing said measured differences in monetary terms and appropriate rankings.

31. A method according to claim 1 wherein through the interactive method calculating and displaying, Value to within ±1%, or whatever percent is appropriate, the user initially employs a method by which he first informs the interactive system of his own skill level, relative to his knowledge of the probed entity group, rating himself 0–10, a 10 meaning being a perfect expert about the test entity, a 0 indicating one who knows noting about the probed subject, the inquirer entering such rating through the provided route, facilitating the system considering the observer's level of understanding of the probed entity group to account for applicable points of margin of error in the final calculated figures, such as in the case of works of art for instance, where an expert gallery owner entering facts about the artwork he is inspecting has a higher chance of obtaining conclusive precise valuation numbers than a novice keying in his ratings of the assorted relevant variables about a work of art he is observing, and the system informs the viewer of the exact margin of error he can expect based on his skill level as to the final monetary figures, such margin of error varying from 0% to 75%.

32. A method according to claim 1 wherein said computer system first creates a pre-qualifying pie for a group such as a family or a corporation, by noting and registering the pre-negotiated and harmonized relative weights among two or more individuals comprising said exploring user group, that is the comparative individual weights of opinions of members of said inquiring group in that the input of the head of a family will weigh considerably more than that of one of his young children, or the views of a CEO will be considered more significant than those of a middle level manager, the computer then automatically quantifying the relevant judgments to their predetermined respective degrees, to achieve the ultimate purpose of said group expressed by the final pie, for instance in a family, 35% weigh might be pre-assigned to each parents versus 15% for each of two children when it comes to common decisions, said computer calculating the family members' respective elections accordingly, thus the relative monetary worth of going on a specific vacation versus the purchase of a new car, for instance, ultimately will mirror the true common purpose of such family, community, group or corporation.

33. A method according to claim 1 wherein said quantification of attributes mirror the actual affect any such attribute actually has on a normal person and on the individual user, in terms of what said trait in fact does and has, presenting said user with the tested and calculated monetary worth of said relevant properties first decoded and interpreted in concrete terms of the normal person and in tangible terms of the user, unearthing such attributes' real affect, notwithstanding such characteristic's technical, scientific, professional or mechanical name or description; "expert opinion," or unquantified "technical numbers, specs and stats" playing their respective roles only to the precise extent said method and procedure reveals a said community's or exploring individual's precise relevant appreciation and consideration-level for what said qualities actually do and have, "expert opinion," for example being considered only as one of many respective competing value-affecting components, having specific, surveys and quiz-unearthed importance in comparison to said probed test entity's other rivalling features.

34. A method according to claim 1 wherein said method accurately to compare the true monetary values of said competing entities, calculates and provides to the user the true values of entities by theoretically bringing said entities to par, particularly when any said entity is short of at least one said characteristic that a competing said entity has, said method deducting the monetary value of said missing one (or more) characteristic from said entity's said true monetary value that is short of said (one or more) characteristic that said competing entity possesses, meaning if there were two automobiles, car A and car B, and both said cars were identical in all their said characteristics except that said car B had a characteristic (such as airconditioning) and said car A did not, then the said true monetary value of said characteristic (airconditioning) is deducted from the said total value of said car A, said car A's comparable true monetary value accurately and exactly reflecting such liability, or shortcoming, to the precisely calculated extent in comparison with said true monetary value of said car B that possesses said characteristic (airconditioning) which said characteristic is missing from said car A; namely if said car A costs $10,000 and said car B costs $20,000, but car A has no airconditioning and car B does, then if said airconditioning attribute has a said true calculated value of $1000, then said true value of car A is considered by said method to be $9000 and said true value of car B is considered to be $20,000, while the average true value of said two cars are calculated $20,000+$9,000=$29,000: 2=$14,500, and if said two cars were identical in all their attributes save for the fact that said car B has said airconditioning attribute and said car A does not, then the said true values of said two automobiles according to said method would be $14,500 for car B and $13,500 for car A, notwithstanding the fact that their respective market prices are $10,000 for car A and $20,000 for car B.

35. A method according to claim 1 wherein the make up of any said attribute of any said entity is defined by the present method either terms of the normal member of society, meaning the determination of what constitutes any said attribute is discovered from surveys series similar to ones referenced in claim 1, and similarly the constitution of said attribute is further defined as the same is unearthed from the individual user employing said quiz administered by said computer, wherein said definition of what said specific attribute is, is gleaned respectively as a result of said described surveys series and quiz, from society or group of two or more as well as the user, to employ said resulting definitions for said attribute for said calculations that are not arbitrary or defined in a vacuum, but that said both definitions of said constitution of said attribute mirror the respective understandings of said community and said individual user, meaning that what any said attribute means is not defined arbitrarily by any denotation other than those of said society or group of two or more and said individual user.

36. A method according to claim 1 implemented on a computer system that dynamically links data, said method and procedure having at least one parameter; said method and procedure mapping data into frame or table type representation, storing and mapping said data in multiple, associated knowledge databases on said computer system; said method and procedure employing infinitely apportionable analogous weigh quantification, said method accurately to compare said true societal ranking(s) and/or true individual ranking(s) to the user, of said competing entity or entities, solely on a relative percentage worth footing, said entity's or entities' said relative worth not expressed by said computer in monetary terms, but set forth only regarding said test entity being better or worse by a certain, discoverable, exact percentage than said average unit, said computer allowing the user to select the desired comparable said entities by said user clicking on said monitor screen on the chosen image, reproduction or description of the chosen entity or entities, or using said computer's keyboard to choose said image, reproduction or description of the said entity or entities appearing on said monitor screen, thereby indicating said user's choice(s) for ranking, whereby the computer then displays on said monitor screen both said relevant quantified attributes of said selected entity or entities, said attributes being selected by the user, by experts, by the provider or by societal polls according to claim 1, and said computer further presenting and displaying on said monitor screen the user-selected entity or entities now in order of their rankings best to worst, or most valuable to least valuable, relative to their respective relationship to said RANKING NORM, said RANKING NORM calculated by taking one, many, or all discoverable characteristic(s) of the entity or entities in said relevant probed entity group, and determining the exact average said characteristic(s) in such relevant group, and comparing the analogous number(s) representing said test entity or entities to said analogous average characteristic number(s) representing the RANKING NORM;

(A) polling said representative segment of said designated society to unearth and then express and file on said database on said computer in percentage-terms, the prevailing precise collectively perceived relative weigh of one, more or all said discoverable characteristic(s) relevant to said user-selected, probed entity group;

(B) said interactive computer system, employing at least one monitor screen, or similar display device, conducting a quiz in reference to the user, discovering and expressing on the database in percentage-terms the exact comparable importance to said user, of each one, more or all discoverable said characteristic(s) relevant to said probed entity group;

(C) calculating the number of an assumed unit in said designated user-selected entity group which number faithfully expresses the exact average number relevant to said selected characteristic(s) of said chosen entity group, said number corresponding to said 100%, or 100 points, or a rating of 5 on an infinitely divisible scale of 0–10, 10 being best, said fictitious unit called the RANKING NORM, storing on said computer's database said accurately calculated hypothetical exact average number(s) representing said fictitious, average, 100% NORM unit's said relevant characteristic(s)

(D) further storing on said computer's database the respective corresponding comparative value numbers accurately quantified to represent respectively said community's and said individual user's precise weigh preferences or said respective relative importance relevant to said characteristic(s) revealed by said surveys and said quiz, referenced above, (F) further storing on said computer's database said relevant real numbers accurately quantified in terms of said poll referenced above, representing one, more or all tested and measured said actual characteristic(s), of each said real member of said probed test entity group;

(G) employing said knowledge tables, said computer comparing the said quantified numbers that represent the accurately measured real analogous actual characteristic(s), of each said real member of said probed test entity group with said quantified numbers representing said corresponding characteristic(s), of said fictitious NORM unit, said comparison resulting in comparable respective percentage values for each said member of said probed test entity group;

(H) said computer matching each said probed test entity member's said comparable percentage relationship to the said relevant 100%/100-point, 5-rated or average umber of said RANKING NORM unit based on one, more or all said characteristic(s) in terms of said value preferences of society;

(I) the user is then able to review on said computer's said monitor displayed the said relative standing or ranking, best to worst, or most valuable to lest valuable, of all said real members of said probed entity group both in terms of the community and in terms of the individual user as displayed on said computer's said monitor in relative percentage terms, such as based on the community's value entity X is the winner by collecting 120 points, or a rating of 9, and the worst real test unit is the one collecting a rating of 2, or having a 60% value, always compared with the accurately computed average 100%, NORM element, or whatever numbers may be used to correspond to the percentage-difference determination, and correctly express that worth-divergence between any and all target units with the average (NORM) unit.

37. A method according to claim 1, wherein the scale 0–10 is employed to express the relative merit of one or more or all qualities of a specific entity, 10 being perfect, 9 being excellent, 8 meaning very good, 7 denoting good, 6 specifying better than average, 5 expressing average, 4 signifying worse than average, 3 meaning poor, 2 marking very poor, 1 meaning bad and 0 meaning the worst, these numbers infinitely divisible, meaning said characteristics of said entity could be described as being 6.8795364223518977654, or 0.81726354637281 or 9.5463728192837465 and so on, on this sale, the number zero always standing for the lowest actual number assigned to it, which must always be more than zero.

38. A method according to claim 1 wherein the Honest Base Price of cars or other entities in a specific group are discovered by NORMalizing said cars or other entities, specifically bring equipment included with the base prices of said competing individual cars or other entities in said groups in line with each other by (I) discovering the hypothetical average price of said cars or said other entities in said respective groups as if each sad individual group member were equipped with all available said extra pieces of equipment;

(II) unearthing the fictitious average price of all said cars or said other entities in said respective groups as if each said individual group member were equipped with none of the available said pieces of equipment;

(III) adding up the said two monetary figures obtained as referenced above in (I) and (II) and dividing same by two, yielding the pretended monetary value of the image car or other fictitious entity in said group that is equipped exact average in said group, (IV) taking each said member of said group then and adding or subtracting the respective monetary values of each said pieces of equipment depending on whether said pieces of equipment is or is not included in said member car or other entity's listed base price, and regardless of whether said extra equipment is or is not actually available for said car or said other entity, the final numbers now mirroring the Honest Base Price of each said car or said entity as if each said car or said entity were identically equipped with the competing said cars or said entities in said groups.

39. A method wherein a computer system appraises the monetary value of a target entity of whatever nature, the value-affecting factors being derived not from surveys, comprising:

a. storing in a mass storing device the database of multiple records, each including specific information of an individual member of the target group, including relevant historical and other information of individual members of said target entity group, corresponding to the specific value-affecting factors, each assigned multiple levels with respective value-affecting rates;

b. computing and filing by the central processing unit the NORM (average) price or ranking, and a collection of normal points based on the described formula, including one, more or all relevant value-affecting rates in the probed field of inquiry;

c. prompting a series of inquiries to obtain the specific, value-affecting factors of one or all individual members of the group;

d. quantifying one or more relevant attributes of each member of the group;

e. quantifying in terms of the user relevant attributes of one or more members of said entity group;

f. match to the NORM on a percentage basis the individual probed test entity, by retrieving from the stored database of the mass data storage device the collection of normal points for both the exact average unit and for the probed target entity for said comparison.

40. A method and procedure, implemented on a computer system that dynamically links data, said method and procedure having at least one parameter; said method and procedure mapping data into frame or table type representation, storing and mapping said data in multiple, associated knowledge databases on said computer system; said method and procedure employing infinitely apportionable analogous weigh quantification, relative to said method and procedure's submission that any said probed test entity's sum (100%) constitution always consists of not more and not less than the assigned qualities of said probed test entity; said method and procedure having the purpose of discovering the current monetary value of any said probed test entity in terms of the hypothetically ideally informed, said method and procedure comprising the steps of:

a) establishing at least one decisive characteristic, advantage, disadvantage, quality, trait, virtue, endowment, peculiarity, feature, distinctiton, property, effect, component, ingredient, part and aspect relevant to said probed entity group or concept, be said probed test entity group pertaining to homes, used cars, works of art, morals, laws, rules, behavior, thinking, sports, fairness, fights, wars, peace, agreements, respectability, power, regulations, prestige, social justice, music, art, taste, fashion, politics, politicians, policies, the concept of "good" and "bad" , philosophies, concepts, religion, laws, elections, propositions, objects, goods, services or any other known or imaginable entity;

b) establishing the precise relative weigh of each said one or more characteristic, advantage, disadvantage, quality, trait, virtue, endowment, peculiarity, feature, distinctiton, property, effect, component, ingredient, part and aspect relevant to said probed entity group;

c) calculating the current monetary value of an assumed unit in said designated entity group which hypothetical unit is computed exact average, rating a 5 on an infinitely apportionable 0–10, 10 being best scale, on one, more or every one of its discoverable characteristics, qualities, traits, features, properties, attributes and aspects, said fictitious unit called the NORM, said NORM unit having a total value of 100 points, representing a 100% pie constituting the sum total make up of said NORM unit;

d) storing on said computer's database the accurately calculated hypothetical current market price of said fictitious, average, 100% NORM unit, said normal unit's said average price and said average qualities fused together constituting said NORM or yardstick unit pertaining to said specific probed test entity group;

e) furthers storing on said computer's database all said average 100%/100 point NORM unit's appertaining hypothetically perfectly average, 5-rated characteristics, qualities, traits, features, properties and aspects, the analogue value numbers accurately quantified to represent the said precise relative established importance of all said characteristics, qualities, traits, features, properties and aspects;

f) further storing on said computer's database said relevant real numbers, 0–10, 10 being best, representing any target entity's tested and measured said one, or many, or all actual characteristic, quality, trait, feature, property and aspect of said real member of said probed test entity group;

g) employing said knowledge tables, said computer comparing the said quantified numbers that represent the accurately measured real analogous actual characteristics, qualities, traits, features, properties and aspects of each real member of said probed test entity group with said quantified numbers representing said corresponding characteristics, qualities, traits, features, properties and aspects of said fictitious 100% NORM unit, said comparison resulting in comparable plus or minus respective percentage values for each said member of said probed test entity group;

h) for more exact calculations an optional "General Factors" value-affecting coordinate may be installed on said computer system, mirroring the relative weight-affects of discovered influencing considerations relevant to the entire said probed test entity group or one or some members of said probed test entity group, such environmental worth-influencing component being applied proportionately to sway said monetary value calculations, i) said computer converting, said respective percentage values of each said member of said probed test entity group into respective monetary figures, by matching each said probed test entity member's said comparable percentage relationship to the said 100% or average monetary value of said NORM unit;

j) said computer then displaying for comparison, on said display monitor, the current monetary value of said probed test entity group member.

* * * * *

UNITED STATES PATENT AND TRADEMARK OFFICE
CERTIFICATE OF CORRECTION

PATENT NO. : 6,038,554
DATED : March 14, 2000
INVENTOR(S) : Tommy Vig

It is certified that error appears in the above-identified patent and that said Letters Patent is hereby corrected as shown below:

Please replace all (c) (Copyright) signs with and (R) sign in all instances following the expression "Non-Subjective Valuing"
The error begins with the title of the invention and occurs about one-hundred times more, including in the Abstract, (twice), and
Column 1, Line 16, and so on.

Column 29,
Line 46, replace "o" with -- and --

Column 33,
Line 29-30, delete.

Column 6,
Line 42, insert -- of -- between "prices" and "all"
Line 64, add "d" to the last word "metho" to be: -- method --

Column 69,
Line 24, insert comma following the word "thinking"

Column 7,
Line 49, replace "column2" with -- column 2 --

Column 12,
Line 38, replace "therelevant" with -- the relevant --

Column 19,
Line 19, replace "w" with -- worth --
Line 46, omit "a" following the word "attributes"

Column 24,
Line 21, add space between "corporation" and "the U.S."

Column 43,
Line 30, insert the word -- plus -- between "value" and "its"

Column 46,
Line 51, delete comma following the phrase Non-Subjective Valuing

Column 47,
Line 67, replace 4th word "ad" with -- and --

UNITED STATES PATENT AND TRADEMARK OFFICE
CERTIFICATE OF CORRECTION

PATENT NO.    : 6,038,554
DATED         : March 14, 2000
INVENTOR(S)   : Tommy Vig It is certified that error appears in the above-identified patent and that said Letters Patent is hereby corrected as shown below:

Column 49,
Line 14, insert space between "man" and "O"
Line 52, replace "compare" with -- compared --

Column 50,
Line 14, insert -- to -- between "which" and "compare"
Line 29, insert comma between "valuing" and "consumer"
Line 35, insert comma between "name" and "the"

Column 51,
Line 43, insert comma between "valuing" and "so"

Column 54,
Line 59, delete "a" prior to "say"

Column 55,
Lines 36-37, "that ultimately produces the" (4 words) should be replaced by a comma Column 62,
Line 11, insert -- worth -- between "valuing" and "of"

Column 69,
Line 54, insert -- or other -- between "graphic" and "analog"
Line 49, insert -- said -- between "its" and "characteristics"

Column 73,
Line 57, insert -- at least one -- between "said" and "characteristic"
Line 63, insert -- at least one -- between "said" and "characteristic"

Column 74,
Line 1, insert -- at least one -- between "said" and "characteristic"
Line 9, insert -- at least one -- between "said" and "characteristic"
Line 13, insert -- at least one -- between "said" and "characteristic"
Line 17, insert -- at least one -- between "said" and "characteristic"
Line 23, insert -- at least one -- between "said" and "characteristic"
Line 25, insert -- at least one -- between "said" and "characteristic"
Line 31, insert -- at least one -- between "said" and "characteristic"
Line 36, insert -- at least one -- between "said" and "characteristic"
Line 45, insert -- such at least one -- between "corresponding" and "characteristic"

UNITED STATES PATENT AND TRADEMARK OFFICE
CERTIFICATE OF CORRECTION

PATENT NO. : 6,038,554
DATED : March 14, 2000
INVENTOR(S) : Tommy Vig

It is certified that error appears in the above-identified patent and that said Letters Patent is hereby corrected as shown below:

Column 75,
Line 13, insert -- at least one -- between "said" and "characteristic"

Column 76,
Line 30, insert comma, following "telephone"
Line 45, delete "the" and insert -- of -- between "all" and "said"
Line 47, insert -- is, -- between "entity" and "has" between "entity" and "has"

Column 77,
Line 51, insert -- is, -- between "entity" and "has"

Column 83,
Line 3, replace "price" with -- monetary value --
Line 13, replace "image" with -- imaginary --

Signed and Sealed this

Thirteenth Day of November, 2001

Attest:

*Nicholas P. Godici*

NICHOLAS P. GODICI
*Attesting Officer*    Acting Director of the United States Patent and Trademark Office